(12) United States Patent
Yasuda

(10) Patent No.: US 11,853,037 B2
(45) Date of Patent: Dec. 26, 2023

(54) ELECTRIC HOISTING MACHINE AND CONTROL DEVICE AND CONTROL METHOD THEREFOR

(71) Applicant: Globeride, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 1105 days.

(21) Appl. No.: 16/605,544

(22) PCT Filed: Apr. 16, 2018

(86) PCT No.: PCT/JP2018/015719
§ 371 (c)(1),
(2) Date: Jan. 20, 2020

(87) PCT Pub. No.: WO2018/194026
PCT Pub. Date: Oct. 25, 2018

(65) Prior Publication Data
US 2020/0140245 A1 May 7, 2020

(30) Foreign Application Priority Data

Apr. 17, 2017 (JP) ................. 2017-081553
Apr. 18, 2017 (JP) ................. 2017-082336
(Continued)

(51) Int. Cl.
*B66D 1/22* (2006.01)
*G05B 19/416* (2006.01)
(Continued)

(52) U.S. Cl.
CPC .......... *G05B 19/416* (2013.01); *B64C 39/024* (2013.01); *B64D 1/22* (2013.01);
(Continued)

(58) Field of Classification Search
CPC .................................. B66D 1/505; B66D 1/50
See application file for complete search history.

(56) References Cited

U.S. PATENT DOCUMENTS 3,739,728 A   6/1973  Thompson
4,130,014 A * 12/1978  Eddens .................. G01L 5/107
                                                         73/862.622
(Continued)

FOREIGN PATENT DOCUMENTS

CN   203938381 U   11/2014
CN   104827785 A    8/2015
(Continued)

OTHER PUBLICATIONS

Notice of Reasons for Refusal dated Jun. 18, 2020, of counterpart Japanese Application No. 2017-081553, along with an English translation.
(Continued)

*Primary Examiner* — Rina I Duda
(74) *Attorney, Agent, or Firm* — Oliff PLC

(57) ABSTRACT

A control device that controls an electric hoisting machine includes: a tension sensor that detects tension of a pulling member; a mode input unit that inputs a mode switch signal to switch between a winding mode and an unwinding mode; and a control unit that controls the operation of a electric motor. The control unit, when set in the unwinding mode, controls the electric motor in accordance with a detection signal from the tension sensor to cause the rotating body to be inversely rotated when the tension of the pulling member is not less than a predetermined threshold value, and to prevent the rotating body from being inversely rotated when the tension of the pulling member is lower than the predetermined threshold value.

16 Claims, 57 Drawing Sheets

(30) Foreign Application Priority Data

| | | | |
|---|---|---|---|
| Jun. 8, 2017 | (JP) | ................................ | 2017-113783 |
| Jun. 8, 2017 | (JP) | ................................ | 2017-113784 |
| Jun. 8, 2017 | (JP) | ................................ | 2017-113785 |
| Jun. 28, 2017 | (JP) | ................................ | 2017-125847 |
| Jul. 12, 2017 | (JP) | ................................ | 2017-135837 |
| Jul. 12, 2017 | (JP) | ................................ | 2017-135838 |
| Jul. 18, 2017 | (JP) | ................................ | 2017-138990 |
| Sep. 14, 2017 | (JP) | ................................ | 2017-176584 |

(51) Int. Cl.

| | |
|---|---|
| *B64C 39/02* | (2023.01) |
| *B64D 1/22* | (2006.01) |
| *B66D 1/50* | (2006.01) |
| B66C 13/22 | (2006.01) |
| B66C 23/20 | (2006.01) |
| B64U 101/60 | (2023.01) |

(52) U.S. Cl.
CPC .......... *B66D 1/505* (2013.01); *B64U 2101/60* (2023.01); *B66C 13/22* (2013.01); *B66C 23/202* (2013.01); *G05B 2219/41318* (2013.01)

(56) References Cited

U.S. PATENT DOCUMENTS

| | | | | |
|---|---|---|---|---|
| 4,277,053 | A | * | 7/1981 | Simon ..................... B66C 23/52 254/326 |
| 4,555,093 | A | | 11/1985 | Plummer |
| 4,789,813 | A | * | 12/1988 | Orchard ............... B65H 59/387 242/420.5 |
| 5,005,449 | A | | 4/1991 | Sorensen et al. |
| 5,094,131 | A | | 3/1992 | Sorensen et al. |
| 5,398,911 | A | * | 3/1995 | Holster .................. B65G 23/44 254/350 |
| 5,427,364 | A | | 6/1995 | Zborschil |
| 5,474,278 | A | | 10/1995 | Kasuga |
| 5,479,831 | A | | 1/1996 | Hirose |
| 6,109,555 | A | | 8/2000 | Svenson et al. |
| 2004/0238472 | A1 | | 12/2004 | Varildengen et al. |
| 2006/0169813 | A1 | | 8/2006 | Nakagawa et al. |
| 2008/0023681 | A1 | | 1/2008 | Cunningham |
| 2010/0000143 | A1 | * | 1/2010 | Pekin ................... A01K 97/125 242/316 |
| 2010/0013133 | A1 | | 1/2010 | Strauss |
| 2010/0013136 | A1 | | 1/2010 | Strauss et al. |
| 2010/0156015 | A1 | | 6/2010 | Klein et al. |
| 2010/0276860 | A1 | | 11/2010 | Geier et al. |
| 2012/0097783 | A1 | * | 4/2012 | Pack .................... B65H 75/425 242/563.2 |
| 2014/0248089 | A1 | | 9/2014 | Thompson et al. |
| 2015/0225196 | A1 | | 8/2015 | Hamano et al. |
| 2016/0332851 | A1 | | 11/2016 | Bialkowski et al. |

FOREIGN PATENT DOCUMENTS

| | | |
|---|---|---|
| CN | 106115470 A | 11/2016 |
| CN | 107161898 A | 9/2017 |
| JP | S44-13614 | 6/1969 |
| JP | 49-13854 A | 2/1974 |
| JP | 52-46467 U | 4/1977 |
| JP | S55-161791 A | 12/1980 |
| JP | S58-117486 U | 8/1983 |
| JP | S59-020059 Y2 | 6/1984 |
| JP | 60-96386 U | 7/1985 |
| JP | S60-103188 U | 7/1985 |
| JP | S61-229792 A | 10/1986 |
| JP | 62-119385 U | 7/1987 |
| JP | 63-38224 Y2 | 10/1988 |
| JP | S63-046460 Y | 12/1988 |
| JP | S64-8190 A | 1/1989 |
| JP | H02-035684 Y | 9/1990 |
| JP | H03-95098 A | 4/1991 |
| JP | H04-234930 A | 8/1992 |
| JP | H05-32376 A | 2/1993 |
| JP | H05161438 A | 6/1993 |
| JP | H05-338994 A | 12/1993 |
| JP | H06-143152 A | 5/1994 |
| JP | 06-271289 A | 9/1994 |
| JP | H06-264943 A | 9/1994 |
| JP | H06-276900 A | 10/1994 |
| JP | H06-339866 A | 12/1994 |
| JP | H07-40779 A | 2/1995 |
| JP | H07-68472 A | 3/1995 |
| JP | H7-35481 U | 7/1995 |
| JP | H07-213203 A | 8/1995 |
| JP | 09-183593 A | 7/1997 |
| JP | H10-309673 A | 11/1998 |
| JP | H11-46644 A | 2/1999 |
| JP | 2000-083535 A | 3/2000 |
| JP | 2000-270738 A | 10/2000 |
| JP | 2000-335870 A | 12/2000 |
| JP | 2001-095444 A | 4/2001 |
| JP | 2002-104735 A | 4/2002 |
| JP | 2002-128455 A | 5/2002 |
| JP | 2003-176080 A | 6/2003 |
| JP | 2006-182506 A | 7/2006 |
| JP | 2006-197810 A | 8/2006 |
| JP | 2007-210752 A | 8/2007 |
| JP | 2009-018906 A | 1/2009 |
| JP | 2009-202976 A | 9/2009 |
| JP | 2010-42501 A | 2/2010 |
| JP | 2011-020831 A | 2/2011 |
| JP | 2011-524813 A | 9/2011 |
| JP | 2013-172704 A | 9/2013 |
| JP | 2014-113142 A | 6/2014 |
| JP | 2015-067376 A | 4/2015 |
| JP | 2016-005972 A | 1/2016 |
| JP | 2016-088675 A | 5/2016 |
| WO | 2017/053392 A1 | 3/2017 |
| WO | 2017/078118 A1 | 5/2017 |

OTHER PUBLICATIONS

Notice of Reasons for Refusal dated Mar. 4, 2021, of counterpart Japanese Application No. 2017-113784, along with an English translation.

International Preliminary Report on Patentability dated Oct. 22, 2019, of counterpart International Application No. PCT/JP2018/015719, along with an English translation.

Notice of Reasons for Refusal dated Dec. 24, 2020, of counterpart Japanese Application No. 2017-125847, along with an English translation.

Notice of Reasons for Refusal dated Jan. 7, 2021, of counterpart Japanese Application No. 2017-138990, along with an English translation.

Notice of Reasons for Refusal dated Nov. 12, 2020, of counterpart Japanese Application No. 2017-135837, along with an English translation.

Notice of Reasons for Refusal dated Nov. 12, 2020, of counterpart Japanese Application No. 2017-135838, along with an English translation.

Notice of Reasons for Refusal dated Nov. 19, 2020, of counterpart Japanese Application No. 2017-113783, along with an English translation.

Notice of Reasons for Refusal dated Dec. 3, 2020, of counterpart Japanese Application No. 2017-113784, along with an English translation.

Notice of Reasons for Refusal dated May 13, 2021, of counterpart Japanese Application No. 2017-113783, along with an English translation.

Notice of Reasons for Refusal dated May 7, 2020, of counterpart Japanese Application No. 2017-113783, along with an English translation.

Notice of Reasons for Refusal dated May 21, 2020, of counterpart Japanese Application No. 2017-082336, along with an English translation.

(56) References Cited

OTHER PUBLICATIONS

The First Office Action dated Sep. 28, 2020, of counterpart Chinese Application No. 201880039615.1, along with an English translation.

The Extended European Search Report dated Dec. 16, 2020, of counterpart European Application No. 18787578.6.

Notice of Reasons for Refusal dated Apr. 1, 2021, of counterpart Japanese Application No. 2017-138990, along with an English translation.

Notice of Reasons for Refusal dated Feb. 18, 2021, of counterpart Japanese Application No. 2017-113785, along with an English translation.

Notice of Reasons for Refusal dated Feb. 18, 2021, of counterpart Japanese Application No. 2017-135838, along with an English translation.

Japanese Office Action for related Japanese Application No. 2017-113784; action dated Jun. 17, 2021; (4 pages).

\* cited by examiner

ELECTRIC HOISTING MACHINE AND CONTROL DEVICE AND CONTROL METHOD THEREFOR

TECHNICAL FIELD

The present invention relates to an electric hoisting machine for electrically hoisting (winding up) and/or carrying down (unwinding) a traction member to lift and lower an object, and to a control device and a control method for such an electric hoisting machine.

BACKGROUND ART

Electric hoisting machines for hoisting and lowering objects such as beddings, packaging, temporary scaffolding, buildings and fishing tools to predetermined positions, using the driving force of electric motors are generally known in the art.

Further, in the technical field of fishing reels, electric reels are often used as electric hoisting machines in boat fishing, particularly in deep-field fishing.

In such various types of electric hoisting machines, a traction member is generally wound on a rotating body (e.g., a drum or a spool) by way of the forward rotation of an electric motor, and the traction member is unwound from the rotating body by way of backward rotation of the electric motor (e.g., see Patent Literatures 1 and 2.)

PRIOR ART LITERATURE

Patent Literature

Patent Literature 1: Japanese Patent Application Publication No. 2011-020831
Patent Literature 2: Japanese Patent Application Publication No. H9-183593

SUMMARY OF THE INVENTION

Problems to be Solved by the Invention

Incidentally, in the electric hoisting machine in which the traction member is unwound from the rotating body by way of the backward rotation of the electric motor as described above, the traction member is often unwound from the rotating body in preparation for the work of connecting the object to be lifted and lowered, and the traction member. At this time, while the traction member is manually pulled with the backward rotation of the electric motor, if the rotation speed of the electric motor is higher than the pulling speed, a so-called backlash phenomenon in which the traction member is loosened and slackened, which may cause the traction member to become tangled or kinked can be prevented.

Accordingly, the operator must work in good synchronism with the operation of the electric motor and the pulling operation of the traction member, and therefore, for example, when lifting an object (load) 104 upstairs as shown in FIG. 6, the operator 100 may have to (a) carry an electric hoisting machine 102 upstairs, (b) install the electric hoisting machine 102 on the upper floor and then (c) go downstairs again to tie a traction member 103 to an object 104, and (d) go upstairs again to start the electric hoisting machine 102 (by way of the forward rotation of an electric motor) and wind the object 104 to the upper floor. Such work is inefficient (poor workability) and requires a lot of work time.

The present invention has been made in view of the above-mentioned problems, and the object thereof is to provide an electric hoisting machine capable of preventing a backlash phenomenon at the time of unwinding a traction member from a rotating body, and a control device and method thereof

Means of Solving the Problems

In order to achieve the above purpose, the present invention provides a control device for controlling an electric hoisting machine for winding and/or unwinding a traction member on a rotating body by way of the forward and backward rotation of a rotating body by rotationally driving an electric motor forward and backward: having a tension detection part for detecting a tension of the traction member; an input part for inputting a mode switching signal for switching a winding mode to wind the traction member on the rotating body by way of the forward rotation of the rotating body; an unwinding mode for rotating the rotating body backward and unwinding the traction member from the rotating body; and a control unit (or control part, controller) for receiving a detection signal from the tension detection part and a mode switching signal from the input part and controlling the operation of the electric motor in response to the mode switching signal, wherein when set by the mode switching signal to the unwinding mode, the control unit controls the electric motor in response to a detection signal from the tension detection part, so that the rotating body is rotated backward when a tension of the traction member is equal to or greater than a predetermined threshold value, and the rotating body is prevented from being rotated backward when a tension of the traction member falls below a predetermined threshold value.

According to the above configuration, when set to the unwinding mode, the rotating body is rotated backward when a tension of the traction member is equal to or greater than a predetermined threshold value, and the electric motor is controlled so that the rotating body is prevented from being rotated backward when a tension of the traction member falls below a predetermined threshold value, so that it is possible to suppress or avoid a situation in which the rotation speed of the electric motor becomes higher than the pulling speed when the traction member is pulled by hand together with the backward rotation of the electric motor, which makes it possible to smoothly perform the unwinding operation of the traction member while suppressing the occurrence of a so-called backlash phenomenon in which the traction member is loosened and slacked (in turn, the traction member can also be unwound (pulled out) while suppressing the occurrence of backlash only by the operation of pulling the traction member.) Therefore, for example, when tying the object to be lifted and lowered and the traction member, and lifting the object upstairs by an electric hoisting machine, the operator can avoid performing burdensome task (consideration or burdensome tasks for avoiding a backlash phenomenon) of successfully synchronizing the operation of the electric motor and the pulling operation of the traction member, which makes it possible to perform the hoisting operation efficiently in a short time (workability is improved.) In this case, if the threshold value for the tension can be arbitrarily set, it can also act as an electronic drag function, and the workability can be finely adjusted.

The present invention also provides an electric hoisting machine controlled by a control device having the above-described configuration, and related control method. Further, such an electric hoisting machine can be used for hoisting and lowering objects such as beddings, packaging, temporary scaffolding, buildings and fishing tools to a predetermined position, and can also be used as an electric fishing reel and further, such a machine mounted on a drone can be used to take loads down from, or hoist loads onto, the drone in the air, the fields in which such a machine is used are not limited to those mentioned above.

Effect of the Invention

The present invention provides an electric hoisting machine capable of preventing a backlash phenomenon at the time of unwinding a traction member from a rotating body, and a control device and a control method thereof.

MODES FOR CARRYING OUT THE INVENTION

Hereinafter, an embodiment of the electric hoisting machine according to the present invention will be described in detail with reference to the accompanying drawings.

Figure 1:
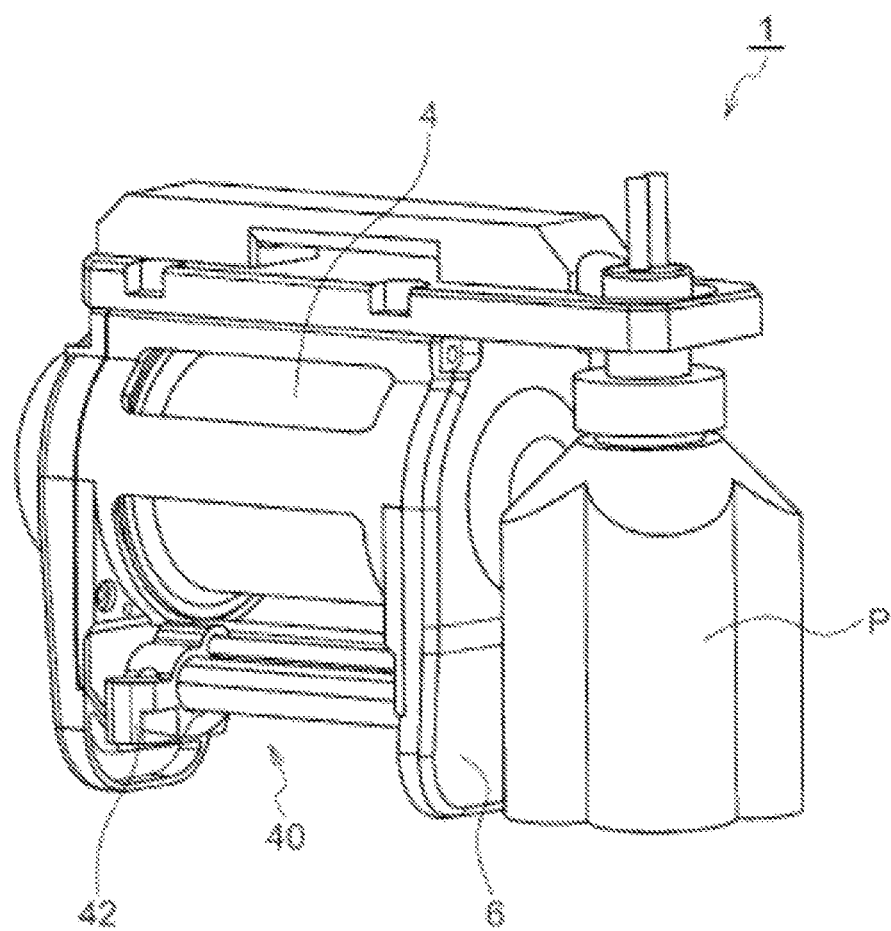
FIG. 1 shows a schematic perspective view indicating an example of an electric hoisting machine.
Figure 2:
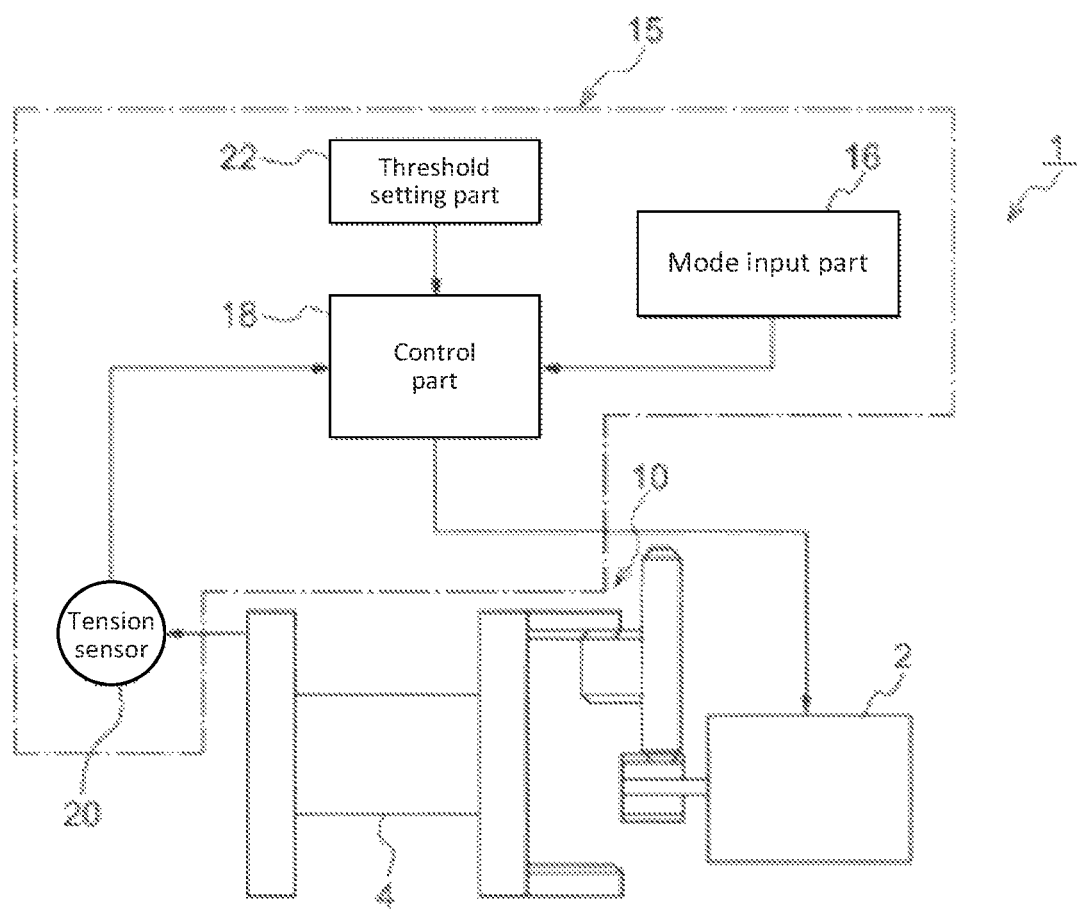
FIG. 2 shows a block diagram of the electric hoisting machine in FIG. 1 (in particular its control device.)

As shown in FIGS. 1 and 2, an electric hoisting machine 1 according to the present embodiment includes an electric motor 2, a cylindrical rotating body 4 that winds and/or unwinds a traction member (not shown in FIGS. 1 and 2) that pulls hoisting objects to be rotated forward and backward by way of the forward and backward rotation drive of the electric motor 2, and a housing 6 that accommodates and holds the rotating body 4. In this case, the rotating body 4 is rotatably supported by the housing 6 via a bearing (not illustrated) and the electric motor 2 may be non-rotatably supported and fixed to the inside of the cylindrical rotating body 4, for example, while being accommodated in a motor housing, and is preferably powered by a power source P removably mounted on the housing 6.

The traction member may be a wire, a chain, a rope, a fishing line or the like, depending on the intended use of the electric hoisting machine 1. The rotating body 4 corresponds to a spool on which a fishing line is wound, for example, when the electric hoisting machine 1 is used as an electric fishing reel.

The electric motor 2 and the rotating body 4 are connected to each other by a power transmission mechanism (power transmission path) 10 so as to be able to transmit power to each other. In this case, the power transmission mechanism 10 may include a bidirectional clutch that transmits the rotation of the electric motor 2 to the rotating body 4 side but does not transmit the rotation of the rotating body 4 to the electric motor 2 side, or may have a deceleration mechanism that reduces the power from the electric motor 2 and transmits the reduced power to the rotating body 4.

The electric hoisting machine 1 according to the present embodiment is provided with a level winding device 40 for winding a traction member in parallel with the rotating body 4. The level winding device 40 is configured such that when the electric motor 2 is rotationally driven, a guide body 42 that passes through the traction member unwound from the rotating body 4 moves reciprocally from side to side in conjunction with the rotation of the electric motor 2, and has a function of evenly winding the traction member around the rotating body 4 in accordance with the winding operation of the traction member.

Further, as shown in FIG. 2, the electric hoisting machine 1 according to the present embodiment includes a control device 15 having: a tension sensor 20 as a tension detection part for detecting a tension of a traction member; a mode input part 16 for inputting a mode switching signal for switching between a winding mode for winding the traction member on the rotating body 4 by way of the forward rotation of the rotating body 4, and an unwinding mode for unwinding the traction member from the rotating body 4 by way of the backward rotation of the rotating body 4; and a control unit 18 for receiving a detection signal from the tension sensor 20 and a mode switching signal from the mode input part 16 and controlling the operation of the electric motor 2 in response to the mode switching signal.

Here, as the tension sensor 20, a strain gauge that converts a strain of a member subjected to a tension into a change in electric resistance may be given as an example. Other examples are those using a piezoelectric element which is detected by converting a pressure applied to a member subjected to a tension into a voltage, a system which detects an equilibrium position between a linear spring and a tension by a position sensor and a magnetostrictive sensor which detects a change in magnetic permeability due to a magnetostrictive effect generated when a tension is applied to a ferromagnetic material. The mode input part 16 includes, for example, a mode operation switch attached to the electric hoisting machine main body. The mode operation switch may be attached to an operation part configured separately from the electric hoisting machine, and the operation part and the electric hoisting machine may wirelessly communicate with each other. In addition, publicly known input methods such as voice input and motion input can be used as well as switch operation. Further, the mode input part 16 may use a method of automatically switching the mode when a predetermined condition is detected by a microcomputer and various detection equipment, in addition to switching the mode according to the intention of the user.

The control unit 18 of the control device 15 controls the rotation of the rotating body 4 via the electric motor 2 in accordance with the detection signal from the tension sensor 20 when the mode is set to the unwinding mode by the mode switching signal received from the mode input part 16. More specifically, in the present embodiment, at the time when set to the unwinding mode, the control unit 18 controls the electric motor 2, so that the rotating body 4 is rotated backward when a tension of the traction member is equal to or greater than a predetermined threshold value and the rotating body 4 is prevented from being rotated backward when a tension of the traction member falls below the predetermined threshold value.

Figure 3:
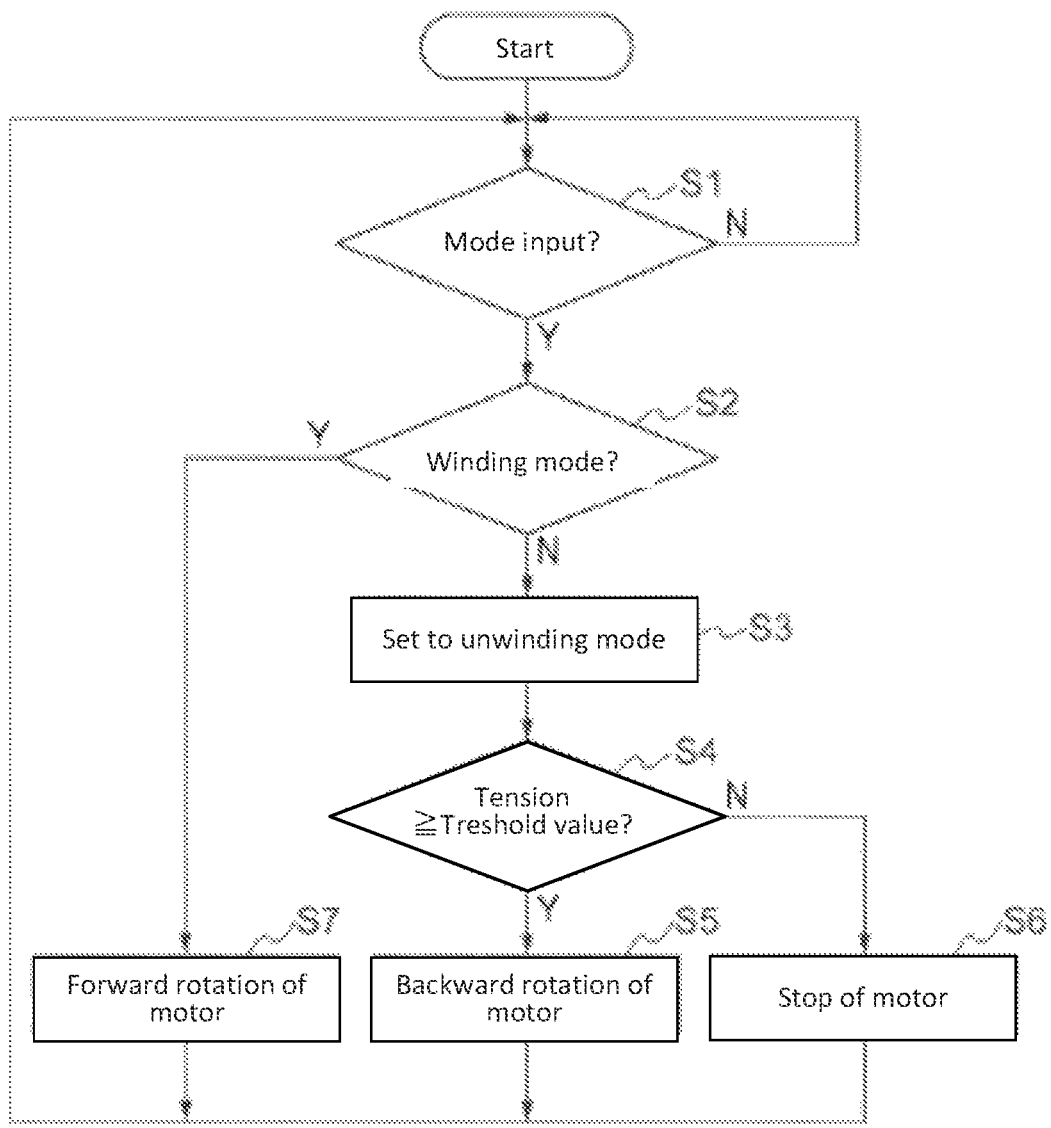
FIG. 3 shows a flowchart indicating a control action of the control device in FIG. 2.

More specifically, the control unit 18 executes control steps as shown in FIG. 3, for example. That is, first, the control unit 18 determines whether or not a mode switching signal is input from the mode input part 16 (step S1.) When a mode switching signal is input from the mode input part 16, the control unit 18 determines whether or not the input signal is a mode switching signal corresponding to the winding mode (step S2.) When the determination result is the winding mode (in the case of YES) the control unit 18 makes the electric motor 2 rotate forward (step S7) to have the rotating body 4 drive in the normal direction, thereby winding the traction member on the rotating body 4, which causes an object connected to the traction member to be hoisted, for example.

On the other hand, when the determination result in step S2 is not the winding mode (in the case of NO) the control unit 18 sets the operation mode of the electric motor 2 to the unwinding mode (step S3) and receives the detection signal from the tension sensor 20. Then, based on the detection signal from the tension sensor 20, the control unit 18 determines whether or not a tension of the traction member is equal to or greater than a predetermined threshold value (step S4) and when a tension of the traction member is equal to or greater than a predetermined threshold value (in the case of YES) the electric motor 2 is rotated backward (step S5) to drive the rotating body 4 backward, and unwind the traction member from the rotating body 4. Thereby, for example, an object connected to the traction member is lowered. On the other hand, when a tension of the traction member falls below the predetermined threshold value (in the case of NO) the control unit 18 stops the drive of the electric motor 2 (step S6) to prevent the rotating body 4 from rotating, and controls the further unwinding of the traction member from the rotating body 4.

As described above, according to the control device 15 of the electric hoisting machine 1 of the present embodiment, when set to the unwinding mode, the rotating body 4 is rotated backward when a tension of the traction member is equal to or greater than a predetermined threshold value, and the electric motor 2 is controlled, so that the rotating body 4 is prevented from being rotated backward when a tension of the traction member falls below a predetermined threshold value, which makes it possible to suppress or avoid a situation in which the rotational speed of the electric motor 2 becomes faster than the tensile speed when the traction member is manually pulled together with the backward rotation of the electric motor 2 and therefore, the unwinding operation of the traction member can be smoothly performed while suppressing the occurrence of a so-called backlash phenomenon in which the traction member is loosened and slackened (in turn, pulling the traction member alone makes it possible to unwind (pull) the traction member by arbitrary length while suppressing the occurrence of the backlash.)

Figures 5A, 5B, 5C:
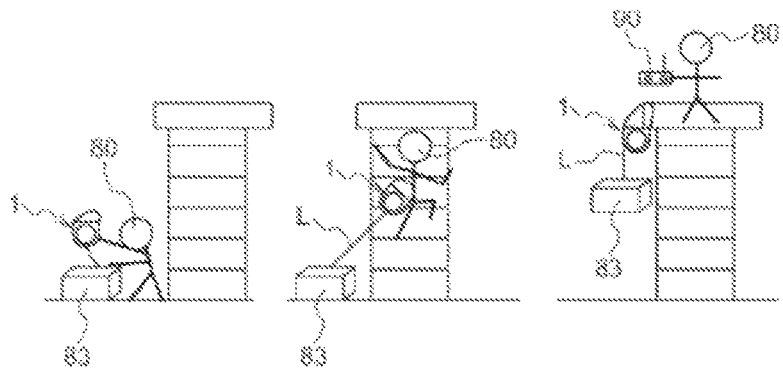
FIGS. 5(a)-5(c) show diagrams indicating an example of a usage pattern of an electric hoisting machine.
Figures 6A, 6B, 6C, 6D:
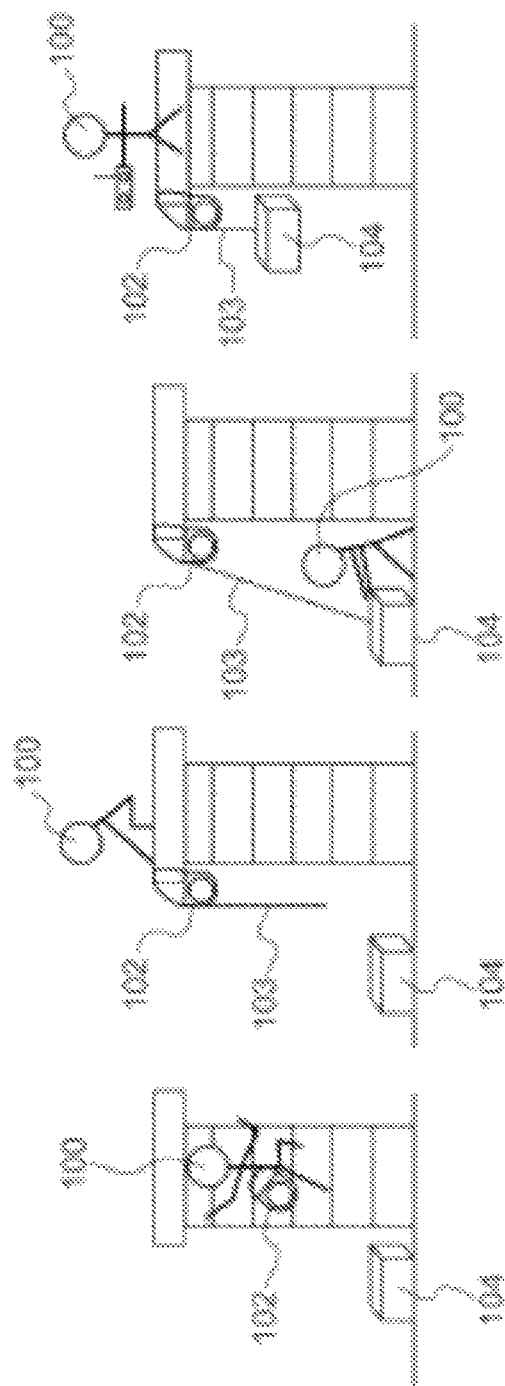
FIGS. 6(a)-6(d) show diagrams indicating an example of a usage pattern of a conventional electric hoisting machine.

Therefore, for example, when tying an object to be lifted and lowered and a traction member, and lifting the object upstairs by the electric hoisting machine 1, the operator can avoid performing burdensome task (consideration or burdensome tasks for avoiding a backlash phenomenon) of successfully synchronizing the operation of the electric motor 2 and the pulling operation of the traction member, which makes it possible to perform the hoisting operation efficiently in a short time (workability is improved.) For example, as shown in FIG. 5, when tying the object 83 to be lifted and lowered and a traction member L and lifting the object upstairs by the electric hoisting machine 1, the operator 80 can (a) tie the traction member L to the object 83 downstairs and then (b) go upstairs with the electric hoisting machine 1 while unwinding the traction member L from the rotating body 4 with the electric hoisting machine 1 set to the unwound mode by the mode input part 16 (this can avoid the occurrence of a backlash phenomenon) (c) set the electric hoisting machine 1 to the winding mode by the mode input part 16 (illustrated as a remote controller 90) upstairs and hoist the downstairs object 83 with the electric hoisting machine 1.

It should be noted that, in the case of an electric hoisting machine having a clutch or an adjustable torque limiter (drag device), the same work can be performed by adjusting these functions. However, the installation of the clutch and the torque limiter (drag device) causes an increase in the weight, size and cost of the entire device, which is a great disadvantage as a portable electric hoisting machine. With the control device of the present invention, since the above-described work can be performed by adding a tension detection part, it is possible to reduce the size, weight and cost of the entire device.

Further, in the present embodiment, it is preferable that the control unit 18 limits the speed of the backward rotation of the rotating body 4 to a predetermined speed or less in the unwinding mode. By doing so, even when the winding mode is mistakenly switched to the unwinding mode, it is possible to prevent the object from falling abruptly and rapidly (e.g., the object hits a passerby downstairs or the like.)

In addition, in the present embodiment, it is preferable that the control unit 18 does not accept the mode switching signal to the winding mode from the mode input part 16 during the backward rotation of the rotating body 4 in the unwinding mode. By doing so, it is possible to prevent a dangerous state in which, for example, when performing the work as shown in FIG. 5, the mode is mistakenly (carelessly) switched to the winding mode and the operator is pulled downstairs, in particular, while the operator is going up stairs in the unwinding mode (see FIG. 5(*b*.))

In the present embodiment, it is preferable that the control device 15 further includes a threshold setting part 22 for setting a threshold value of tension. When such a threshold setting part 22 is provided, the threshold value can be changed as necessary, so that the control device 15 can also act as an electronic drag function, which makes it possible to finely adjust the workability.

Figure 4:
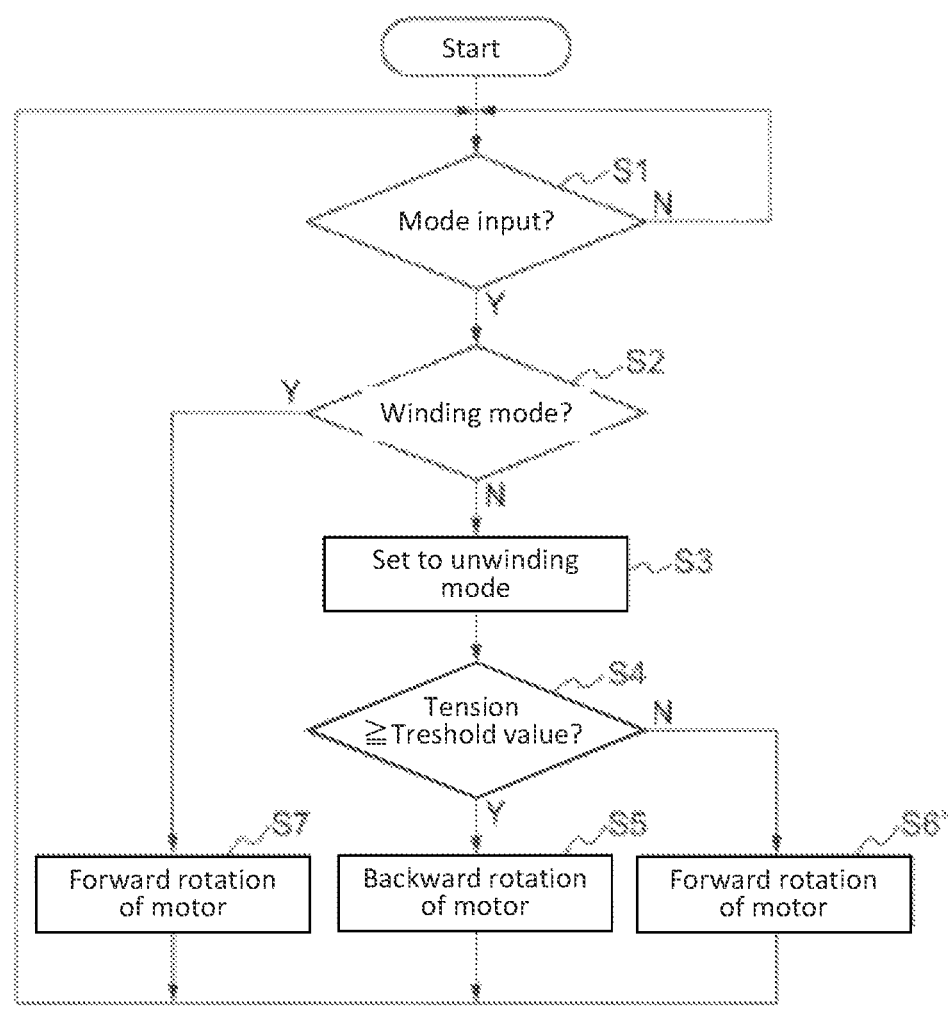
FIG. 4 shows a flowchart indicating another control action of the control device in FIG. 2.

FIG. 4 shows a modification of the control steps by the control unit 18. As illustrated, in this modification, step S6 in FIG. 3 is replaced with step S6'. That is, in the unwinding mode, when a tension of the traction member falls below a predetermined threshold value (when the determination in step S4 is NO) the control unit 18 causes the electric motor 2 to rotate forward to drive the rotating body 4 in the normal direction, thereby winding the traction member around the rotating body 4. According to such control, it is possible to suppress the slack of the traction member during the unwinding mode (winding up the slack when it occurs) and prevent the tangling or slack of the traction member (for example, the tangling of the traction member itself, between the traction member and the operator, and between the traction member and the surrounding objects.)

In the embodiment described above, the structure of the mode input part, the threshold setting part and the tension sensor can be arbitrarily set, and the control device 15 may be integrated with or separate from the electric hoisting machine 1. In addition, the electric hoisting machine 1 mounted on a drone can further be used to take loads down from, or hoist loads onto, the drone in the air.

Incidentally, in the case where the electric hoisting machine for unwinding and winding a traction member from or on a rotating body by way of the forward and backward rotation of an electric motor is a battery-driven type, that is, in the case where an object is hoisted or lowered by winding up or unwinding a traction member onto or from an electric motor which operates on a battery as an electronic power supply, a problem associated with the battery running out must be considered.

In this connection, for example, in the case of lifting and lowering an object, for example, a load by hoisting and lowering a traction member with a battery-driven electric hoisting machine, the driving in the loading direction is generally under heavier load (and therefore a larger current) than the driving in the unloading direction and therefore, the battery drain (voltage reduction of the battery) is larger during the loading driving (when the current is large) so that there may be a significant difference in the severity of the problem faced in the event of the battery exhaustion (for example, depending on whether battery exhaustion occurs during loading or unloading driving.)

That is, in the case where the battery runs out when a traction member is completely wound on the rotating body, what cannot be done is only to perform a subsequent unloading operation, but if the battery runs out while the traction member is wound on, or unwound from, a rotating body, the load is left suspended by the traction member from the electric hoisting machine, and if the battery cannot be replaced or charged, the collection of the load is hindered. In particular, considering that the loading driving is under heavier load (and therefore a larger current) than the unloading driving as described above, the unloading drive is often continued even immediately before the battery runs out and therefore, the unloading can be completed depending on the remaining battery level, but depending on the then unwound amount of the traction member (remaining battery level) the battery runs out at the time of the subsequent loading driving, which may make it difficult or impossible to collect the load.

Therefore, it is necessary to infer the time of battery exhaustion to prevent the battery exhaustion in the middle of winding or unwinding of a traction member, but the time of battery exhaustion (the time when the battery is completely discharged and the remaining battery level becomes zero (loss of electro-motive force)) largely depends not only on the battery charge remaining (remaining electricity storage amount) but also on the rotational driving direction of the motor (whether or not it is during loading driving (the winding direction of the traction member) which requires a large current or during unloading driving (unwinding direction of the traction member) requiring only a low current) the driving time of the motor (the remaining amount of unwinding or winding of the traction member) and the like. For this reason, it is difficult for the operator to estimate the time when the battery runs out only from the remaining battery level.

In view of the above, in a battery-driven electric hoisting machine, it is extremely important to minimize the occurrence of a situation in which it becomes difficult to collect the object while hoisted or lowered by the traction member by automatically determining whether or not to continue to unwind and/or wind the traction member, whether or not to prohibit the next unwinding and/or winding operation in advance, and the like by estimating the time when the battery runs out on the machine side.

Therefore, an explanation will be given below about a battery-driven electric hoisting machine capable of minimizing the occurrence of a situation in which it becomes difficult to collect an object while hoisted and lowered by the traction member. Throughout the following specification and drawings, the same reference numerals are assigned to the same components as those in the embodiments described above with reference to FIGS. 1 to 6.

Figure 7:
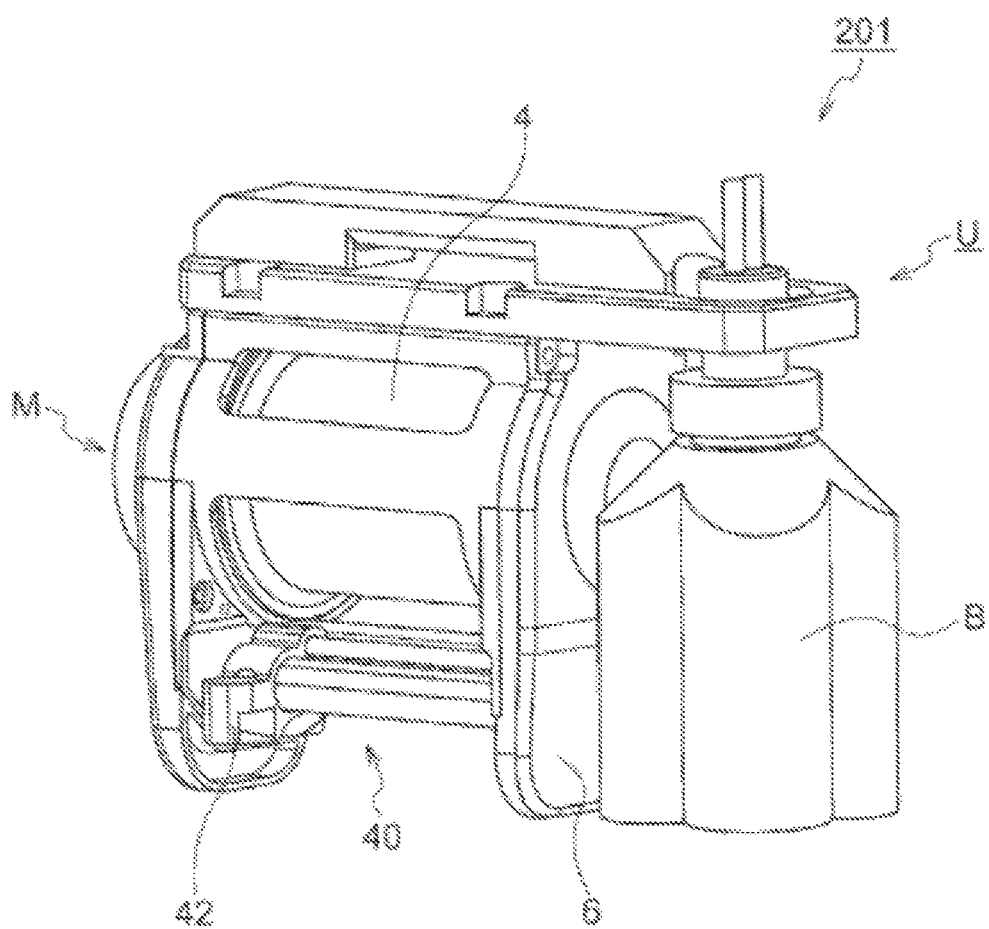
FIG. 7 shows a schematic perspective view indicating an example of a battery-driven electric hoisting machine.
Figure 8:
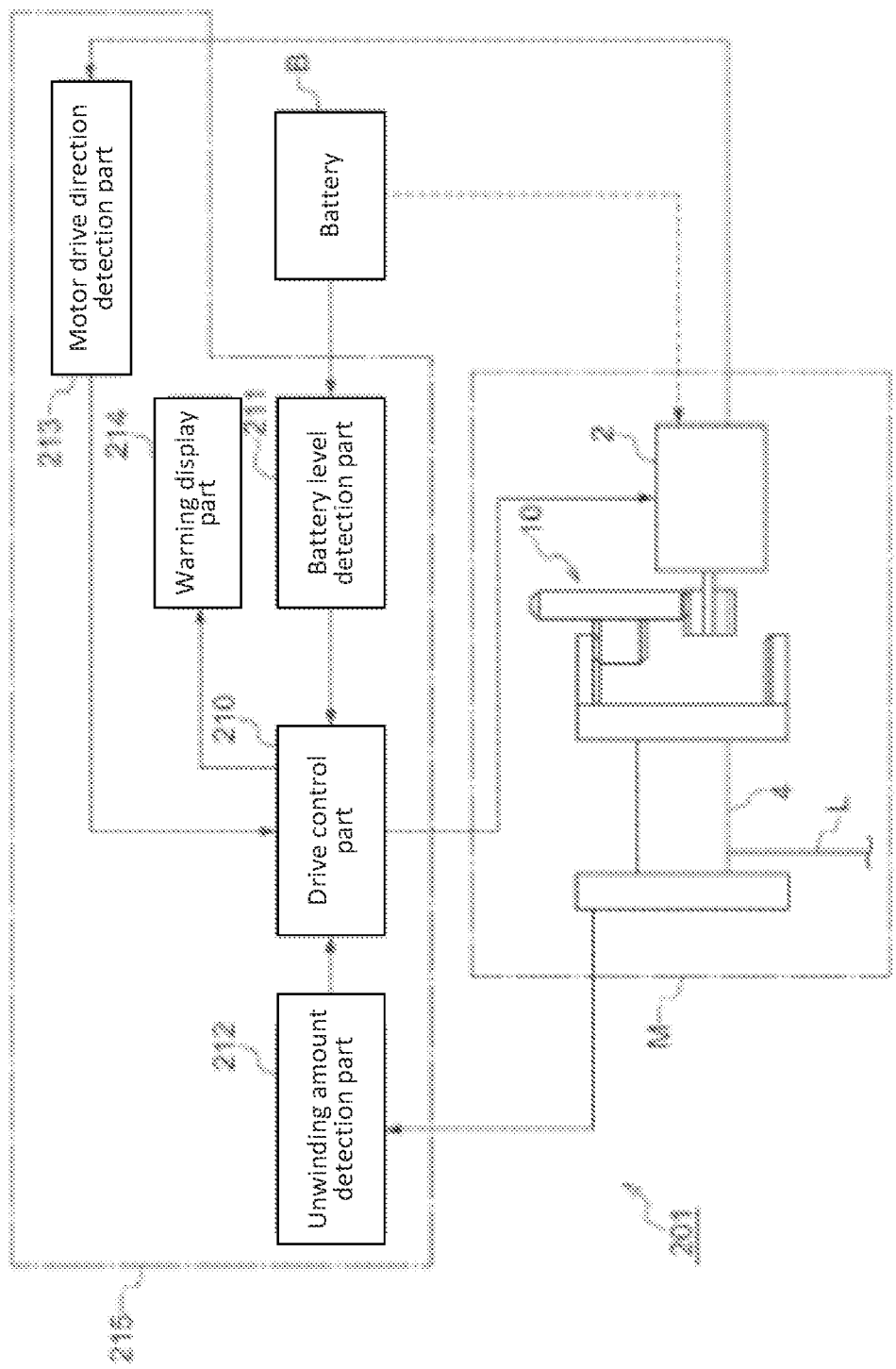
FIG. 8 shows a block diagram of the battery-driven electric hoisting machine in FIG. 7 (in particular a control device.)

As shown in FIGS. 7 and 8, a battery-driven electric hoisting machine 201 includes the electric motor 2, the cylindrical rotating body 4 that winds and/or unwinds the traction member L (see FIG. 8) that is rotated forward and backward by way of the forward and backward rotation drive of the electric motor 2 to pull the hoisting object, and the housing 6 that accommodates and holds the rotating body 4. In this case, the rotating body 4 is rotatably supported by the housing 6 via a bearing (not illustrated), and the electric motor 2 for rotationally driving the rotating body 4 may be non-rotatably supported and fixed to the inside of the cylindrical rotating body 4, for example, while being accommodated in a motor housing, and is preferably powered (power is supplied) by, for example, a rechargeable power source (a "battery B") removably mounted on the housing 6, for example. That is, in the battery-driven electric hoisting machine 1, the rotating body 4 is rotated forward and backward by way of the forward and backward rotation drive of the electric motor 2 by the power supply from the battery B, and the traction member L is wound on and unwound from the rotating body 4.

The traction member L may be a wire, a chain, a rope or the like, depending on the intended use of the battery-driven electric hoisting machine 1.

The electric motor 2 and the rotating body 4 are connected to each other by a power transmission mechanism (power transmission path) 10 so as to be able to transmit power. In this case, the power transmission mechanism 10 may include a bidirectional clutch that transmits the rotation of the electric motor 2 to the rotating body 4 side but does not transmit the rotation of the rotating body 4 to the electric motor 2 side, or may include a deceleration mechanism that reduces the power from the electric motor 2 and transmits the reduced power to the rotating body 4.

A battery-driven electric hoisting machine 201 is provided with the level winding device 40 for winding the traction member L in parallel with the rotating body 4. The level winding device 40 is configured such that when the electric motor 2 is rotationally driven, the guide body 42 that passes through the traction member L unwound from the rotating body 4 moves reciprocally from side to side in conjunction with the rotation of the electric motor 2, and has a function of winding the traction member L evenly around the rotating body 4 in accordance with the winding operation of the traction member L.

Further, as shown in FIG. 8, the battery-driven electric hoisting machine 201 includes a control device 215 having: a drive control unit 210 for controlling the drive of the electric motor 2; a remaining battery level detection part 211 for detecting the remaining level of the battery B; a motor drive direction detection part 213 for detecting the rotational driving direction of the electric motor 2; and an unwinding amount detection part 212 for detecting the amount of the traction member L unwound from the rotating body 4. In addition, the battery-driven electric hoisting machine 201 further includes a warning display part 214 that warns and displays a warning when the remaining level of the battery B becomes equal to or less than a threshold value, as described later. The warning display part 214 may or may not be included in the control device 215 as illustrated.

In this configuration, a hoisting machine main body M having the rotating body 4 and the electric motor 2, the control device 215 having the drive control unit 210, the motor drive direction detection part 213, the remaining battery level detection part 211, and the unwinding amount detection part 212, and the battery B form an integrated part U. In this case, the control device 215 is incorporated in the housing 6, for example.

Here, an example of the drive control unit 210 is a general known controller such as a CPU. The remaining battery level detection part 211 for detecting the remaining level of the battery B may be, for example, a method of detecting the remaining level of the battery B based on a voltage drop of the battery B. In this case, a configuration in which a potential difference of the battery B is directly read or a configuration in which a potential difference of the shunt resistor provided in an electric circuit is read may be given as examples. In addition, there are a Coulomb counter system for measuring the power usage from full charge by integrating the used current, a battery cell modeling system for correcting the Coulomb counter system by learning the aging change of the battery and the environmental change, and an impedance track system for constantly recording the impedance of the battery. The motor drive direction detection part 213 can be implemented, for example, as follows. That is, since the electric motor 2 used in the present configuration is a DC motor, if a voltage is applied to a terminal in the forward direction, the electric motor 2 rotates forward, and if a voltage is applied in the backward direction, the electric motor 2 rotates backward. Therefore, the driving direction of the electric motor 2 can be detected by detecting whether the voltage is applied forward or backward to the terminal. That is, the driving part itself of the electric motor 2 also serves as the motor drive direction detection part 213. Further, the unwinding amount detection part 212 for detecting the amount of the traction member L unwound from the rotating body 4 can be realized, for example, by attaching a rotary encoder to the rotating body 4. If the elongation and the slack of the traction member L are ignored, the unwinding amount of the traction member L is uniquely determined by the amount of rotation of the rotating body 4 and thus, can be measured by detecting the rotation by the rotary encoder.

In the above-described configuration, when the remaining level of the battery B is detected to be equal to or less than a predetermined threshold value based on the detection information from the remaining battery level detection part 211, the drive control unit 210 of the control device 215 restricts the drive of the electric motor 2, and changes the threshold value (lowers or raises the threshold value) based on the detection information from the motor drive direction detection part 213 and/or from the unwinding amount detection part 212. In this case, the threshold value may be an activatable voltage serving as a standard for permitting the activation of the electric motor 2, and when the output voltage of the battery B is detected to be equal to or less than the activatable voltage based on the detection information from the remaining battery level detection part 211, the drive control unit 210 restricts the drive of the electric motor 2 (for example, prohibits the drive of the electric motor 2 that restricts the rotational driving direction of the electric motor 2 to only one direction.)

Figure 9:
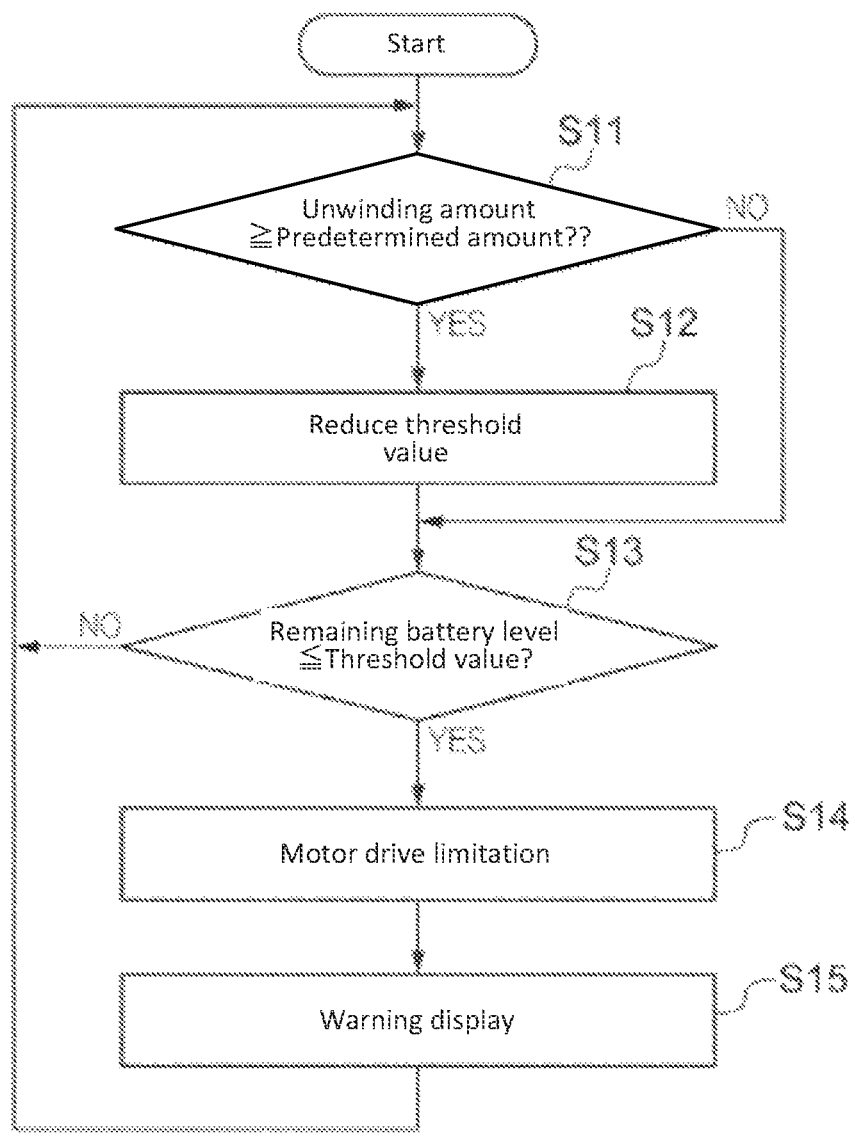
FIG. 9 shows a flowchart indicating a control action of the control device in FIG. 8.

More specifically, the drive control unit 210 executes control steps as shown in FIG. 9, for example. That is, first, the drive control unit 210 determines whether or not the amount of the traction member L unwound from the rotating body 4 is equal to or greater than a predetermined amount based on the detection information from the unwinding amount detection part 212 (step S11.) As a result, when the amount of the traction member L unwound from the rotating body 4 is equal to or greater than a predetermined amount (when the determination in step S11 is YES) the drive control unit 210 lowers the threshold value (step S12.) For example, in the case where the activatable voltage is set to 11V when the unwinding amount of the traction member L is equal to or less than 5 m, the threshold value is stepwise lowered such that when the unwinding amount of the traction member L is within the range of 5 to 20 m, the activatable voltage is lowered to 10 5V, and when the unwinding amount of the traction member L is equal to or greater than 20 m, the activatable voltage is lowered to 10V.

On the other hand, when the amount of the traction member L unwound from the rotating body 4 is not equal to or more than a predetermined amount (when the determination in step S11 is NO) the drive control unit 210 maintains and does not change the current threshold value.

Next, the drive control unit 210 determines whether or not the remaining level of the battery B is equal to or less than a predetermined threshold value based on the detection information from the remaining battery level detection part 211 (step S13.) As a result, when the remaining level of the battery B is equal to or less than a predetermined threshold value (when the determination in step S13 is YES) the drive control unit 210 restricts the drive of the electric motor 2 (step S14.) For example, in this case, the subsequent driving of the electric motor 2 is prohibited. Alternatively, when the remaining level of the battery B is equal to or less than a predetermined threshold value, the drive control unit 210 may cause the warning display part 214 to display a warning after the electric motor 2 is rotated in the winding direction of the traction member to forcibly wind the traction member L by a predetermined amount onto the rotating body 4 (step S15.) Of course, the driving of the electric motor 2 may be prohibited by driving (or without driving) the electric motor 2 in the winding direction of the traction member after the display of the warning, or the driving of the electric motor 2 may be prohibited by driving (or without driving) the electric motor 2 in the winding direction of the traction member simultaneously with the display of the warning.

As described above, according to the battery-driven electric hoisting machine 201 having the above-mentioned configuration, when the remaining level of the battery B is detected to be equal to or less than a predetermined threshold value, the driving of the electric motor 2 is restricted, that is, signs of battery exhaustion are detected in advance to restrict the driving of the electric motor 2; therefore, it is possible not only to prevent the battery from running out while the traction member L is being wound on, or unwound from, the rotating body 4 (a situation in which a hoisting object is left suspended by the traction member L from the electric hoisting machine) but also to find the timing of battery exhaustion, which can fluctuate depending on the situation, with high accuracy and take appropriate measures, such as automatically determining whether or not to continue the unwinding and/or winding of the traction member L, and whether or not to prohibit the next unwinding and/or winding operation in advance, as shown in the above-mentioned flow chart because the threshold value is changed based on the rotational driving direction of the electric motor 2 and/or the unwinding amount of traction member L that affect the timing of battery exhaustion. Therefore, it is possible to minimize the occurrence of a situation in which it becomes difficult to collect an object while hoisted and lowered by the traction member L.

In particular, in the above-described configuration, since the drive control unit 210 lowers a threshold value (relaxes the standard for restricting the driving of the electric motor) when the amount of the traction member L unwound from the rotating body 4 is detected to be equal to or greater than a predetermined amount based on the detection information from the unwinding amount detection part 212, it is possible to continue the unwinding operation of the traction member L without interruption, for example, immediately before the battery runs out while the traction member L is unwound, thereby completing the lowering operation of the object. This is advantageous because for example, it is possible to avoid the occurrence of a situation in which it is difficult to collect the object by winding (forcing the winding drive with a large load (large current)) as the amount of the traction member L unwound from the rotating body 4 is large, and rather, it is possible to continue the unwinding operation of the traction member L with a small load (small current) at the remaining battery level such that the probability that the object can be lowered to a target point is higher, thereby making it difficult to collect the object when hoisted or lowered with the traction member L.

In addition, since the battery-driven electric hoisting machine 201 having the above-described configuration includes the warning display part 214 that warns and displays a warning when the remaining level of the battery B is equal to or less than a threshold value, the operator can notice the battery exhaustion in advance. In the battery-driven electric hoisting machine 201 having the above configuration, the hoisting machine main body M having the rotating body 4 and the electric motor 2, the control device 215 having the drive control unit 210, the motor drive direction detection part 213, the remaining battery level detection part 211 and the unwinding amount detection part 212, and the battery B form an integral unit U. Such unitization enables reduction in size and weight, and is excellent in portability.

Such a battery-powered electric hoisting machine 201 can be used for hoisting and lowering objects such as beddings, packaging, temporary scaffolding, buildings and fishing tools to predetermined positions, and such a machine mounted on a drone can be used to take loads down from, or hoist loads onto, the drone in the air, the fields in which such a machine is used are not limited to those mentioned above.

Figure 10:
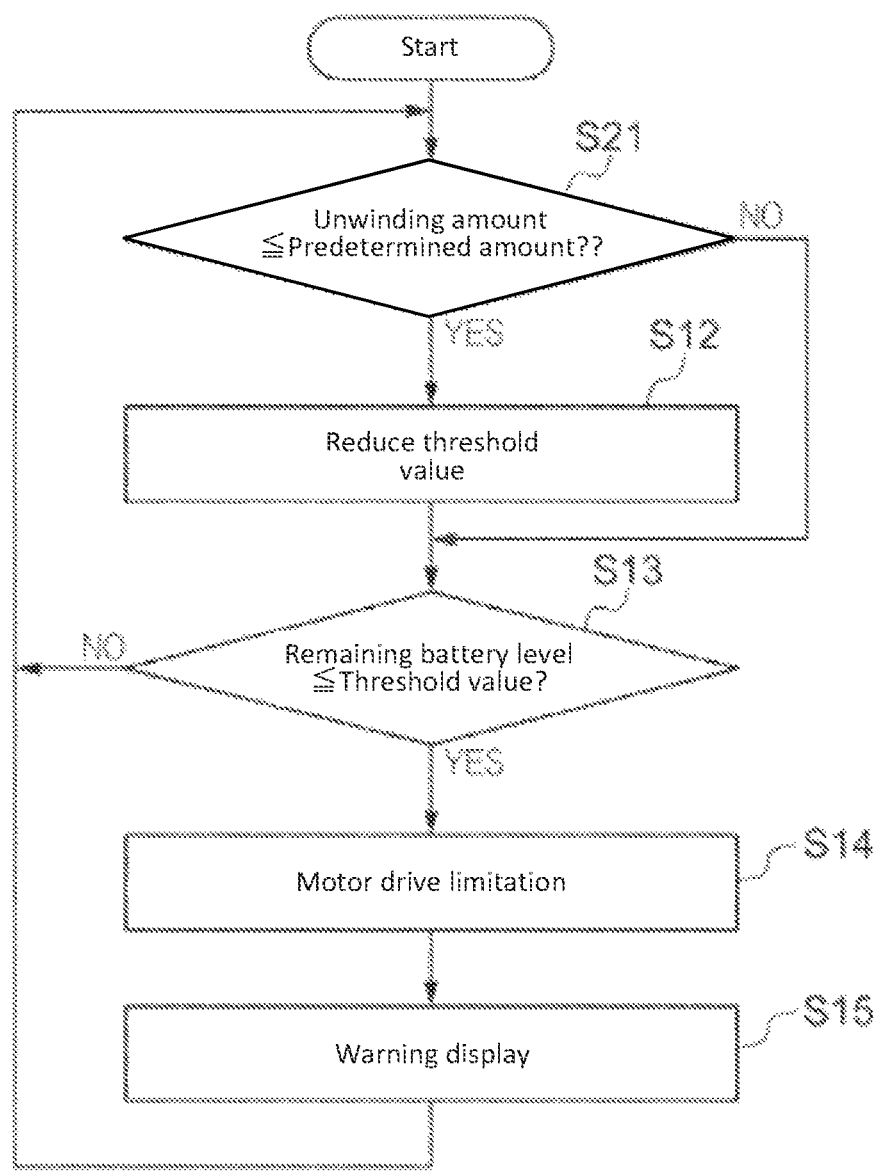
FIG. 10 shows a flowchart indicating another control action of the control devise in FIG. 8.

FIG. 10 shows a first modification of the control step by the drive control unit 210. As illustrated, in this modification, step S11 in FIG. 9 is replaced with step S21. That is, the drive control unit 210 determines whether or not the amount of the traction member L unwound from the rotating body 4 is equal to or less than a predetermined amount based on the detection information from the unwinding amount detection part 212 (step S21.) As a result, when the amount of the traction member L unwound from the rotating body 4 is equal to or less than a predetermined amount (when the determination in step S21 is YES) the drive control unit 210 lowers the threshold value (step S12.) For example, as described above, an activatable voltage may be stepwise lowered over a plurality of ranges of the unwinding amount of the traction member L (e.g., the threshold value may be stepwise increased as the unwinding amount increases.) The subsequent steps S13 to S15 are the same as those in FIG. 9.

In this manner, if the standard for restricting the driving of the electric motor 2 is relaxed by lowering the threshold value when the unwinding amount of the traction member L is equal to or less than a predetermined amount, it is also possible to continue the winding operation of the traction member L without interruption even immediately before the battery runs out, in particular, while the traction member L is being wound up, thereby completing the winding operation of the object. This is advantageous because for example, it is possible to avoid the occurrence of a situation in which it becomes difficult to collect the object while hoisted or lowered by the traction member L by allowing the further winding of the traction member L and completing the winding operation of the object at the remaining battery level such that the battery is about to run out despite the fact that the winding amount of the traction member L is large, and the winding operation is completed soon.

Figure 11:
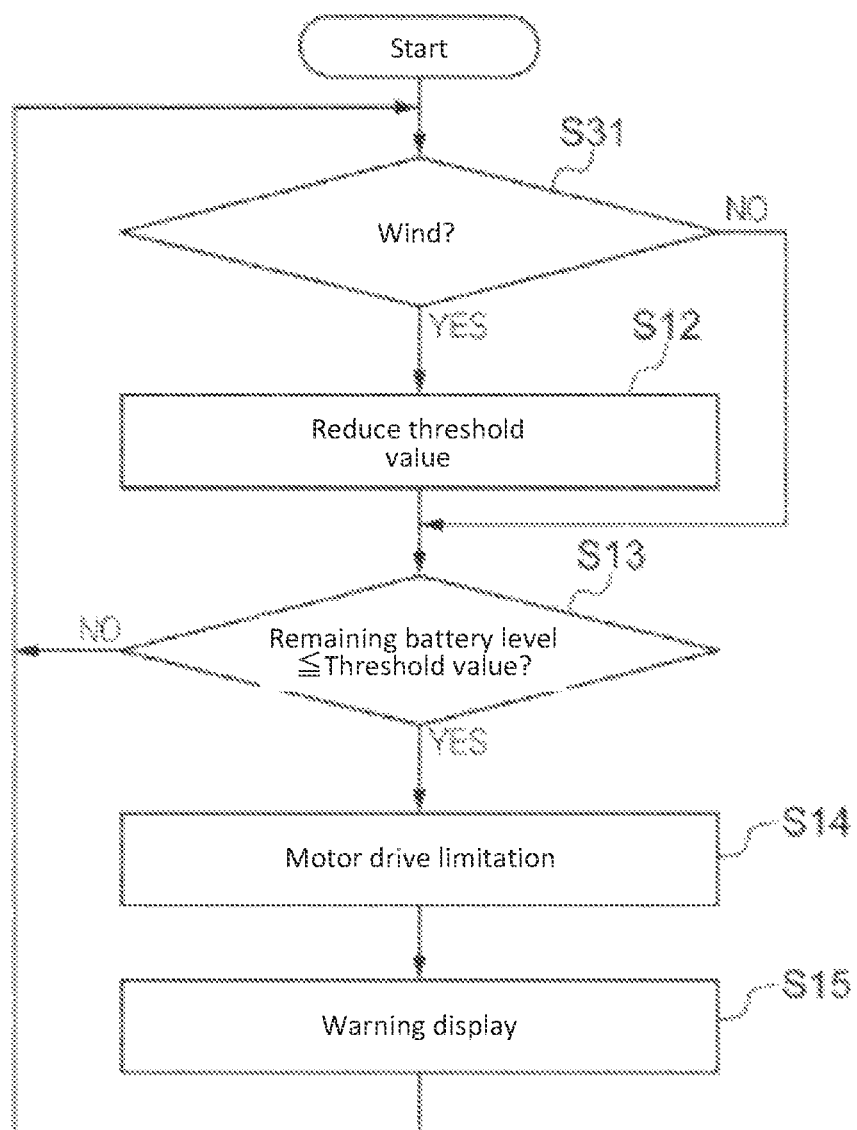
FIG. 11 shows a flowchart indicating another control action of the control devise in FIG. 8.

FIG. 11 shows a second modification of the control step by the drive control unit 210. As illustrated, in this modification, step S11 in FIG. 9 is replaced with step S31. That is, the drive control unit 210 determines whether or not the rotational driving direction of the electric motor 2 detected by the motor drive direction detection part 213 is the traction member winding direction (step S31.) As a result, when the rotational driving direction of the electric motor 2 is the traction member winding direction (when the determination in step S31 is YES) the drive control unit 210 sets the threshold value of this winding direction to be smaller than the threshold value when the rotational driving direction of the electric motor 2 is the traction member unwinding direction (step S12; that is, for example, the threshold value setting table is switched between the winding direction and the unwinding direction (switching between the threshold value setting table of the unwinding direction [for example, the unwinding amount of the traction member is 5 m or less and an activatable voltage is 11 V; the unwinding amount of the traction member is 5 to 20 m and an activatable voltage is 10.5V; and the unwinding amount of the traction is 20 m or more and an activatable voltage is 10V] and the threshold value setting table of the winding direction with the threshold value being set to be smaller than that of the unwinding direction [for example, the unwinding amount of the traction member is 5 m or less and the activatable voltage is 10V; the activatable voltage is 9.5V and the unwinding amount of the traction member is 5 to 20 m; the activatable voltage is 9V and the unwinding amount of the traction member is 20 m or more.]) The subsequent steps S13 to S15 are the same as those in FIG. 9.

In this manner, if the threshold value at the time of winding the traction member is made smaller than that at the time of unwinding the traction member, and the electric motor drive limitation standard at the time of winding the traction member is relaxed more than the electric motor drive limitation standard at the time of unwinding the traction member, it is possible to wind up an object with the winding of the traction member L being prioritized over the unwinding when the remaining battery level is low. This is advantageous because, in particular, it is possible to avoid the occurrence of a situation in which it becomes difficult to collect an object while hoisted and lowered by the traction member L by allowing further winding of the traction member L and completing the winding operation of the object at the remaining battery level such that the battery is about to run out despite the fact that the winding amount of the traction member L on the rotating body 4 is large, and the winding operation is completed soon.

Figure 12:
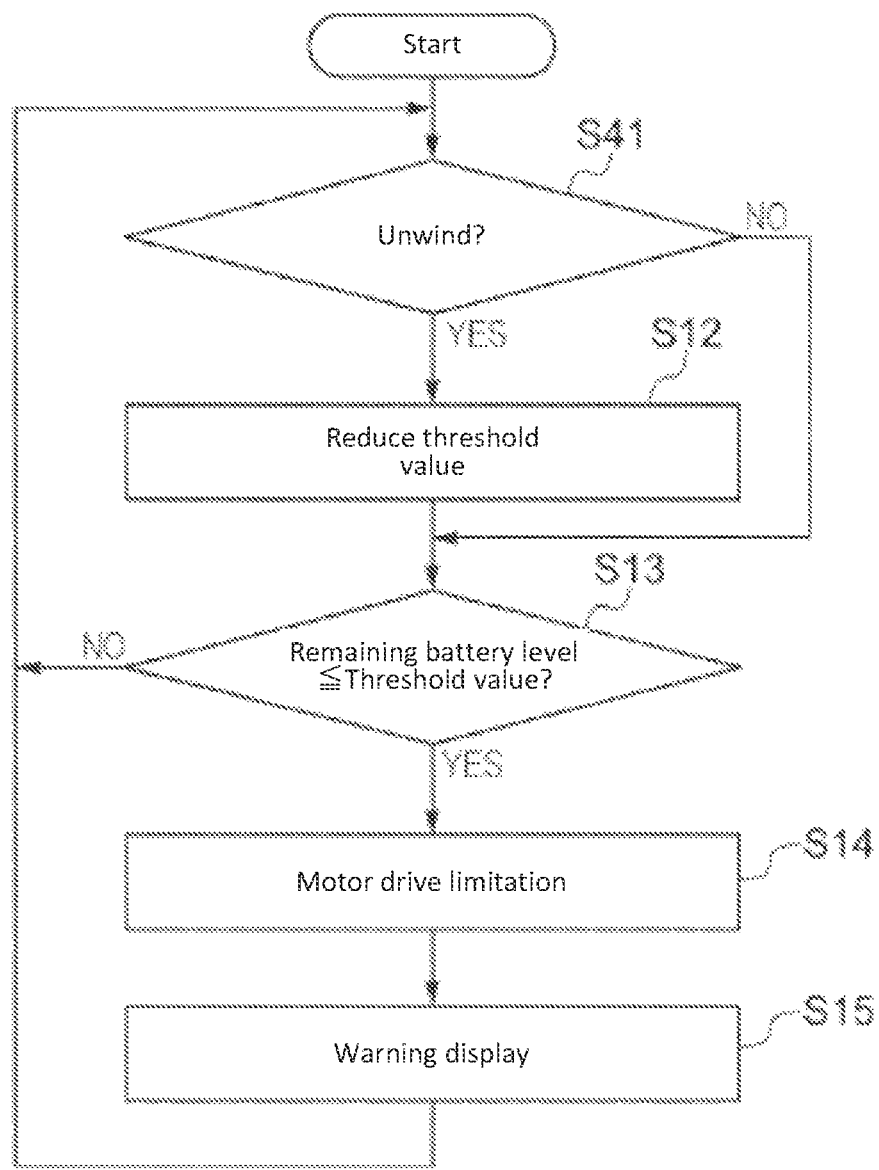
FIG. 12 shows a flowchart indicating another control action of the control devise in FIG. 8.

FIG. 12 shows a third modification of the control step by the drive control unit 210. As illustrated, in this modification, step S11 in FIG. 9 is replaced with step S41. That is, the drive control unit 210 determines whether or not the rotational driving direction of the electric motor 2 detected by the motor drive direction detection part 213 is the traction member unwinding direction (step S41.) As a result, when the rotational driving direction of the electric motor 2 is the traction member unwinding direction (when the determination in step S41 is YES) the drive control unit 210 sets the threshold value of the unwinding direction to be smaller than the threshold value when the rotational driving direction of the electric motor 2 is the traction member winding direction (step S12; that is, for example, switches between the threshold value setting table for the winding direction and the threshold value setting table for the unwinding direction with a threshold value lower than that for the winding direction.) The subsequent steps S13 to S15 are the same as those in FIG. 9.

In this manner, by making the threshold value at the time of unwinding the traction member smaller than that at the time of winding the traction member, so that the electric motor drive limitation standard at the time of unwinding the traction member is relaxed more than that at the time of winding the traction member, it is possible to lower the object by giving priority to the unwinding of the traction member L over the winding when the remaining battery level is small. This is advantageous because it is possible to avoid the occurrence of a situation in which it becomes difficult to collect the object while lifted or lowered by the traction member L by continuing the unwinding operation of the traction member L having a small load (small current) at a remaining battery level at which it is difficult to wind up and collect the object (i.e., forcing the winding driving with a large load (large current)) because the amount of the traction member L unwound from the rotating body 4 is particularly large and rather, the probability that the object can be lowered to a target point is higher.

In the above-described configuration, the driving of the electric motor is limited when the remaining battery level is equal to or less than a predetermined threshold value, but the form of limitation is not limited to the prohibition of driving of the electric motor and can be arbitrarily set, for example, limiting the rotational driving direction of the electric motor to only one direction. Further, in the above-described configuration, the threshold value is changed based on the detection information from the motor drive direction detection part and/or from the unwinding amount detection part, but is changed stepwise, continuously, singly or multiply, the mode of which is not limited. Also, the modifier for changing the threshold value is not limited to a detection value from the motor drive direction detection part and/or from the unwinding amount detection part as described above, and may be changed based on other information, such as a tension of the traction member. In the above-described configuration, both the motor drive direction detection part and the unwinding amount detection part are provided, but only either of the parts may be provided.

Incidentally, as described above, an electric fishing reel for winding a fishing line on a spool by using the driving force of a driving motor is conventionally known as an electric hoisting machine, but some of such electric fishing reels are of a type in which both winding and/or unwinding of the fishing line on the spool are performed electrically by rotating the spool forward and backward by way of the forward and backward rotation drive of the driving motor.

In the electric fishing reel of such a type, a fishing line is wound on a spool by way of the forward rotation drive of a driving motor, and at the time of dropping a device, the driving motor is rotationally driven backward to unwind the fishing line from the spool.

In the electric fishing reel in which a fishing line is unwound from the spool by way of the backward rotation drive of the driving motor as described above, when the unwinding speed of the fishing line unwound (discharged) by the driving motor greatly exceeds the drop speed of a device, a so-called backlash phenomenon in which the fishing line is loosened and slackened, which may cause the line to become tangled or kinked can be prevented.

On the other hand, when the speed of the fishing line discharged by the driving motor falls below the drop speed of the device, it takes longer time to drop the device and the number of fish caught also decreases (it is impossible to increase the discharging speed of the fishing line from the spool by the driving motor.)

Therefore, in order to avoid such inconveniences, it is necessary to synchronize the speed of the fishing line discharged by the driving motor with the drop speed of the device, but in the conventional electric fishing reel, the user (fisherman) synchronizes these speeds by adjusting the output of the driving motor, for example, using a motor output adjusting part, and it was difficult to adjust to changes in a usage environment (e.g., depth, tide) or the like.

Therefore, an electric fishing reel capable of realizing an increase in the discharging speed of a fishing line from a spool by a driving motor (high-speed drop of a device) without causing a backlash phenomenon will be described below.

Figure 13:
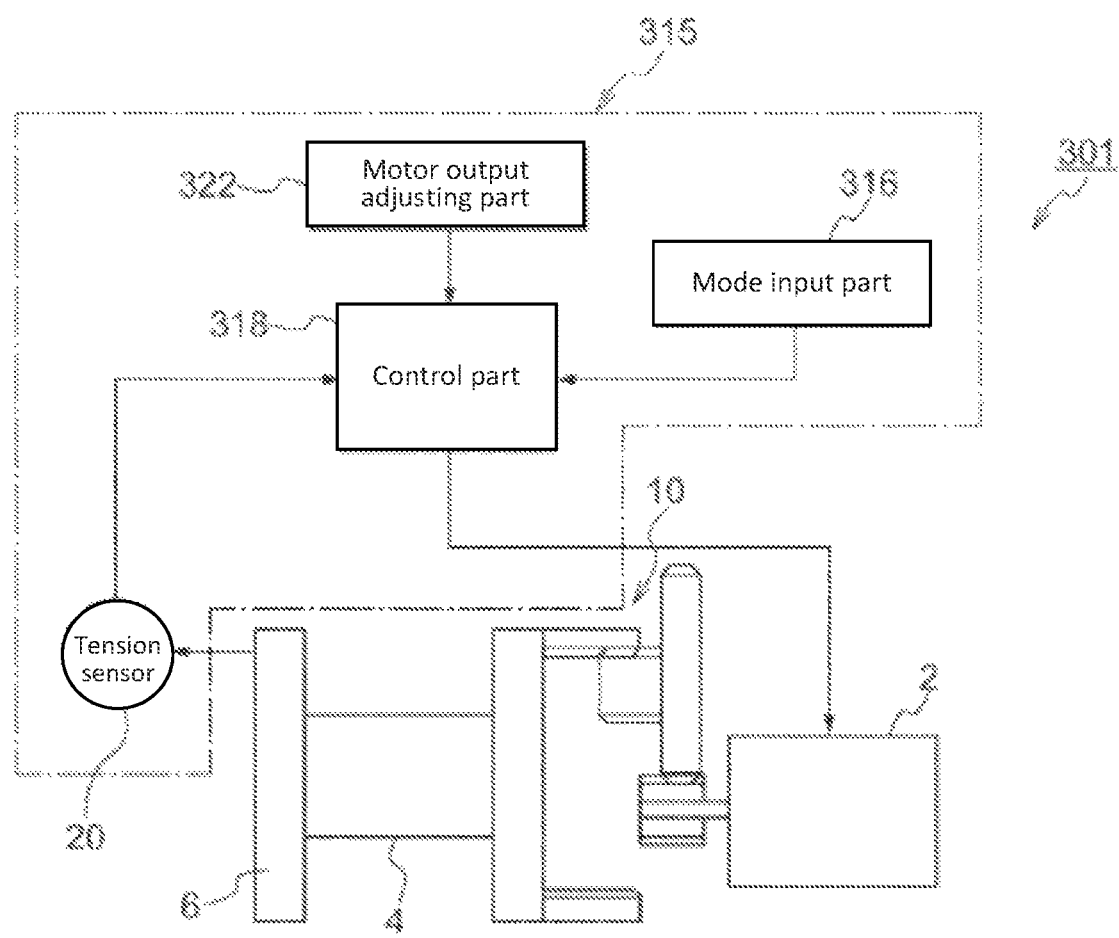
FIG. 13 shows a block diagram of an electric fishing reel (in particular a control device thereof.)

An electric fishing reel 301 according to the present configuration shown in FIG. 13 has the same structure as that in FIG. 1 related to the embodiment described above. That is, as shown in FIGS. 1 and 13, the electric fishing reel 301 includes: the driving motor 2, a spool 4 as a cylindrical rotating body which is rotated forward and backward by way of the forward and backward rotation drive of the driving motor 2 to wind and/or unwind a fishing line (not shown in FIGS. 1 and 13); and a reel body 6 as a housing for accommodating and holding the spool 4. In this case, the spool 4 is rotatably supported by the reel body 6 via a bearing (not illustrated) and the driving motor 2 may be non-rotatably supported and fixed to the inside of the cylindrical spool 4, for example, while being accommodated in a motor housing, and is preferably powered by the power source P removably mounted on the reel body 6.

The driving motor 2 and the spool 4 are connected to each other by the power transmission mechanism (power transmission path) 10 so as to be able to transmit power. In this case, the power transmission mechanism 10 may have a bidirectional clutch that transmits the rotation of the driving motor 2 to the spool 4 side but does not transmit the rotation of the spool 4 to the driving motor 2 side, or may include a deceleration mechanism that reduces the power from the driving motor 2 and transmits the reduced power to the spool 4.

The electric fishing reel 301 according to the present configuration is provided with the level winding device 40 for winding a fishing line in parallel with the spool 4. The level winding device 40 is configured such that when the driving motor 2 is rotationally driven, the guide body 42 that passes through the fishing line unwound from the spool 4 moves reciprocally from side to side in conjunction with the rotation of the driving motor 2, and has a function of winding the fishing line evenly around the spool 4 in accordance with the winding operation of the fishing line.

Further, as shown in FIG. 13, the electric fishing reel 301 according to the present configuration comprises a control device 315 including: a motor output adjusting part 322 (for example, a lever member or a dial member provided on the reel body 6 at a position operable by a finger of a hand holding the reel body 6; not shown in FIG. 1) for adjusting the motor output of the driving motor 2; the tension sensor 20 as a tension detection part for detecting a tension of the fishing line; a mode input part 316 for inputting a mode switching signal for switching between a normal mode in which a voltage corresponding to a signal input from the motor output adjusting part 322 is supplied to the driving motor 2, and a fast-drop mode in which a voltage supplied to the driving motor 2 is adjusted based on a tension of the fishing line at the time of backward rotation drive of the driving motor 2; and a control unit 318 for controlling the operation of the driving motor 2 by receiving a detection signal from the tension sensor 20, a mode switching signal from the mode input part 316, and an input signal from the motor output adjusting part 322

Here, the tension sensor 20 is similar to the tension sensor 20 of the previous embodiment shown in FIG. 2. The mode input part 316 includes, for example, a mode operation switch attached to the reel body 6. The mode operation switch may be attached to an operation part configured separately from the electric fishing reel 301, and the operation part and the electric fishing reel 301 may perform wireless communication. In addition, publicly-known input methods such as voice input and motion input can be used as well as switch operation. Further, the mode input part 316 may use a method of automatically switching modes when predetermined conditions are detected by a microcomputer and various detection equipment, in addition to switching modes according to the intention of the user.

The control unit 318 of the control device 315 supplies a voltage corresponding to a signal input from the motor output adjusting part 322 to the driving motor 2 when set to a normal mode by a mode switching signal, supplies a voltage lower than that corresponding to a signal input from the motor output adjusting part 322 to the driving motor 2 when a tension T detected by the tension sensor 20 falls below the first threshold value T1 at the time of the backward rotation drive of the driving motor 2 for unwinding a fishing line when set to a fast-drop mode by the mode switching signal, and supplies a voltage higher than that corresponding to a signal input from the motor output adjusting part 322 to the driving motor 2 when the tension T detected by the tension sensor 20 is higher than the second threshold value T1 larger than the first threshold value T1. In this case, the first threshold value T1 is preferably in the range of, for example, 5 gf to 100 gf, and the second threshold value T2 is preferably in the range of, for example, 1.5 to 10 times T1. If the first threshold value T1 is too large, the drop speed cannot be sufficiently increased. Further, if the first threshold value T1 is too small, there are problems such as an increased risk of occurrence of line tangling when subjected to external disturbance or the like, and increasing required accuracy of the tension sensor, which leads to an increase in cost.

Further, the control unit 318 may automatically be switched to a normal mode at the time of winding a fishing line. This is because, at the time of winding, the risk of occurrence of line tangling does not increase even if the rotation speed of the driving motor 2 is increased and therefore, it is obvious that a voltage applied to the driving motor 2 is maximized for the fastest winding. Thus, there is less need for a fast-drop mode during winding. On the other hand, as described above, at the time of unwinding a fishing line, if the rotation speed of the driving motor 2 is too high, line tangling occurs and therefore, there is an optimum speed for unwinding the fishing line to achieve the fastest speed. According to the purpose of the user, it is preferable to switch between a fast-drop mode for unwinding the fishing line fastest and a normal mode for unwinding according to a lever operation.

Figure 17:
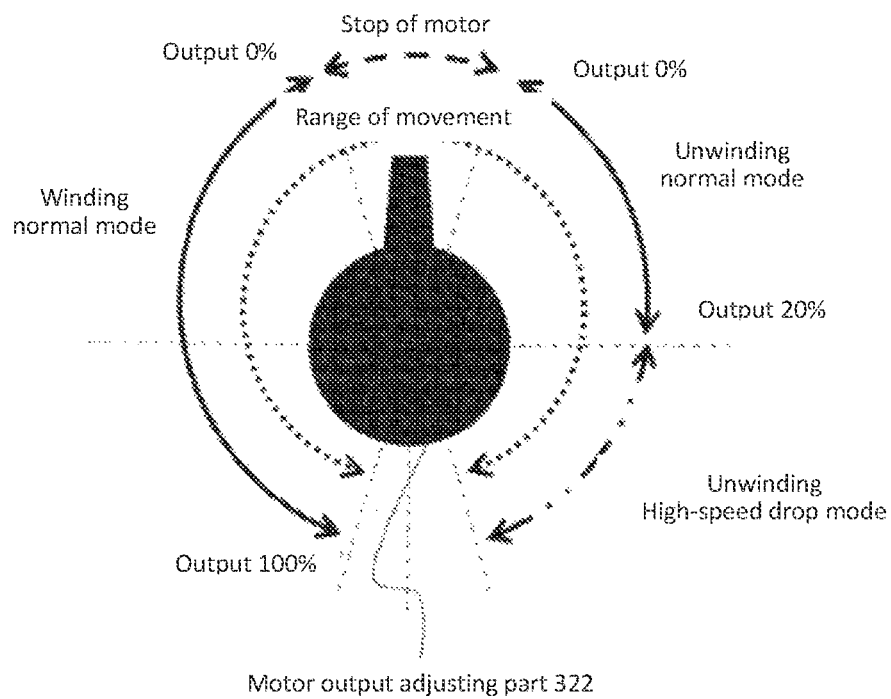
FIG. 17 shows an explanatory diagram illustrating an operation mode of a motor output adjusting part capable of continuously switching between a fast-drop mode and a normal mode.

Further, the fast-drop mode and the normal mode may be continuously switched in accordance with the operation of the motor output adjusting part 322. FIG. 17 shows one example. The motor output adjusting part 322 in FIG. 17 is of a type that adjusts the output by rotating a lever, and the rotatable range of the lever is ±150°. The fast-drop mode is for the lever in the range between +150° and +90°, the normal mode is for the lever is in the range between +90° and −150°, in which when the lever is in the range between +30° and −30°, the driving motor 2 is stopped. The unwinding direction is from +90° to +30°, and the maximum output at this time is limited to, for example, 20% or less, thereby reducing the risk of occurrence of line tangling. The winding direction is from −30° to −150°, and at this time, the output can be used up to 100% with no limitation on the maximum output. With such a configuration, the switching between the fast-drop mode and the normal mode and the adjustment of the output in the normal mode can be continuously performed by the same operation method.

Figure 14:
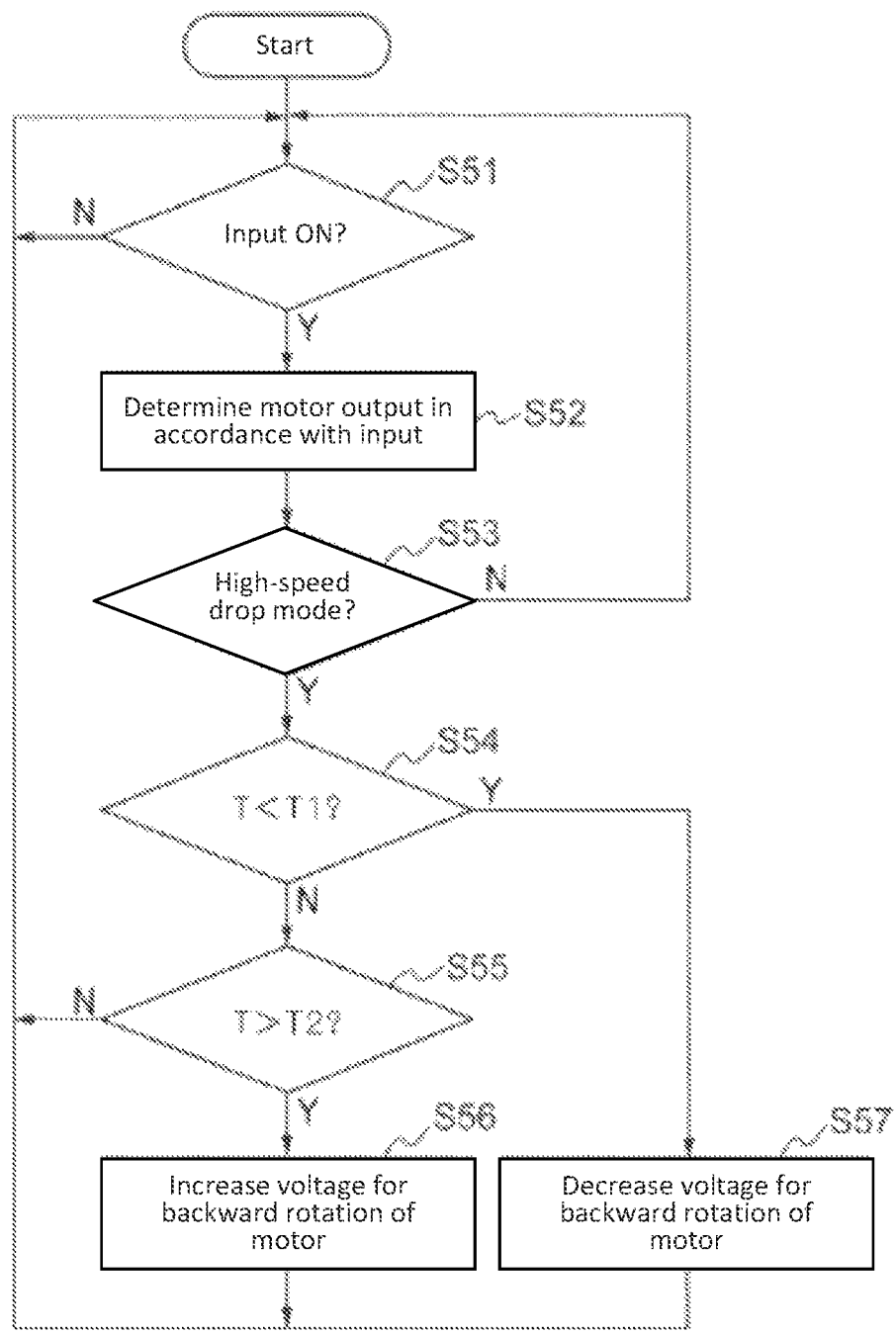
FIG. 14 shows a flowchart indicating a control action of the control device in FIG. 13.

More specifically, the control unit 318 executes control steps as shown in FIG. 14, for example. That is, first, the control unit 318 determines whether or not there is an input signal from the motor output adjusting part 322 (whether or not a fisherman has operated the motor output adjusting part 322) (step S51.) When the motor output adjusting part 322 is operated and an input signal is input from the motor output adjusting part 322 to the control unit 318, the control unit 318 supplies a voltage according to the signal input from the motor output adjusting part 322 to the driving motor 2 (a motor output is determined according to the input) (step S52.) At this time, the control unit 318 constantly receives the mode switching signal from the mode input part 316, and determines whether or not the fast-drop mode is set by the mode switching signal (step S53.) If the determination is NO, that is, if the fast-drop mode is not set, the control unit 318 determines that the normal mode is set, and continues to supply the driving motor 2 with a voltage corresponding to a signal input from the motor output adjusting part 322.

On the other hand, when the determination in step S53 is YES, that is, when the control unit 318 determines that the fast-drop mode is set by the mode switching signal, the control unit 318 determines whether or not the current tension T of the fishing line falls below the first threshold value T1 based on the detection signal constantly received from the tension sensor 20 when the driving motor 2 for unwinding the fishing line is rotationally driven backward (step S54.) When the tension T falls below the first threshold value T1 (when the determination in step S54 is YES) a voltage lower than that corresponding to a signal input from the motor output adjusting part 322 (for example, a decrease by about 0.1 to 10% depending on the tension) is supplied to the driving motor 2 (step S57) and the speed of the fishing line discharged by the driving motor 2 is reduced to match (synchronize with) the drop speed of the device.

On the other hand, when the current tension T of the fishing line based on the detection signal of the tension sensor 20 does not fall below the first threshold value T1 (when the determination in step S54 is NO) the control unit 318 further determines whether or not the current tension T exceeds the second threshold value T2 (step S55.) When the tension T exceeds the second threshold value T2 (when the determination in step S55 is YES) a voltage higher than that corresponding to a signal input from the motor output adjusting part 322 (for example, an increase by about 0.1 to 10% depending on the tension) is supplied to the driving motor 2 (step S56) and the speed of the fishing line discharged by the driving motor 2 is increased to match (synchronize with) the drop speed of the device.

When the current tension T of the fishing line based on the detection signal of the tension sensor 20 does not exceed the second threshold value T2 (when the determination in step S55 is NO) the control unit 318 continues to supply the driving motor 2 with a voltage corresponding to a signal input from the motor output adjusting part 322, similarly to the normal mode.

As described above, according to the electric fishing reel 301 having the above-mentioned configuration, when the fast-drop mode is set and the tension T detected by the tension sensor 20 falls below the first threshold value T1 (for example, when the speed of the fishing line discharged by the driving motor 2 greatly exceeds the drop speed of the device) at the time of the backward rotation drive of the driving motor 2 for unwinding the fishing line, a voltage lower than that corresponding to a signal input from the motor output adjusting part 322 is supplied to the driving motor 2 (i.e., in order to decrease the speed of the fishing line discharged by the driving motor 2 to match the drop speed of the device); therefore, the occurrence of a so-called backlash phenomenon in which the fishing line is loosened and slackened can be prevented, which may cause the fishing line to become tangled or kinked can be prevented.

Further, according to the above configuration, when the fast-drop mode is set and the tension T detected by the tension sensor 20 exceeds the second threshold value T2 larger than the first threshold value T1 (for example, when the speed of the fishing line discharged by the driving motor 2 falls below the drop speed of the device) at the time of the backward rotation drive of the driving motor 2 for unwinding the fishing line, a voltage higher than that corresponding to a signal input from the motor output adjusting part 322 is supplied to the driving motor 2 (i.e., in order to increase the speed of the fishing line discharged by the driving motor to match the drop speed of the device); therefore, the fishing line discharging speed corresponding to the drop speed of the device can be realized without hindering the device from dropping, which can increase the drop speed of the device.

That is, according to this configuration, the user (fisherman) can dispense with a troublesome and difficult operation such as synchronizing the speed of the fishing line discharged from the driving motor 2 with the drop speed of the device, and can realize a fishing line unwinding operation well corresponding to changes in a usage environment (e.g., depth, tide) or the like without occurrence of a backlash.

Figure 15:
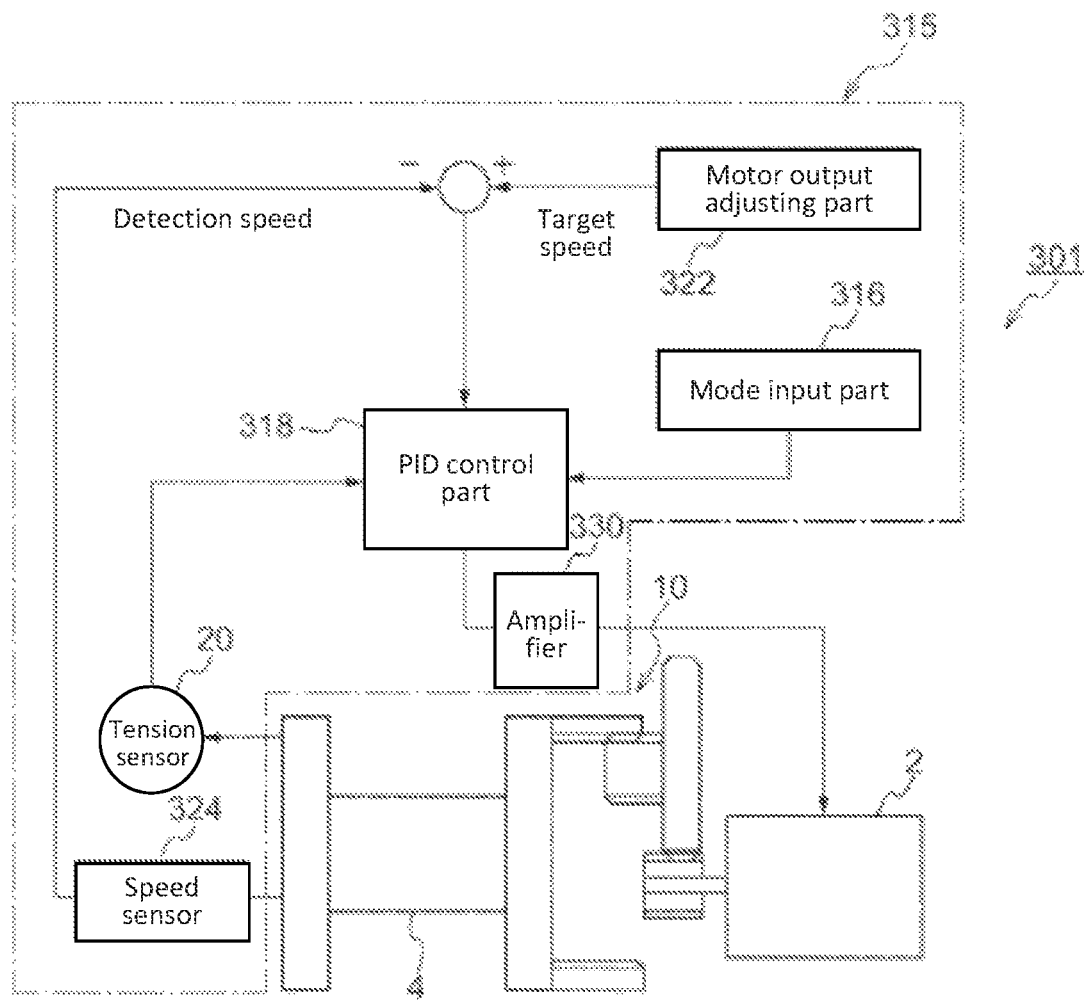
FIG. 15 shows a block diagram of an electric fishing reel (in particular a control device thereof) according to a variation.

FIG. 15 shows a block diagram of the electric fishing reel 301 according to a modification (in particular, the control device 315 thereof.) As illustrated, in this modification, the control unit 318 is configured as a control unit that determines a voltage to be supplied to the driving motor 2 based on the detected speed from a speed sensor 324 as a speed detection part for detecting the rotation speed of the spool 4 and the target speed input from the motor output adjusting part 322, and performs PID control of the operation of the driving motor 2 (the determined voltage is supplied to the driving motor 2 via an amplifier 330.) Therefore, when the mode control described above with reference to FIGS. 13 and 14 is realized in such a PID control mode, and the fast-drop mode is set by the mode switching signal at the time of the backward rotation drive of the driving motor 2 for unwinding the fishing line, a PID control unit 318 lowers the target speed when the tension T detected by the tension sensor 20 falls below the first threshold value T1, and raises the target speed when the tension T detected by the tension sensor 20 exceeds the second threshold value T2.

Figure 16:
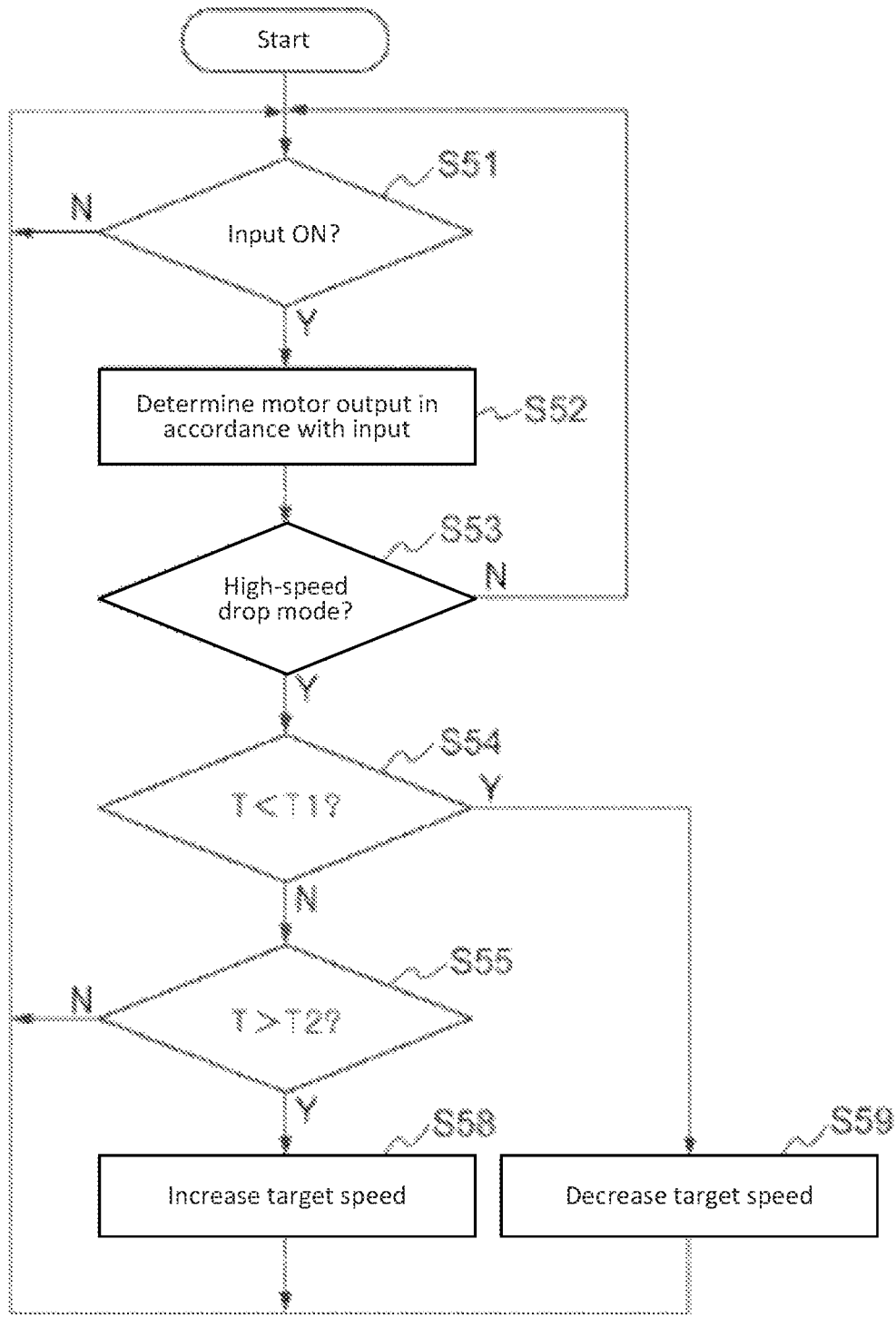
FIG. 16 shows a flowchart indicating a control action of the control device in FIG. 15.

More specifically, the PID control unit 318 executes control steps as shown in FIG. 16, for example. That is, similarly to FIG. 14, the PID control unit 318 first determines whether or not there is an input signal from the motor output adjusting part 322 (step S51) and when there is an input signal, supplies a voltage corresponding to a signal input from the motor output adjusting part 322 to the driving motor 2 (step S52.) At this time, the PID control unit 318 also determines whether or not the fast-drop mode is set by the mode switching signal (step S53) and if the determination is NO, that is, if the fast-drop mode is not set, determines that the normal mode is set, and continues to supply a voltage corresponding to a signal input from the motor output adjusting part 322 to the driving motor 2.

On the other hand, when the determination in step S53 is YES, that is, when the PID control unit 318 determines that the fast-drop mode is set by the mode switching signal, the PID control unit 318 determines whether or not the current tension T of the fishing line falls below the first threshold value T1 based on the detection signal from the tension sensor 20 constantly received at the time of the backward rotation drive of the driving motor 2 for unwinding the fishing line (step S54.) When the tension T is lower than the first threshold value T1 (when the determination in step S54 is YES) the target speed is decreased (for example, a decrease by about 0.1 to 10% depending on the tension) (step S59) and the speed of the fishing line discharged by the driving motor 2 is lowered to match (synchronize) the drop speed of the device.

On the other hand, when the current tension T of the fishing line based on the detection signal of the tension sensor 20 does not fall below the first threshold value T1 (when the determination in step S54 is NO) the PID control unit 318 further determines whether or not the current tension T exceeds the second threshold value T2 (step S55.) Then, when the tension T exceeds the second threshold value T2 (when the determination in step S55 is YES) the target speed is increased (for example, an increase by about 0.1 to 10% depending on the tension) (step S58) and the speed of the fishing line discharged by the driving motor 2 is increased to match (synchronize with) the drop speed of the device.

When the current tension T of the fishing line based on the detection signal of the tension sensor 20 does not exceed the second threshold value T2 (when the determination in step S55 is NO) the PID control unit 318 continues to supply the driving motor 2 with a voltage corresponding to a signal input from the motor output adjusting part 322, similarly to the normal mode.

As described above, according to the electric fishing reel 301 having the above configuration, when the fast-drop mode is set, and the tension T detected by the tension sensor 20 falls below the first threshold value T1 (for example, when the speed of the fishing line discharged by the driving motor 2 greatly exceeds the drop speed of the device) at the time of the backward rotation drive of the driving motor 2 for unwinding the fishing line, the target speed is decreased (i.e., in order to decrease the speed of the fishing line discharged by the driving motor 2 to match the drop speed of the device); therefore, the occurrence of a so-called backlash phenomenon in which the fishing line is loosened and slackened can be prevented, which may cause the fishing line to become tangled or kinked can be prevented.

According to the above configuration, when the fast-drop mode is set, and the tension T detected by the tension sensor 20 exceeds the second threshold value T2 larger than the first threshold value T1 (for example, when the speed of the fishing line discharged by the driving motor 2 falls below the drop speed of a device) at the time of the backward rotation drive of the driving motor 2 for unwinding the fishing line, the target speed is increased (i.e., in order to increase the speed of the fishing line discharged by the driving motor to match the drop speed of the device); therefore, the fishing line discharging speed corresponding to the drop speed of the device can be realized without hindering the device from dropping, which can increase the drop speed of the device.

In the above-described configuration, the mode input part, the motor output adjusting part, and the structure of the tension sensor can be arbitrarily set, and the control device 315 may be integrated with, or separate from, the electric fishing reel.

Incidentally, in the electric hoisting machine described above, a tension of the traction member determines the state of winding the traction member on the rotating body. For example, if the tension acting on the traction member is small (insufficient) when the traction member is wound around the rotating body, the traction member is wound around the rotating body in a loosened state (i.e., slackened with the increase in the winding radius) depending on the winding speed, so that the traction members may be tangled up. In addition, if the traction member is wound around the rotating body in such a slack state with insufficient tension, there may occur a problem such as interference between the electric hoisting machine main body and the traction member. Conversely, also too large tension acting on the traction member when the traction member is wound on the rotating body may cause breakage of the rotating body or the traction member, or generate abnormal heat of the motor.

In connection with the problem associated with such tension, Japanese Patent Application Publication No. 2003-176080, for example, provides a wire rewinding device capable of detecting a tension acting on a linear longitudinal object and performing control for changing a speed difference between a supply motor for supplying a longitudinal object and a winding motor for winding the longitudinal object in accordance with the detected value, thereby maintaining the tension acting on the longitudinal object within a certain range (preventing the slack of the longitudinal object.)

In Japanese Patent Application Publication Nos. 2002-104735 and 2015-67376, a tension and clamping force are applied to the line and hose directly or indirectly via a winding machine that winds them up to brake the line and hose, thereby maintaining the tension within a certain range (preventing the slack of the traction member.)

However, in an electric hoisting machine such as a fishing reel and a winch, since the weight and movement of the hoisting object attached to the end of a traction member can constantly fluctuate, it is difficult to effectively solve the above-mentioned problems associated with a tension of the traction member, that is, the problems of tangling, interference, breakage and the like of the traction member due to excessive or insufficient tension, in the control mode disclosed in the above-mentioned Japanese Patent Application Publication No. 2003-176080.

In addition, when the technique disclosed in Japanese Patent Application Publication Nos. 2002-104735 and 2015-67376 is employed in particular in a portable electric hoisting machine such as a fishing reel and a portable winch, the above-mentioned means for braking is added, which leads to an increase in size and weight of the electric hoisting machine, and adversely affects the portability.

For this reason, in the conventional electric hoisting machine, the control for maintaining a tension of a traction member within an appropriate range is exclusively left to the user's operation, and there is a risk that the above-mentioned problems such as tangling, interference and breakage of the traction member may occur due to an unexpected situation, carelessness of the user or the like.

Figure 18:
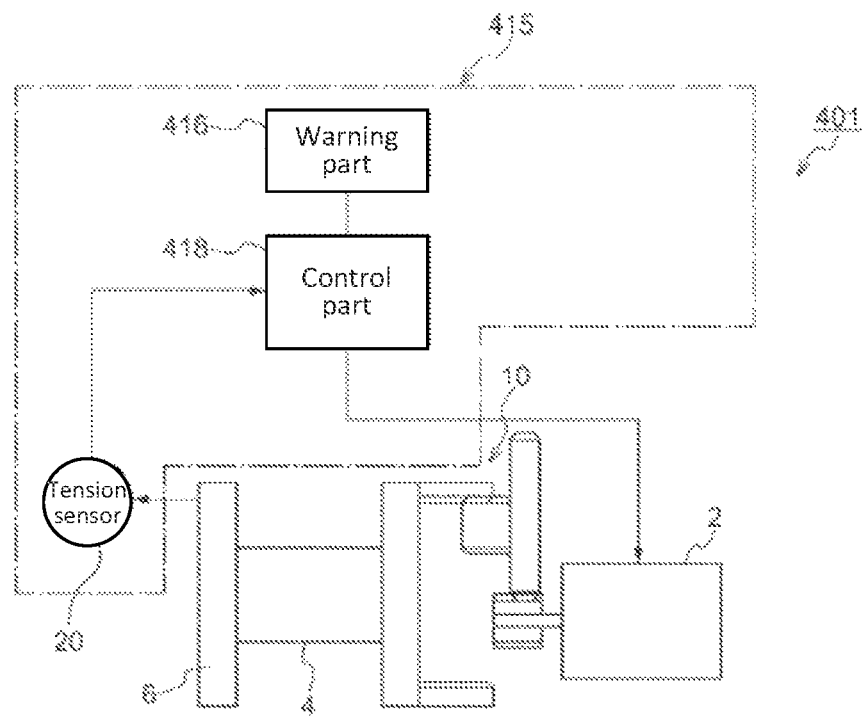
FIG. 18 shows a block diagram of an electric hoisting machine (in particular a controller thereof.)

Therefore, the below described are an electric hoisting machine, a control device thereof and a control method, which can effectively prevent a winding trouble such as tangling and breakage at the time of winding due to an improper tension of a traction member without causing an increase in size and weight An electric hoisting machine 401 according to the present configuration shown in FIG. 18 (which may be, for example, a portable winch or a fishing reel) has a structure similar to that in FIG. 1 related to the embodiment described above. That is, as shown in FIGS. 1 and 18, the electric fishing reel 401 includes: the electric motor 2; a cylindrical rotating body 4 that winds up and/or unwinds a traction member (not shown in FIGS. 1 and 18) that is rotated forward and backward by way of the forward and backward rotation drive of the electric motor 2 to pull a hoisting object; and a housing 6 that accommodates and holds the rotating body 4. In this case, the rotating body 4 is rotatably supported by the housing 6 via a bearing (not illustrated) and the electric motor 2 may be non-rotatably supported and fixed to the inside of the cylindrical rotating body 4, for example, while being accommodated in a motor housing, and is preferably powered by the power source P removably mounted on the housing 6.

The traction member may be, for example, a wire, a chain, a rope and a fishing line, depending on the intended use of the electric hoisting machine 401. The rotating body 4 corresponds to a spool on which a fishing line is wound, for example, when the electric hoisting machine 401 is used as an electric fishing reel.

The electric motor 2 and the rotating body 4 are connected to each other by the power transmission mechanism (power transmission path) 10 so as to be able to transmit power. In this case, the power transmission mechanism 10 may include a bidirectional clutch that transmits the rotation of the electric motor 2 to the rotating body 4 side but does not transmit the rotation of the rotating body 4 to the electric motor 2 side, and may include a deceleration mechanism that reduces the power from the electric motor 2 and transmits the reduced power to the rotating body 4.

The electric hoisting machine 401 according to the present configuration is provided with the level winding device 40 for winding the traction member in parallel with the rotating body 4. The level winding device 40 is configured such that when the electric motor 2 is rotationally driven, the guide body 42 that passes through the traction member unwound from the rotating body 4 moves reciprocally from side to side in conjunction with the rotation drive of the electric motor 2, and has a function of winding the traction member evenly around the rotating body 4 in accordance with the winding operation of the traction member.

Further, as shown in FIG. 18, the electric hoisting machine 401 according to the present configuration includes a control device 415 having: the tension sensor 20 as a tension detection part for detecting a tension of the traction member, a control unit 418 for controlling the electric motor 2 to restrict the winding of the traction member by the rotating body 4 when a tension detected by the tension sensor 20 falls below the first threshold value T1 and/or exceeds the second threshold value T2 that is larger than the first threshold value T1, and a warning part 416 for warning when a tension detected by the tension sensor 20 falls below the first threshold value T1 and/or exceeds the second threshold value T2.

Here, the tension sensor 20 is similar to the tension sensor 20 of the previous embodiment shown in FIG. 2. The first threshold value T1 of the tension is preferably within the range of 10 gf to 100 gf when the electric hoisting machine 401 is, for example, a fishing reel, and when a fishing line especially for small fish, which is made of PE or nylon and has a small wire diameter, is used as a traction member. When the traction member has a low bending rigidity and bends at a small radius of curvature when the tension is eventually lost, the detection unit of the tension needs to be small to prevent line tangling. On the other hand, when the electric hoisting machine 401 is used as a winch for lifting and lowering a heavy load of about 100 kg, for example, and a material having a high bending rigidity such as a stainless wire is used as a traction member, the first threshold value T1 is preferably within the range of 100 gf to 1 kg. When the traction member has a high bending rigidity and a large tension is required to reduce the radius of curvature, complicated line tangling does not easily occur even if the tension becomes zero, but on the other hand, the traction member cannot be wound on a rotating body without a certain level of tension, which may be detrimental to an aligned winding. Therefore, it is necessary to increase the detection unit of the tension. The second threshold value T2 of the tension is determined in accordance with the breaking load of the traction member, the allowable driving force of the motor, the heat generating condition, and the like. When the electric hoisting machine 401 is used, for example, as a fishing reel, the breakage of the fishing line can be prevented by setting the breaking load of the fishing line (traction member) to about 50% in consideration of the stress concentration at the knot. When the electric hoisting machine 401 is used as a winch used in, for example, a temporary scaffold, the tension is preferably about 90% of the tension corresponding to the condition under which the motor reaches the allowable torque. As a result, it is possible to prevent the motor from being overloaded, and to avoid abnormal heat generation of the motor, breakage of gears and the like.

The warning part 416 may include, for example, a sound generating device appealing to the user's hearing such as a speaker and a buzzer, a display device appealing to the user's vision such as an LED and a liquid crystal display and a tactile stimulation device appealing to the user's tactile sense such as a vibration generating device.

Figure 19:
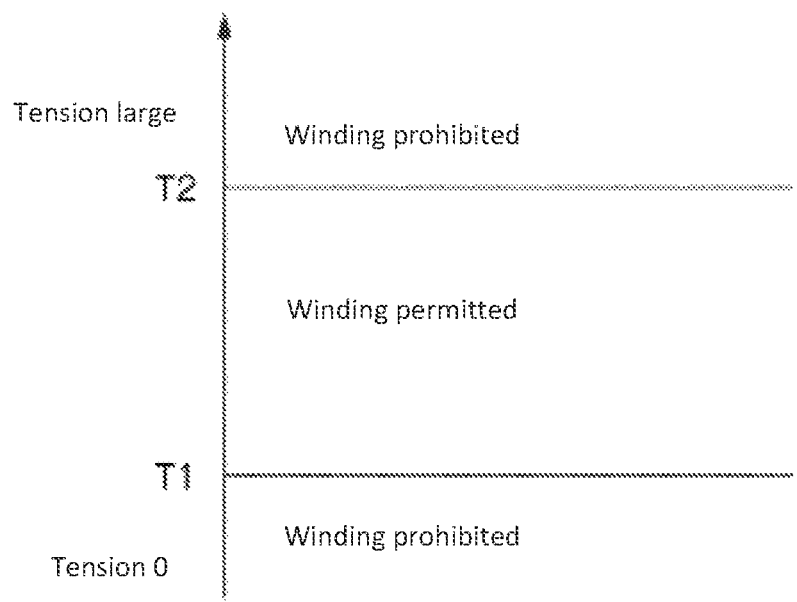
FIG. 19 shows a conceptual diagram of a winding restriction mode by a control unit.

Here, the control unit 418 which restricts the winding of a traction member by the rotating body 4 according to the value of the tension detected by the tension sensor 20 conceptually takes a control mode as shown in FIG. 19, for example. That is, when a tension detected by the tension sensor 20 falls below the first threshold value T1, for example, when the tension is substantially zero, the control unit 418 stops or restricts the drive of the electric motor 2, thereby prohibiting or suppressing the winding of the traction member by the rotating body 4. When a tension detected by the tension sensor 20 falls within the range between the first threshold value T1 and the second threshold value T2, the control unit 418 permits the traction member to be wound by the rotating body 4, allowing the drive of the electric motor 2. Further, when a tension detected by the tension sensor 20 exceeds the second threshold value T2, and for example, an excessive tension acts on the traction member, the control unit 418 stops or restricts the drive of the electric motor 2, thereby prohibiting or suppressing the winding of the traction member by the rotating body 4.

An event that a tension of a traction member falls below the first threshold value T1 may include, for example, a case where the electric hoisting machine 401 is a fishing reel and a fishing line is slackened when loosened by a violent wave, and a case where the electric hoisting machine 401 is a winch and an operator working beneath the winch is loosening a wire to attach, detach or otherwise a hoisting object to or from a traction member. On the other hand, an event in which a tension of a traction member exceeds the second threshold value T2 may include a case where a rotating body is locked due to abnormal tangling of traction members, foreign matter mixing into a gear part or the like, a case where a traction member is wound up to the end and a member attached to the end of a hook part, a fishing device or the like abuts against the main body of the electric hoisting machine 401, and a case in which a hoisting object is overweight.

Figure 20:
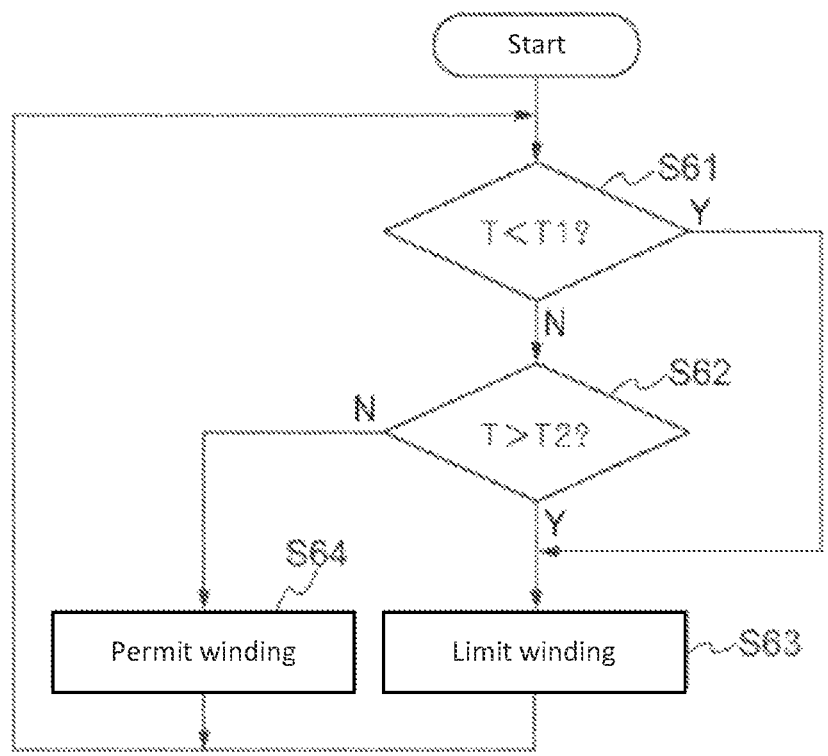
FIG. 20 shows a flowchart indicating a control action of the control device in FIG. 18.

More specifically, the control unit 418 executes control steps as shown in FIG. 20. That is, first, the control unit 418 constantly receives a detection signal representing the tension of the traction member from the tension sensor 20 when the electric hoisting machine 401 is on, and determines whether or not the current tension T of the traction member based on the detection signal falls below the first threshold value T1 (tension detection step S61.) When the tension T falls below the first threshold value T1 (when the determination in step S61 is YES) the winding of the traction member by the rotating body 4 is restricted (restriction step S63.) More specifically, the control unit 418 stops the drive of the electric motor 2 when the tension T detected by the tension sensor 20 falls below the first threshold value T1, or stops the drive of the electric motor 2 after winding the traction member by a predetermined amount (after driving the electric motor 2 for a predetermined time) from the time when the tension T detected by the tension sensor 20 falls below the first threshold T1, or limits the rotation speed of the electric motor 2 to a predetermined value or less at the time when the tension T detected by the tension sensor 20 falls below the first threshold T1, thereby restricting the winding of the traction member on the rotating body 2.

On the other hand, when the current tension T of the traction member based on the detection signal of the tension sensor 20 does not fall below the first threshold value T1 (when the determination in step S61 is NO) the control unit 418 further determines whether or not the current tension T exceeds the second threshold value T2 (tension detection step S62.) When the tension T exceeds the second threshold value T2 (when the determination in step S62 is YES) the winding of the traction member by the rotating body 4 is restricted (restriction step S63.) More specifically, the control unit 418 stops the drive of the electric motor 2 when the tension T detected by the tension sensor 20 exceeds the second threshold T2, or stops the drive of the electric motor 2 after winding the traction member by a predetermined amount (after driving the electric motor 2 for a predetermined time) from the time when the tension T detected by the tension sensor 20 exceeds the second threshold value T2, or restricts the rotation speed of the electric motor 2 to a predetermined value or less when the tension T detected by the tension sensor 20 exceeds the second threshold value T2, thereby restricting the winding of the traction member on the rotating body 2.

When the current tension T of the traction member based on the detection signal of the tension sensor 20 does not exceed the second threshold value T2 (when the determination in step S62 is NO) the control unit 418 permits the rotating body 4 to wind the traction member, allowing the drive of the electric motor 2 (step S64.)

Figure 21:
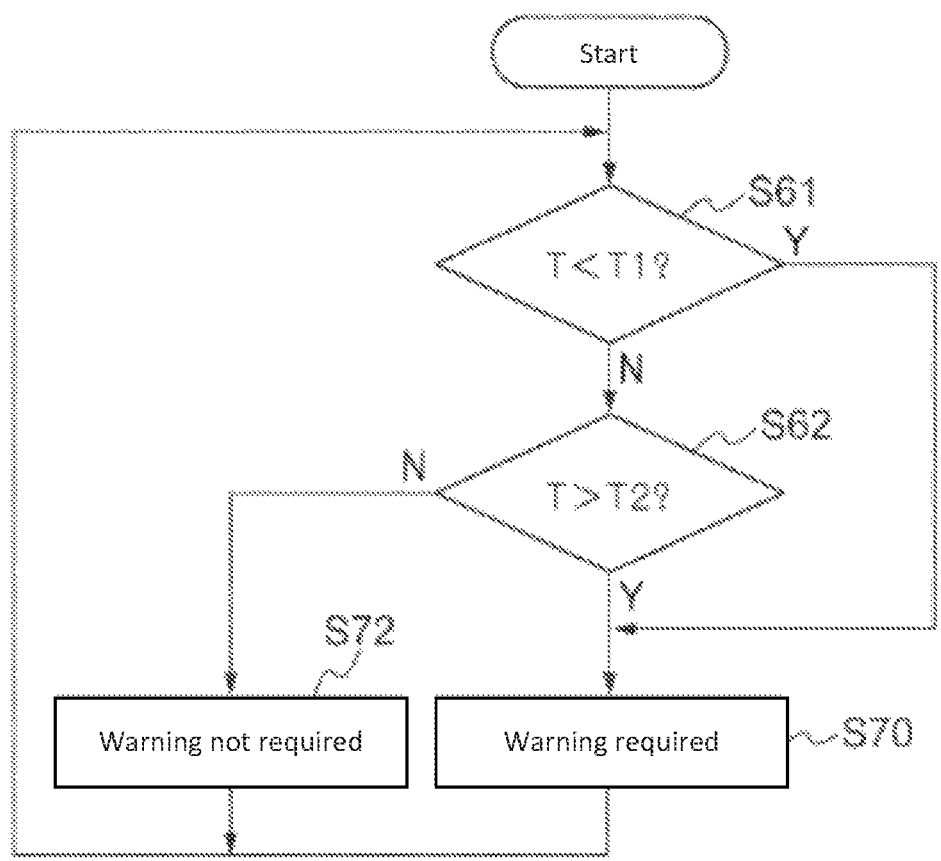
FIG. 21 shows a flowchart indicating another control action of the control device in FIG. 18.

The control unit 418 may execute the control steps as shown in FIG. 21 together with the control steps as described above. That is, first, as described above, the control unit 418 constantly receives the detection signal representing the tension of the traction member from the tension sensor 20 when the electric hoisting machine 401 is on, and determines whether or not the current tension T of the traction member based on the detection signal falls below the first threshold value T1 (tension detection step S61.) Then, when the tension T falls below the first threshold value T1 (when the determination in step S61 is YES) the control unit 418 inputs a command signal to the warning part 418, and based on the command signal, the warning part 416 notifies the user that the current tension T of the traction member falls below the first threshold value T1 (for example, generates a warning sound) (warning step S70.)

On the other hand, when the current tension T of the traction member based on the detection signal of the tension sensor 20 does not fall below the first threshold value T1 (when the determination in step S61 is NO) the control unit 418 further determines whether or not the current tension T exceeds the second threshold value T2 (tension detection step S62.) Then, when the tension T exceeds the second threshold T2 (when the determination in step S62 is YES) the control unit 418 inputs a command signal to the warning part 418, and based on the command signal, the warning part 416 notifies the user that the current tension T of the traction member exceeds the second threshold value T2 (for example, generates a warning sound) (warning step S70.)

When the current tension T of the traction member based on the detection signal of the tension sensor 20 does not exceed the second threshold value T2 (when the determination in step S62 is NO) the control unit 418 does not input a command signal to the warning part 418. That is, the warning part 416 does not issue a warning (step S72.)

As described above, according to the electric hoisting machine 401 having the above configuration, since the control unit 418 restricts the winding of the traction member by the rotating body 4 when the tension T detected by the tension sensor 20 falls below the first threshold value T1, it is possible to prevent a situation in which the traction member is wound around the rotating body 4 (wound irregularly) in a loosened state (i.e., slackened with the increase in the winding radius) due to an insufficient tension of the traction member, so that the traction members are tangled up (or a problem such as interference between the main body of the electric hoisting machine and the traction member) without relying on the user's operation.

In addition, according to the above configuration, since the control unit 418 restricts the winding of the traction member by the rotating body 4 when the tension T detected by the tension sensor 20 exceeds the second threshold value T2, it is possible to prevent a situation in which the rotating body 4 or the traction member breaks or the electric motor 2 generates abnormal heat due to excessive tension of the traction member when the traction member is wound on the rotating body 4, without relying on the user's operation.

In addition, according to the above configuration, since it is not necessary to newly add means for braking as disclosed in the above-mentioned Japanese Patent Application Publication Nos. 2002-104735 and 2015-67376, there is no increase in size and weight. This is particularly advantageous to a portable electric hoisting machine such as a fishing reel and a portable winch.

That is, according to the above configuration, it is possible to effectively prevent winding troubles such as tangling and breakage at the time of winding due to improper tension of the traction member, without increase in size and weight and without relying on the user's operation.

In the above configuration, the control unit 418 warns when the tension detected by the tension sensor 20 falls below the first threshold value T1 and exceeds the second threshold value T2, so that it is possible to alert the user and to reliably prevent the occurrence of a winding trouble in combination with the control by the control unit 418.

The electric hoisting machine 401 having the above-described configuration can be used for winding or unwinding objects such as beddings, packaging, temporary scaffolding, buildings and fishing tools to a predetermined positions, can also be used as an electric fishing reel and further, such a machine mounted on a drone can be used to take loads down from, or hoist loads onto, the drone in the air, the fields in which such a machine is used are not limited to those mentioned above. The present invention also provides a control device and associated control method for controlling the electric hoisting machine having the above configuration.

In the above-described configuration, the warning part and the tension sensor can be arbitrarily configured, and the control device 415 may be integrated with, or separate from, the electric hoisting machine 401. In the above-described configuration, the rotating body 4 is rotated forward and backward by way of the forward and backward rotation drive of the electric motor 2 to wind and/or unwind the traction member for pulling the hoisting object, but the traction member may be unwound by making the rotating body free of rotation, using a clutch mechanism or the like without using the driving force of the electric motor 2.

Incidentally, when lowering various loads suspended by a traction member such as a wire, a chain, a rope and a fishing line by using an unloading device (also referred to as a winch) as an electric hoisting machine that enables the reliable lowering of loads to a desired position without manpower, a hook is fastened to an end of the traction member wound on a spool, and the traction member is unwound with the loads hung on the hook. Normally, as disclosed in Japanese Patent Application Publication No. 2002-128455, for example, the hook is provided with a locking mechanism, so that a load hooked may not come off while it is carried, and when the load reaches the ground (touches the ground), the locking mechanism is unlocked. Further, for example, Japanese Patent Application Publication No. 2000-335870 discloses a hook device capable of releasing a load hung on a hook part by rotationally driving the hook part.

As described above, the conventional hook device is configured such that when a load hung is carried to a desired position, and it is detected that the weight of the load is no longer applied upon touching the ground, the hook is opened to release the load, or after confirming that the load touches the ground, the hook part is driven to rotate to release the load from the hook.

Recently, an unmanned air vehicle such as a drone has been used to carry loads hung on a hook, and upon arriving at a target position, a fastening member fastened to the hook is unwound to unload the loads, using a GPS function. In such a usage, since the loads are carried unmanned, it is not possible to visually confirm that the loads touch the ground and are surely released from the hook. That is, even if a mechanism is provided in the hook part for detecting that the weight of a load is no longer applied to unlock, it is not possible to ensure whether or not the load is carried and released. In particular, when unloading to a point where there is no operator, a trouble may occur in performing the unloading operation quickly and reliably and returning to the point of departure.

Therefore, the unloading method and the unloading device (electric hoisting machine), which make it possible to reliably unload a load hung on a hook, will be described below.

Figure 22:
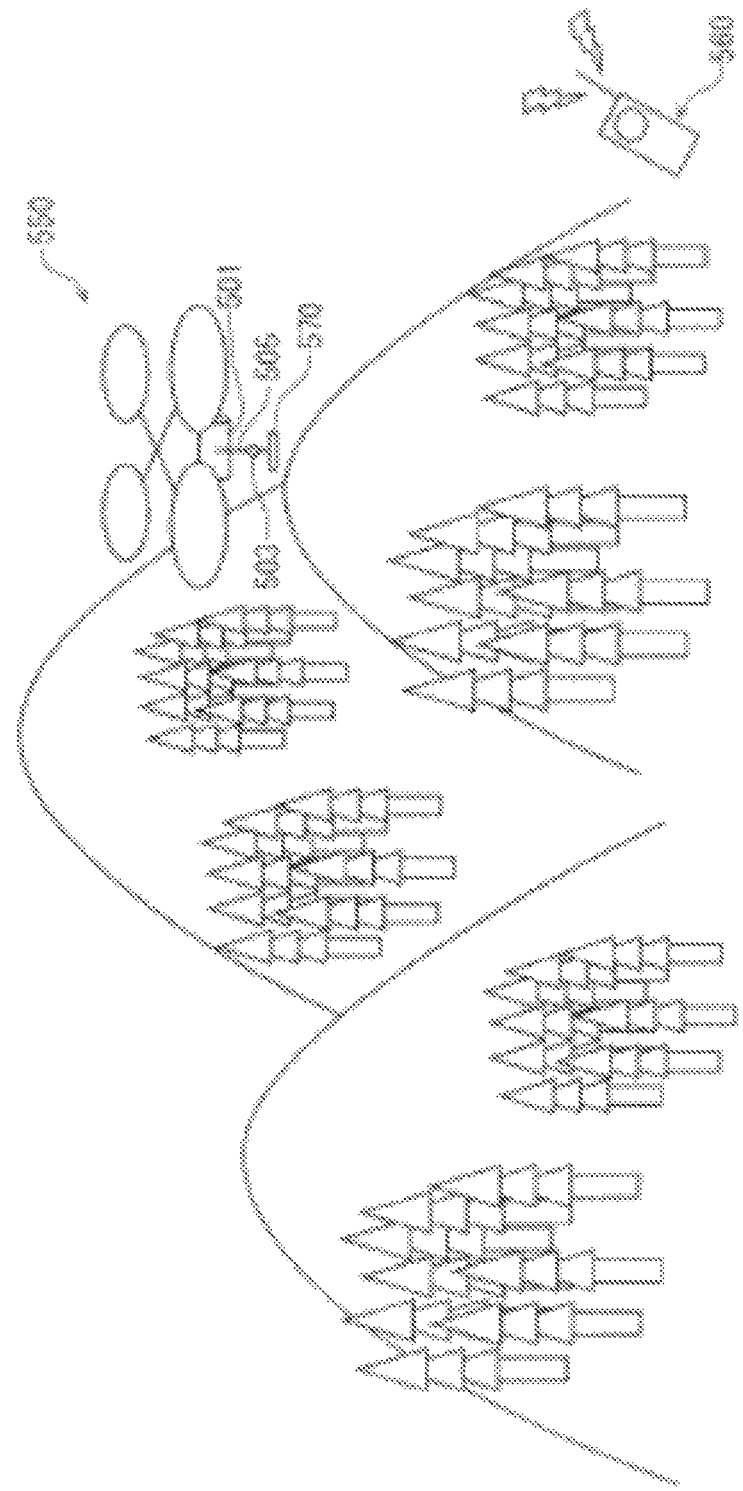
FIG. 22 shows a schematic diagram of a drone carrying loads to a desired area.

As shown in FIG. 22, an unloading device 501 according to the present configuration can be used mounted on a drone 550 which is remotely controlled by a controller 560, for example. More specifically, it is possible to use the unloading device 501 mounted on the drone 550 for unloading where there is no operator at a delivery point, such as carrying and unloading to a desired point in the depths of the mountains with no roads measuring instruments or the like, or carrying and unloading various materials to a predetermined delivery point.

Figure 23:
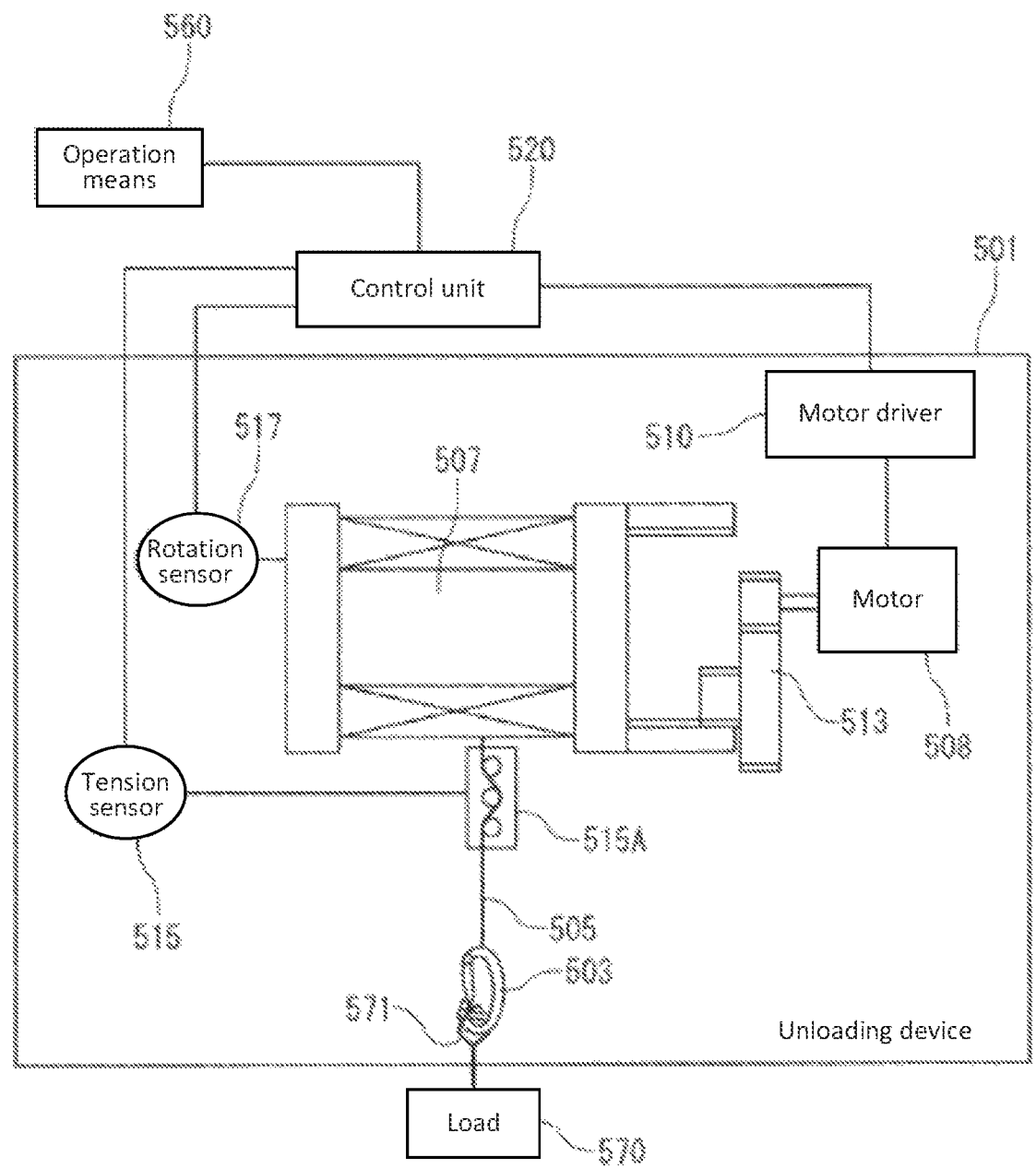
FIG. 23 shows a block diagram indicating an outline of an unloading device.

Although there is no particular limitation on the specific structure of the unloading device 501, as shown in the block diagram in FIG. 23, the unloading device 501 includes: a spool 507 on which a traction member 505 provided with a hook 503 for hanging a load 570 is wound; a motor 508 capable of forward and backward rotation that drives to pull out/wind the traction member 505, driving the spool 507; and a detection means 515 for detecting whether or not the load 570 hung on the hook 503 touches the ground and emitting a detection signal for driving the motor 508, so that the unhooking process is performed.

The hook 503 may be configured so as not to be detached when a ring part 571 for suspension provided on the load 570 is hooked, for example, by a carabiner hook, and the traction member 505 may be configured by, for example, a wire, a chain, a rope and a fishing line. The spool 507 is rotatably supported by a casing (frame) of the unloading device 501 via a bearing, and is connected to the motor 508 supported by the casing via a power transmission mechanism 513 such as a gear train. The motor 508 can be configured by, for example, a DC motor with a brush and a brushless DC motor, and is supplied with current by a DC power supply (not illustrated) and the rotation direction, drive timing, driving amount and the like are controlled by a motor driver 510.

The detection means 515 can be configured by a sensor or the like capable of detecting whether or not the load 570 hung on the hook 503 reaches the ground, and in this configuration, it is configured by a tension sensor (tension detection member 515A) using a strain gauge or the like that engages with the traction member 505 and detects the tension state of the traction member (hereinafter, the detection means is referred to as a tension sensor 515.)

Further, it is preferable that a traction member detection means is provided so that after pulling out the traction member 505 from the spool 507, the amount pulled out is detected and the hook is returned to the initial state again. More specifically, in this configuration, a rotation sensor 517 is disposed between the casing and the spool 507 and is capable of detecting the rotation amount of the spool 507, and when in performing an unloading operation, detecting the unwinding rotation amount of the spool 507 and completing the unloading operation, drives to wind the same amount as the amount of unwinding rotation of the spool 507 to return the hook 503 to the initial state (initial position.)

The detection signals of the tension sensor 515 and the rotation sensor 517 are transmitted to a control unit 520 such as a CPU that controls the unloading device 501, and a microcomputer that incorporates a control program, and the control unit 520 controls the motor driver 510 based on the input detection signal. The control unit 520 may be incorporated in the unloading device 501 or in the drone 550. Further, the control unit 520, receiving an instruction on unloading from an operation means 560, which is a controller for operating the drone 550, performs unloading according to a predetermined sequence (or may perform unloading based on location information.) Note that the operation means 560 may be configured by a portable terminal such as a smartphone in addition to a controller dedicated to a drone, and part (all) of the function as the control unit may be incorporated in the operation means 560 side.

Next, in the above-described configuration, the operation of unloading a load carried by the drone 550 at a predetermined position by the unloading device 501 will be described with reference to the flowcharts in FIGS. 22, 23 and 24. The unloading operation is performed in accordance with the sequence of the program incorporated in the control unit 520.

When the drone 550 arrives at a predetermined position, the motor 508 is driven to rotate the spool 507 in the pulling-out direction to lower the traction member 505 together with the load 570 (S81.) The traction member 505 is tensioned by the weight of the load 570, and when the load 570 touches the ground, the tension is reduced. The tension sensor 515 detects a tension change of the traction member, and generates a ground signal when the tension becomes equal to or less than a predetermined threshold value. More specifically, a tension for both the weight of the hook 503 and the weight of the load 570 is generated in the traction member 505, and a ground signal is generated using as a threshold value when the load 570 starts to touch the ground and the weight load from the load 570 is eventually lost (a state in which only the weight of the hook 503 acts). The motor 508 is driven until the ground signal is received by the control unit 520 (loop processing; unloading process for S81→S82.)

When the ground signal is input to the control unit 520, the motor 508 continues to be slightly driven (step S83.) This microscopic driving may be such that the spool 507 is rotationally driven to such an extent that the hook is slightly lowered, for example, to such an extent that the hook 503 tied to the load 570 judged to have touched the ground is slightly lowered therefrom (to such an extent that the dependent hook 503 shifts from the vertical state into the fallen state), and thereafter, the motor 508 is driven backward to wind up the hook 503 in order to wind up the traction member wound on the spool 507 (S84.)

If the ground signal is generated from the tension sensor 515 in the backward driving state, this means that the load 570 is released from the hook 503 and then, the motor 508 is driven backward to wind and drive the spool 507 (S85•YES→S86.) On the other hand, if the ground signal is not detected from the tension sensor 515 in the backward driving state, this means that the load 570 is not released from the hook 503, and in this state, the microscopic driving and the backward driving of the motor are repeated again until the load is completely released (S85•NO→loop processing; unhooking process in S83 and S84.)

That is, by performing the above-described unhooking process, it is possible to reliably unload the load 570. In this case, with respect to the second and subsequent microscopic driving of the motor 508 (processing in S83), the microscopic driving amount of the preceding processing may be changed as appropriate, whereby a reliable unloading processing can be performed. In addition, even if the unloading process is performed a predetermined number of times, where it is not possible to detect that the load 570 has been released, a process may be performed such that an error signal is transmitted to the controller side on the assumption that some trouble has occurred. In this case, the traction member 505 may be wound up and returned as it is.

In the unhooking process, when it is detected that the load has been released, the motor is continuously driven backward, and the spool is wound and driven (S85•YES→S86.) With respect to the backward driving amount, as described above, since the rotation sensor 517 detects the rotation amount of the spool 507, when the rotation sensor 517 detects that the same amount as that of unwinding rotation of the spool 507 is wound up and the hook reaches the initial position, the drive of the motor 508 is stopped, so that the hook can be returned to the initial position (S87•YES→S88; winding process.)

According to the unloading method and the unloading device having the above-described configuration, the following effects can be obtained.

By providing the above-described unhooking process following the unloading process, a load carried and unloaded can be reliably unhooked even if there is no operator to unhook the load and therefore, even when a load is carried to a place where no one is, it is possible to reliably deliver the load using a drone or the like without causing a trouble.

In addition, in this configuration, the detection means for detecting whether or not the load 570 hung on the hook 503 touches the ground is configured by the tension sensor 515 for detecting the tension change of the traction member 505, and such a tension sensor can be disposed on a casing of an unloading device, for example, at the unwinding position of the spool 507, or in the vicinity of a level winding mechanism or the like for winding the traction member 505 evenly around the spool, so that the detection signal can be reliably transmitted to the control unit, and the configuration can also be simplified. In this configuration, the means for detecting the tension change of the traction member 505 is the tension detection member 515A using the strain gauge, but in addition to this configuration, since the load has a proportionate relationship to the current value when the motor 508 is configured by a brush motor, it is also possible to detect the tension change of the traction member 505 by detecting the current.

Further, in the unhooking process, since the traction member wound around the spool 507 is slightly pulled out and the tension caused by the load 570, if any, is detected by continuing the winding, it is possible to reliably detect whether or not the load 570 is released from the hook 503. In particular, in the unhooking process, the pulling-out and winding-up of the traction member wound on the spool 507 are repeated until the tension due to the load is eventually lost, so that the unhooking process can be performed reliably.

As described above, when it is detected in the unhooking process that the load 570 is released from the hook 503, the motor 508 winds and drives the spool 507, but in this configuration, the position of the hook 503 before the unloading process is performed is set as the initial state, and this winding is performed by the traction member detection means (rotation sensor 517) until the hook 503 becomes the initial state, so that the traction member 505 does not hang down. That is, when the load is carried by the drone 550, since the traction member 505 is wound up to the initial position after unloading, no resistance and the like occur, and it is possible to safely return the drone to the point of departure.

As for the traction member detection means, for example, a line end sensor for detecting the end position of the traction member may be installed in addition to the rotation sensor 517 to detect the position of the traction member 5 unwound from the spool 507.

The unloading device and the unloading method as described above can be used in a mode as shown in FIG. 25 (assuming that a moving agent, for example, unloads a load, detachably mounting an unloading device on the handrail 600 of a house with the clamp device 610 or the like) in addition to mounting the device on an unmanned air vehicle such as a drone.

Figure 24:
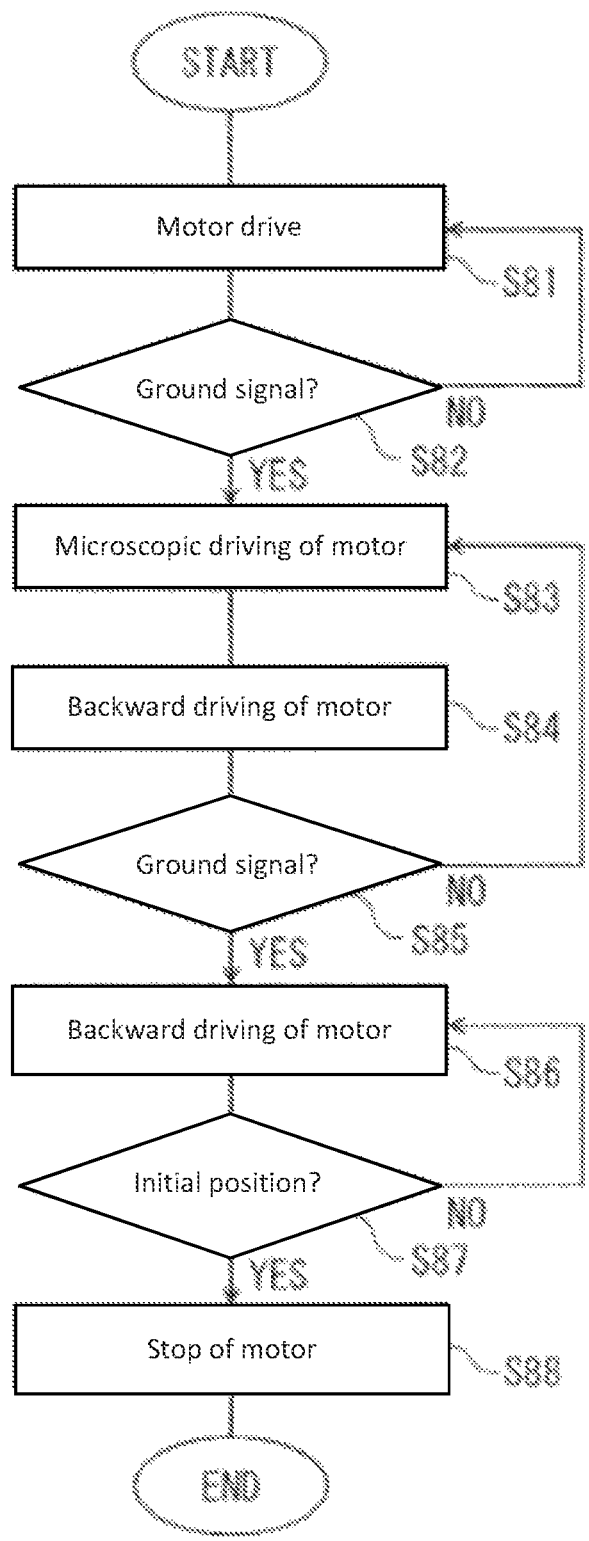
FIG. 24 shows a flowchart illustrating the process of an unloading method.
Figure 25:
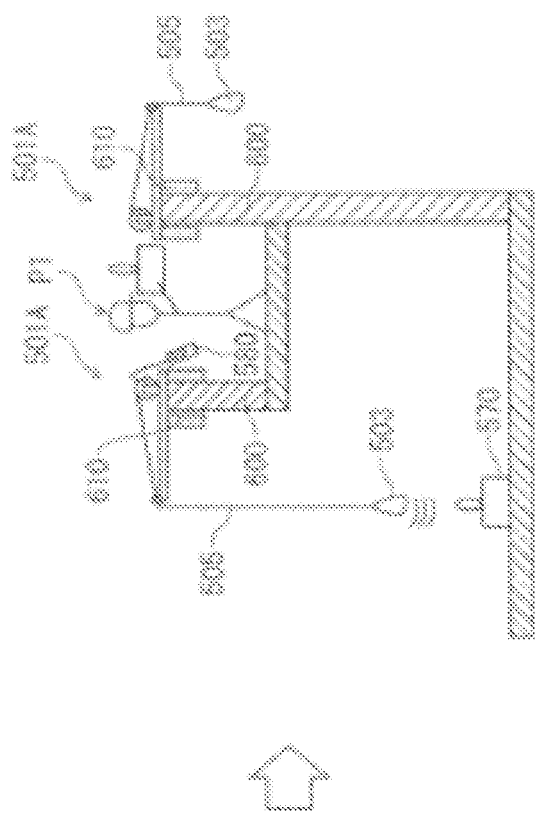
FIG. 25 shows a schematic diagram indicating an application example of an unloading device.
Figure 25:
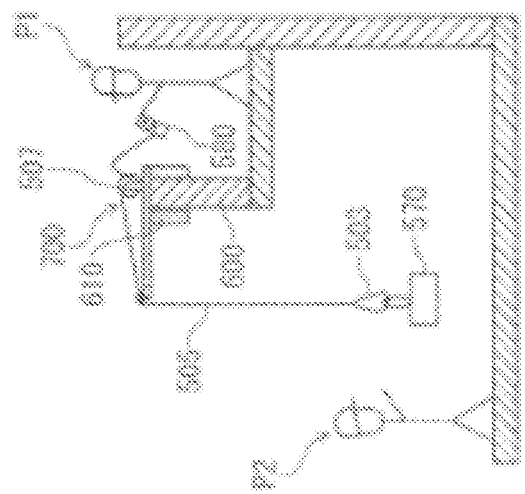

The left drawing in FIG. 25 shows the situation of the unloading operation by the unloading device 700 without the unhooking process as described above, the right drawing shows the situation of the unloading operation by the unloading device 501A provided with the unhooking process as described above, and the unloading device 501A performs the unloading operation according to the sequence shown in the flowchart in FIG. 24.

According to the unloading device 700 on the left, in addition to an operator P1 on the veranda, an operator P2 for unhooking the load 570 which has touched the ground is required, and the operator P1 on the veranda is required to perform the winding operation of the hook, visually confirming that the load has been completely released. On the other hand, in the unloading device 501A on the right, since a load is reliably unhooked when the load is lowered and touches the ground, the operator P2 who performs unhooking is no longer necessary, and the hook returns to the initial state after the unloading, whereby the unloading operation can be performed efficiently. Therefore, it becomes easy for one operator P1 to operate a plurality of unloading devices 501A, which improves the efficiency of the unloading operation.

In the unloading device 501A, after the load 570 is hung on the hook 503, the driving of the spool in the pulling-out direction can be performed when the operator P1 hangs the load 570 on the hook 503 and a load of a certain level or higher is continuously detected by a tension sensor in a state where the hook is closed. According to such a processing method, unloading is automatically performed after the operator P1 hangs the load 570 on the hook 503, and the hook part is automatically returned to the initial position after the load touches the ground, which further improves the work efficiency. Needless to say, the operator P1 may operate a switch of the controller 580 or the like connected to the unloading device 501A.

In the above configuration, the detection means for detecting whether or not the load 570 hung on the hook 503 touches the ground may be provided with an optical sensor (proximity sensor) for detecting the distance between the hook 503 and the load 570 and the state of contact with the load 570, or a mechanical sensor for detecting the state of contact between the hook 503 and the load, in addition to detecting a change in the tension of the traction member 505. The configuration of the unloading device, such as the size, the winding force and the winding capacity of the spool, is not particularly limited, and when the unloading device is used in a mode shown in FIG. 25, the motor may also be driven by an AC source, such as a three-phase motor.

According to the unloading method described above, since the unloading process includes a unhooking process for unloading a load toward the ground, detecting that the load has touches the ground by the detection means and then, determining whether or not the hook has released the load by the detection means, it is possible to reliably unload the load onto the ground. Therefore, in the winding-up process, it is not necessary to visually confirm whether or not the load has touched the ground as the hook does not wind up the load while hanging the load; therefore, even if the load is carried to a grounding point in a region where no operator is, the unloading operation can be performed reliably.

Further, according to the unloading device described above, the motor is continuously pulled out and driven to wind up the load after the traction member wound on the spool is pulled out and the load is lowered toward the ground, and it is detected by the detection means that the load touches the ground, so that the hook can be reliably released from the load. Therefore, since it is not necessary to visually confirm whether or not the load touches the ground as the hook does not wind up the load while hanging it, even if the load is carried to a grounding point in a region where no operator is, the unloading operation can be performed reliably.

Incidentally, various mechanisms are conventionally incorporated in a hoisting device including the electric hoisting machine as described above for allowing an object to be wound up and lowered in an optimum state by an electric or manual driving force, and such a hoisting device has various structural forms (for example, see Japanese Patent Application Publication No. 2006-182506, Japanese Unexamined Utility Model Application Publication No. H7-35481, Japanese Patent Application Publication No. H3-95098, and Japanese Patent Application Publication No. H5-338994.)

However, the installation of such a hoisting device is generally accompanied by a fastening operation with bolts or the like by a tool and requires an extensive assembling operation, so that once the hoisting device is installed, the removal thereof is complicated, and it is not possible for a single operator to easily assemble to install and disassemble the device.

Therefore, described below is a compact and lightweight portable hoisting device that can be freely carried by a person and can be easily attached to and detached from a predetermined installation object anywhere to quickly perform the operation of winding and lowering the object. It should be noted that the portable hoisting device described below is intended to be of a so-called lightweight type, which is different from the one for hoisting and lowering a heavy body such as a container, and allows an operator to easily install and lift and lower an object, and to easily remove the device after the operation. For this reason, the device is configured such that the total weight is about 100 g to 10 kg, and the load bearing capacity is preferably 100 kg or less.

Figure 26:
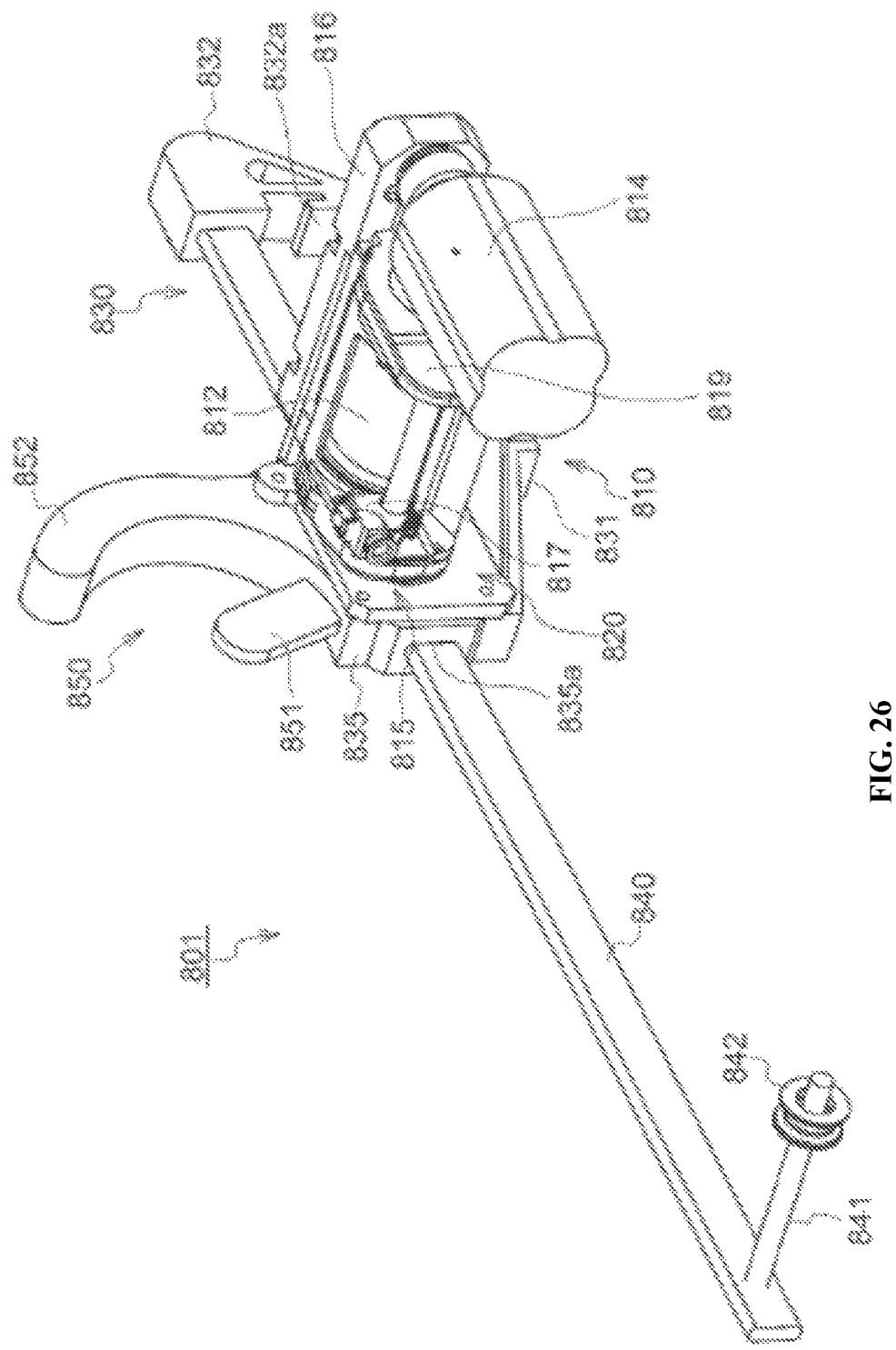
FIG. 26 shows a front perspective view of the portable hoisting device.
Figure 27:
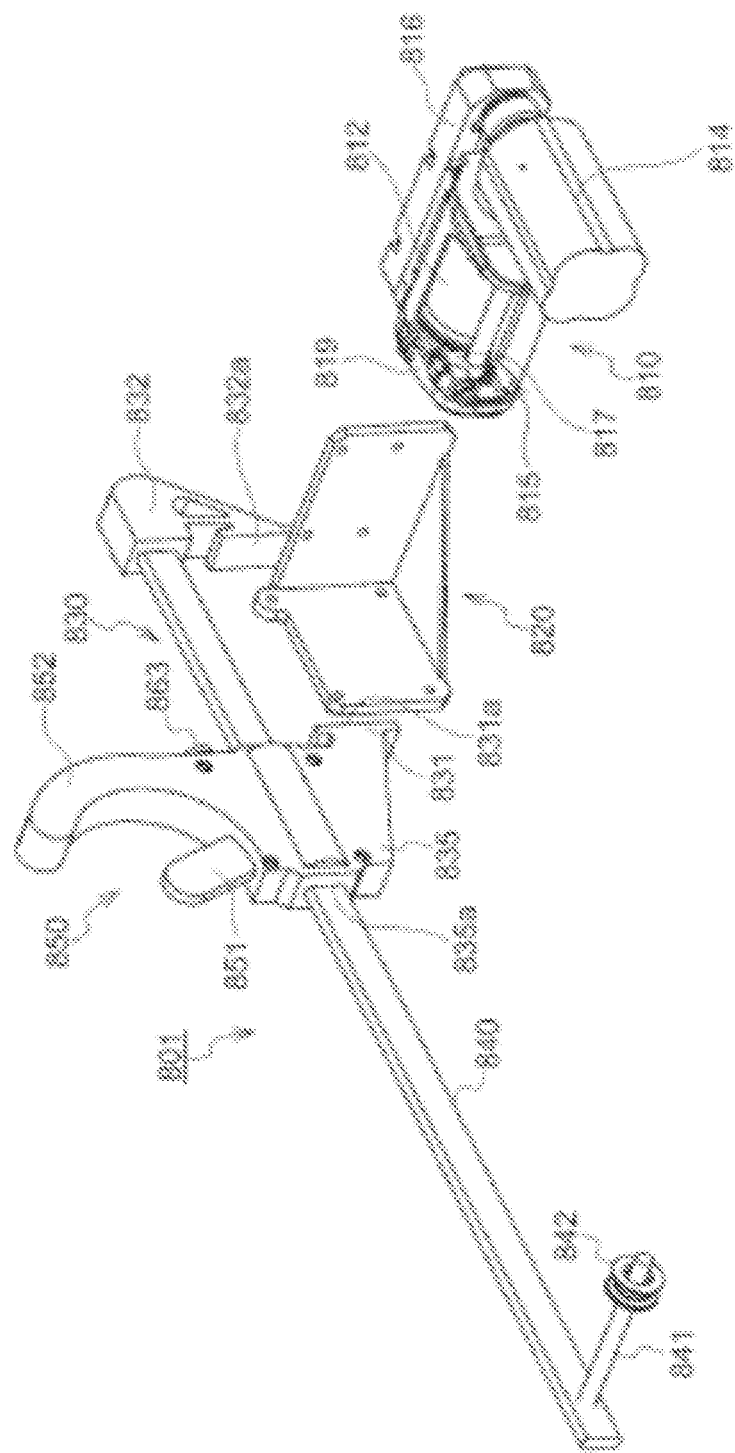
FIG. 27 shows an exploded perspective view of the portable hoisting device in FIG. 26.
Figure 28:
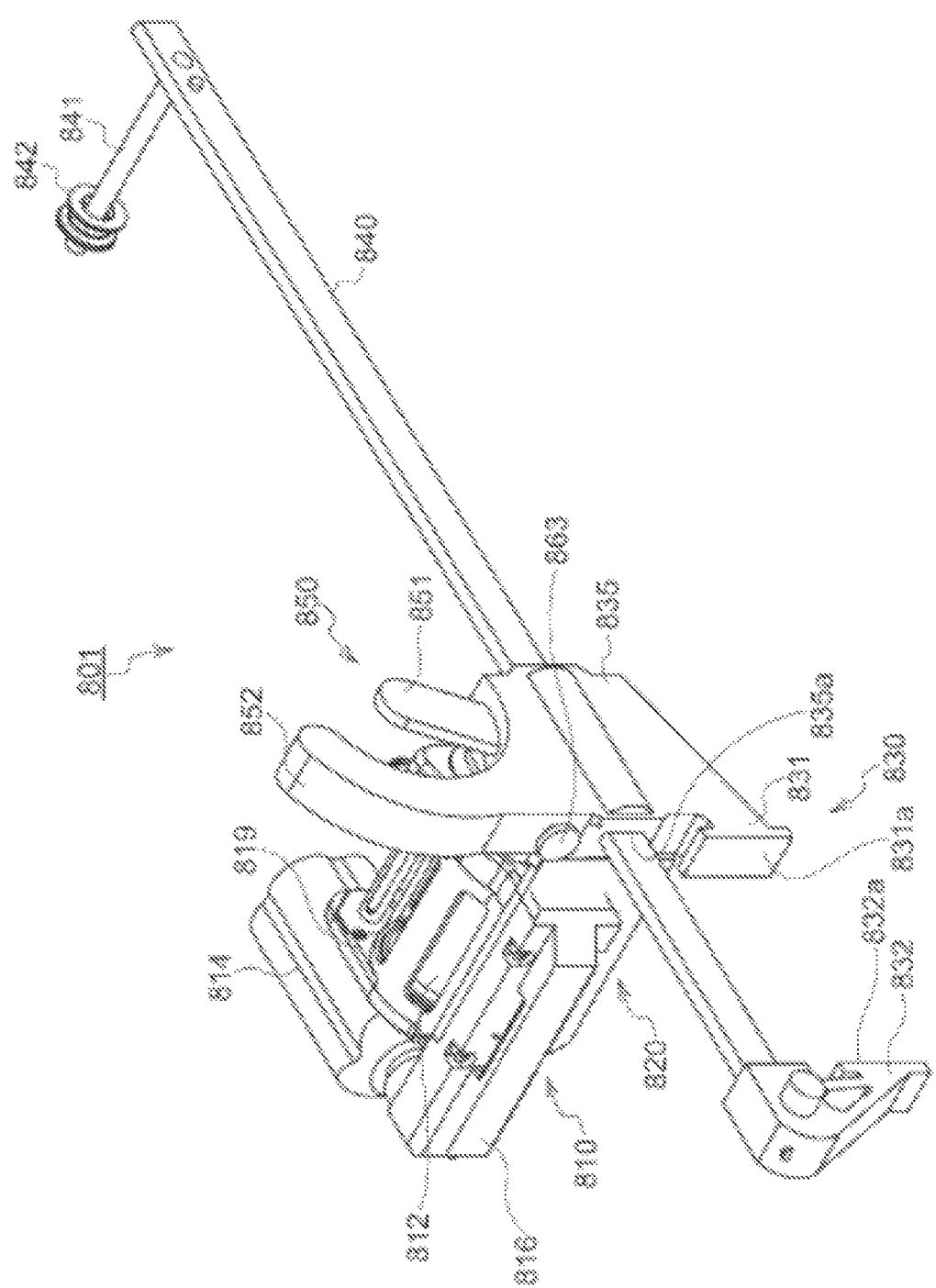
FIG. 28 shows a rear perspective view of the portable hoisting device in FIG. 26.

As shown in FIGS. 26 to 28, the portable hoisting device 801 according to the present configuration is electrically driven, and includes a device main body 810 having at least: an electric motor (not illustrated) as a driving force source for generating a rotational driving force; a cylindrical rotating body 812 for winding up and/or unwinding (hoisting) the traction member L (not shown in FIGS. 26 to 28; see FIG. 31) such as a wire, a chain and a rope for pulling a hoisting object to be rotated forward and backward by way of the forward and backward rotation drive of the electric motor; and a housing 819 for accommodating and holding a rotating body 812.

In this case, the rotating body 812 is rotatably supported by the housing 819 via a bearing (not illustrated) and the electric motor may be non-rotatably supported and fixed to the inside of the cylindrical rotating body 812 while being accommodated in a motor housing, for example, and is powered by a power source (for example, a battery) 814 removably mounted on the device main body 810 (for example, it has a structure similar to that of a known electric fishing reel). In this configuration, the housing 819 supporting the rotating body 812 and the power source 814 are integrated by a connector member 816, and the connector member 816 incorporates, for example, a power supply line for electrically connecting the power source 814 and the electric motor, a control line for electrically connecting an operation part for the rotating body 812 provided in the connector member 816 and/or the housing 819 and a control unit (not illustrated.)

The electric motor and the rotating body 812 are connected to each other by a power transmission mechanism (power transmission path), so as to be able to transmit power. In this case, the power transmission mechanism may include a bidirectional clutch that transmits the rotation of the electric motor to the rotating body 812 side but does not transmit the rotation of the rotating body 812 to the electric motor side, and may include a deceleration mechanism (in this configuration, a planetary gear mechanism) that reduces the power from the electric motor and transmits the reduced power to the rotating body 812.

The portable hoisting device 801 according to the present configuration is provided with a level winding device 815 for winding a traction member in parallel with the rotating body 812. The level winding device 815 is configured such that when the electric motor is rotationally driven to rotate, the guide body 817 that passes through the traction member unwound from the rotating body 812 moves reciprocally from side to side in conjunction with the rotation of the electric motor, and has a function of winding the traction member evenly around the rotating body 812 in accordance with the winding operation of the traction member.

The portable hoisting device 801 according to the present configuration includes: a support 820 for supporting the device main body 810; a detachable part 830 for attaching and detaching the support 820 to and from a predetermined installation object by crimping; and an arm part 840 extending from the detachable part 830 and holding a guide part 842 for stretching and guiding a traction member wound around the rotating body 812. In this configuration, the device main body 810 is attached and fixed to the support 820 by fastening means or the like, the support 820 is attached and fixed to a detachable part main body 835 described later of the detachable part 830 by fastening means or the like, and the arm part 840 is detachably and slidably attached to the detachable part main body 835 of the detachable part 830, whereby the device main body 810, the support 820, the detachable part 830 and the arm part 840 are configured as an integral part. That is, since the device main body 810, the support 820, the detachable part 830, and the arm part 840 are configured to be detachable and integrated into a unit, it has excellent portability, and these elements can be easily assembled/separated at the work site as necessary.

Figure 29:
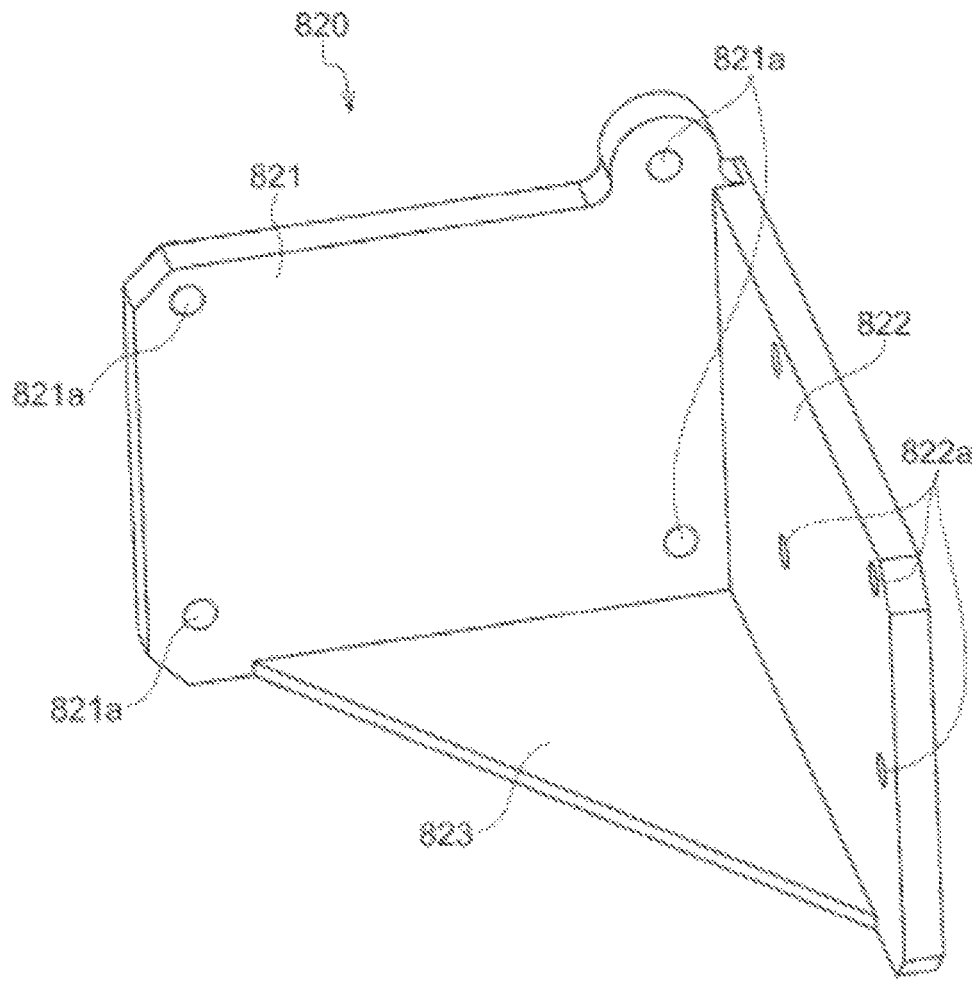
FIG. 29 shows a perspective view of a support constituting the portable hoisting device in FIG. 26.

In this case, as shown in FIG. 29, for example, the support 820 has: a base plate 823 for supporting at least the rotating body 812 and the housing 819 of the device main body 810 from the underside; a back plate 822 for protecting at least a back side of the rotating body 812 and the housing 819 of the device main body 810, which is interposed between the connector member 816 and the housing 819 of the device main body 810, for example, and is attached and fixed to the connector member 816 by fastening means; and a side plate 821 for protecting at least the side of the rotating body 812 and the housing 819 of the device main body 810, which is attached and fixed to the detachable part main body 835 of the detachable part 830 by fastening means. The side plate 821 and the back plate 822 are provided with a plurality of mounting holes 821a and 822a through which fasteners such as bolts are inserted.

The detachable part 830 includes: the detachable part main body 835; a first contact member 831 having a crimping surface 831a that contacts an installation object in a crimping state; a second contact member 832 that is disposed facing the first contact member 831 and has the crimping surface 832a that contacts the installation object in a crimping state; and an operation part 850 that is incorporated in the detachable part main body 835 and that changes the separation distance between the first contact member 831 and the second contact member 832. In this case, the first contact member 831 is fixed to the detachable part 830, and in particular, in the present configuration, is formed integrally with the detachable part main body 835, and the second contact member 832 can move with the arm part 840 with respect to the detachable part 830 (detachable part main body 835.)

More specifically, in this configuration, the arm part 840 is slidably inserted into the arm sliding hole 835a formed through the detachable part main body 835, and the second contact member 832 is detachably attached to the base end of the arm part 840. In addition, a support member 841 extending perpendicularly to the arm part 840 so as to cross the transfer path of the traction member unwound from the rotating body 812 is provided at the end of the arm part 840, and the above-described guide part (e.g., pulley) 842 for stretching and guiding the traction member wound around the rotating body 812 is held in the support member 841.

The operation part 850 incorporated in the detachable part main body 835 has a pair of operation members 851 and 852 that are rotated so as to be attachable to and detachable from each other, and by manipulating these operation members 851 and 852 by squeezing them in, for example, and the arm part 840 can be advanced and retracted with respect to the detachable part main body 835 via a ratchet clamp mechanism, a screw mechanism, a pinion rack mechanism, a spring mechanism or the like, which are not illustrated but are interposed between the operation members 851 and 852 and the arm part 840, in order to change the separation distance between the first contact member 831 and the second contact member 832. In this case, for example, the distance between the first contact member 831 and the second contact member 832 is reduced or increased by a predetermined pitch by squeezing a pair of operation members 851 and 852 once, and in addition, the force transmission relationship between the operation members 851 and 852 and the arm part 840 is released by pressing a predetermined switch button 863 provided on the detachable part main body 835, so that the arm part 840 can be slid freely (the distance between the first contact member 831 and the second contact member 832 may be freely changed.)

As the above-mentioned ratchet clamp mechanism, any known mechanism can be adopted, but more specifically, for example, the principle of the operating mechanism of the bar clamp as disclosed in Japanese Patent Application Publication No. H7-68472 and the principle of the operating mechanism of the grip powered vise as disclosed in Japanese Patent Application Publication No. H6-143152 (others are US2010/0276860, etc.) can be used. Further, as the screw mechanism described above, any known mechanism can be adopted similarly, but more specifically, for example, the principle of the operating mechanism of the clamp as disclosed in Japanese Patent Application Publication (Translation of PCT Application) No. 2011-524813, the principle of the operating mechanism of the screw clamp as disclosed in Japanese Patent Application Publication No. H6-339866, or the principle of the operating mechanism of the screw vise as disclosed in Japanese Patent Application Publication No. H10-309673 can be used.

Figure 30A:
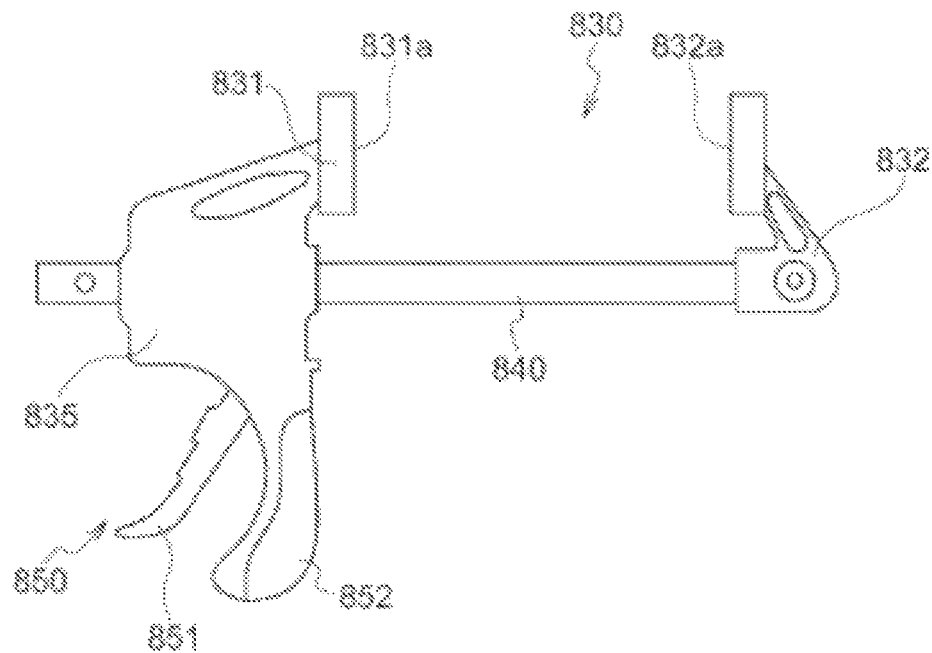
FIG. 30(a) shows a side view indicating an arrangement form of the first and second contact members for realizing the first crimping form of a detachable part.
Figure 30B:
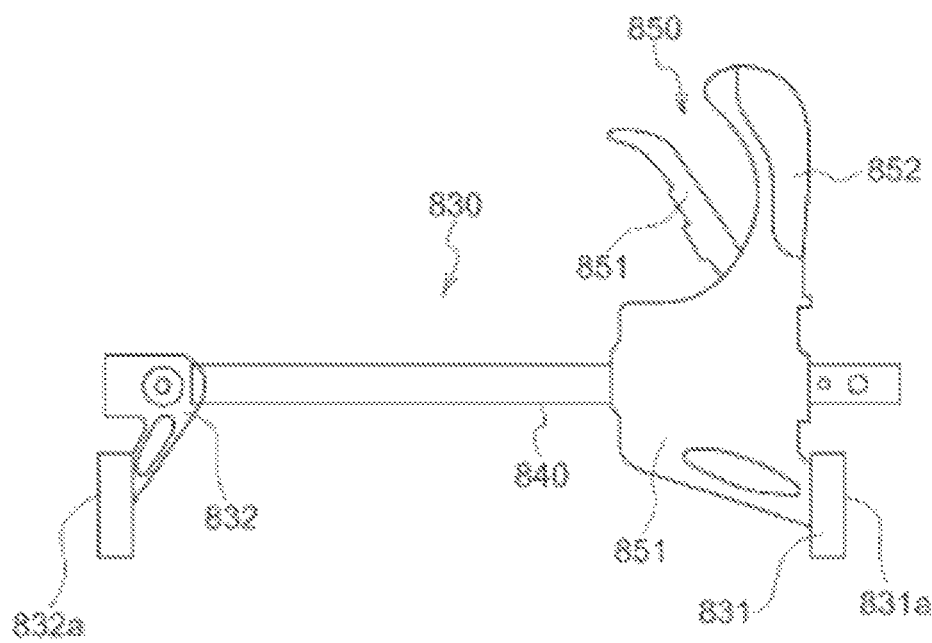
FIG. 30(b) shows a side view indicating an arrangement form of the first and second contact members for realizing the second crimping form of a detachable part.

FIG. 30 shows an example of an arrangement of the first and the second contact members 831 and 832 for realizing two different crimping forms of the detachable part 830. FIG. 30(a) shows an arrangement form of the first and the second contact members 831 and 832 shown in FIGS. 26 to 28, and in this first arrangement form (first crimping form), the crimping surfaces 831a and 832a of the first and the second contact members 831 and 832 face each other to be able to clamp the installation object between the first contact member 831 and the second contact member 832. On the other hand, in the first crimping form, for example, when the second contact member 832 is detached from the arm part 840 and the second contact member 832 is attached to the end of the arm part 840 in the opposite direction (such that the crimping surface 32a faces in the opposite direction to the crimping surface 831a) after the arm part 840 is inserted from the opposite side into the detachable part main body 835, the second crimping form as shown in FIG. 30(b) can be realized. In this second crimping form, the detachable part 830 is clamped between two installation objects facing each other in a crimped state.

Figure 31:
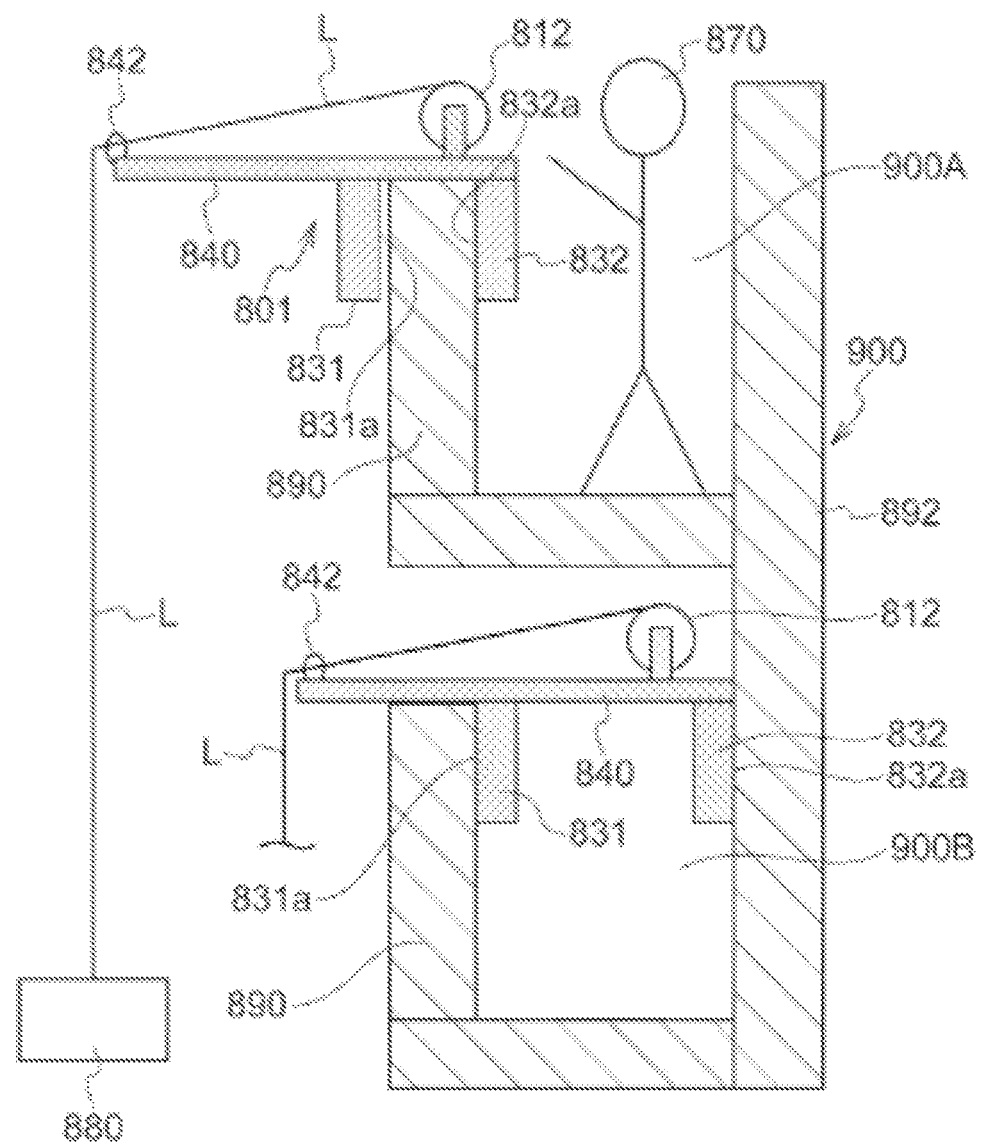
FIG. 31 shows a schematic diagram indicating an example of installing on an installation object and using the portable hoisting device in FIG. 26.

FIG. 31 shows an example of a usage pattern of the portable hoisting device 801 having the above-described configuration. In FIG. 31, for example, it is assumed that the portable hoisting device 801 is attached to a wall of a veranda of a condominium, and a hoisting object 880 is pulled up from the ground to an upper floor by the traction member L. FIG. 31 conceptually and schematically shows the above-mentioned portable hoisting device 801.

As illustrated, the portable hoisting device 801 is attached to a veranda 900A at the upper of FIG. 31 in the first crimping form shown in FIG. 30(a.) That is, the portable hoisting device 801 is attached by clamping an outer wall part 890 of the veranda 900A, which is an installation object, between the first contact member 831 and the second contact member 832. An operator 870 positioned in the veranda 900A can wind and/or unwind the traction member L guided by the guide part 842 from the rotating body 812 by driving and controlling the electric motor to rotate the rotating body 812, and carry the hoisting object 880 up from the ground to the upper floor or vice versa.

On the other hand, the portable hoisting device 801 is attached to a veranda 900B at the bottom of FIG. 31 in the second crimping form shown in FIG. 30(b.) That is, the portable hoisting device 801 is attached by clamping the detachable part 830 between the outer wall part 890 and an inner wall part 892 of the veranda 900B, which are two installation objects facing each other, in a crimping state. In this case as well, the operator 870 can wind and/or unwind the traction member L guided by the guide part 842 from the rotating body 812 by driving and controlling the electric motor to rotate the rotating body 812, and carry the hoisting object 880 up from the ground to the upper floor or vice versa.

As described above, according to the hoisting device 801 of the above-described configuration, all of the hoisting functions for winding and/or unwinding the traction member L to lift and lower the object 880 are integrated as one unit, and the detachable part 830 is provided which can be attached to and detached from the installation object by crimping instead of fastening means with bolts or the like by a tool, so that portability that a person can freely carry the device can be easily realized, and the hoisting and lowering operations of the object 880 can be quickly performed (in particular, in the above-described configuration, it is possible to quickly install and detach the object with one hand) by easily attaching and detaching a predetermined installation object anywhere, and reduction in size and weight can also be easily realized. In addition, since the detachable part 830 attaches/detaches the support 820 supporting the device main body 810 to/from an installation object, in other words, since the device main body 810 as the winding mechanism is provided in the detachable part 830, the center of gravity of the entire device can be brought close to the installation object, the stability of the entire device at the time of winding/unwinding of the hoisting object 880 can be sufficiently ensured, and the load bearing on the arm unit 840 can also be reduced.

It should be noted that the hoisting device 801 having the above-described configuration can be used for hoisting and lowering objects such as beddings, packaging, temporary scaffolding, buildings, and fishing tools to predetermined positions, and such a machine mounted on a drone can be used to take loads down from, or hoist loads onto, the drone in the air (for example, a drone is used to supply a floating tube to a drowning swimmer in the sea) the fields in which such a machine is used are not limited to those mentioned above.

In the configuration described above, the driving force source for generating the rotational driving force is an electric motor, but the rotational driving force may be generated manually. In this case, an operation handle or the like for rotationally operating the rotating body may be provided in the device main body as a driving force source. In the above-described configuration, the driving of the electric motor may be remotely controlled by using a mobile phone, a WiFi communication terminal or the like. Further, in the above-described configuration, a planetary gear mechanism is employed as a deceleration mechanism, but a wave gear device, such as the Harmonic Drive (registered trademark) and a spur gear may be employed as a deceleration mechanism. In the above-described configuration, the electric motor is accommodated in the rotating body, but the electric motor may be provided outside the rotating body. In the above-described configuration, the rotating body is rotated in the forward and backward directions by way of the forward and backward rotation drive of the electric motor, so that the traction member for pulling the hoisting object is wound up and/or unwound, but the traction member may be unwound by making the rotating body free of rotation by a clutch mechanism or the like without using the driving force of the electric motor.

Incidentally, a hoisting device including the above-mentioned electric hoisting machine may have an unloading hook which is suspended by a traction member such as a wire, a chain, a rope and a fishing line, and hooks various loads. Such an unloading hook is fastened to the traction member, and is used when a load body such as a carrying object is hooked on a hook part and carried in a vertical direction, or carried (in vertical and horizontal directions) to a different position while being hooked by the unloading hook. The unloading hook is provided with a locking mechanism, so that the load body hooked on the hook part is prevented from being detached when it is carried, and is detached when it is carried to a predetermined position.

As the above-mentioned locking mechanism, for example, as disclosed in Japanese Patent Application Publication No. 2002-128455, a structure is known in which after a load body is hooked on a hook part, a movable member energized by a spring to close an opening portion is rotated to close the opening portion, and an engaging part to engage with the movable member is disposed. The hook part is provided with an operation mechanism for operating the engaging part when the load from the load body is eventually lost (the load body touches the ground), so that the engaging part is moved to unlock the movable member at the stage where the load is eventually lost, and the load body can be detached from the hook part.

As an unloading hook, for example, as disclosed in Japanese Patent Application Publication No. S61-229792, there is also known a structure in which a hook part itself for hooking a load body is rotated. The unloading hook is provided with a driving rod that comes into contact with the upper surface of the load and is pushed up when the load body hooked by the hook part touches the ground (a force in a direction opposite to the gravity acts from the load) and is configured to rotate the hook part to release the load body when the driving rod is pushed up.

Such an unloading hook may be used not only to simply carry a load body in a vertical direction, but also be used mounted on an air vehicle such as a drone and carried for unloading to various places. In such a usage, the entire load body and traction member may be subjected to vibration and impact while being carried, and a rapid speed change may occur during lifting and lowering of the load body, so that the gravity applied to the hook part may be temporarily lost. For this reason, the above-mentioned known unloading hook cannot be used because when mounted on a traction member moving to various positions, there is a risk that the locking mechanism is released or the hook part rotates to cause the load body to drop.

Therefore, described below is an unloading hook in which a load body is not detached from the hook part even where the load body is carried to various places and unloaded.

Figure 35:
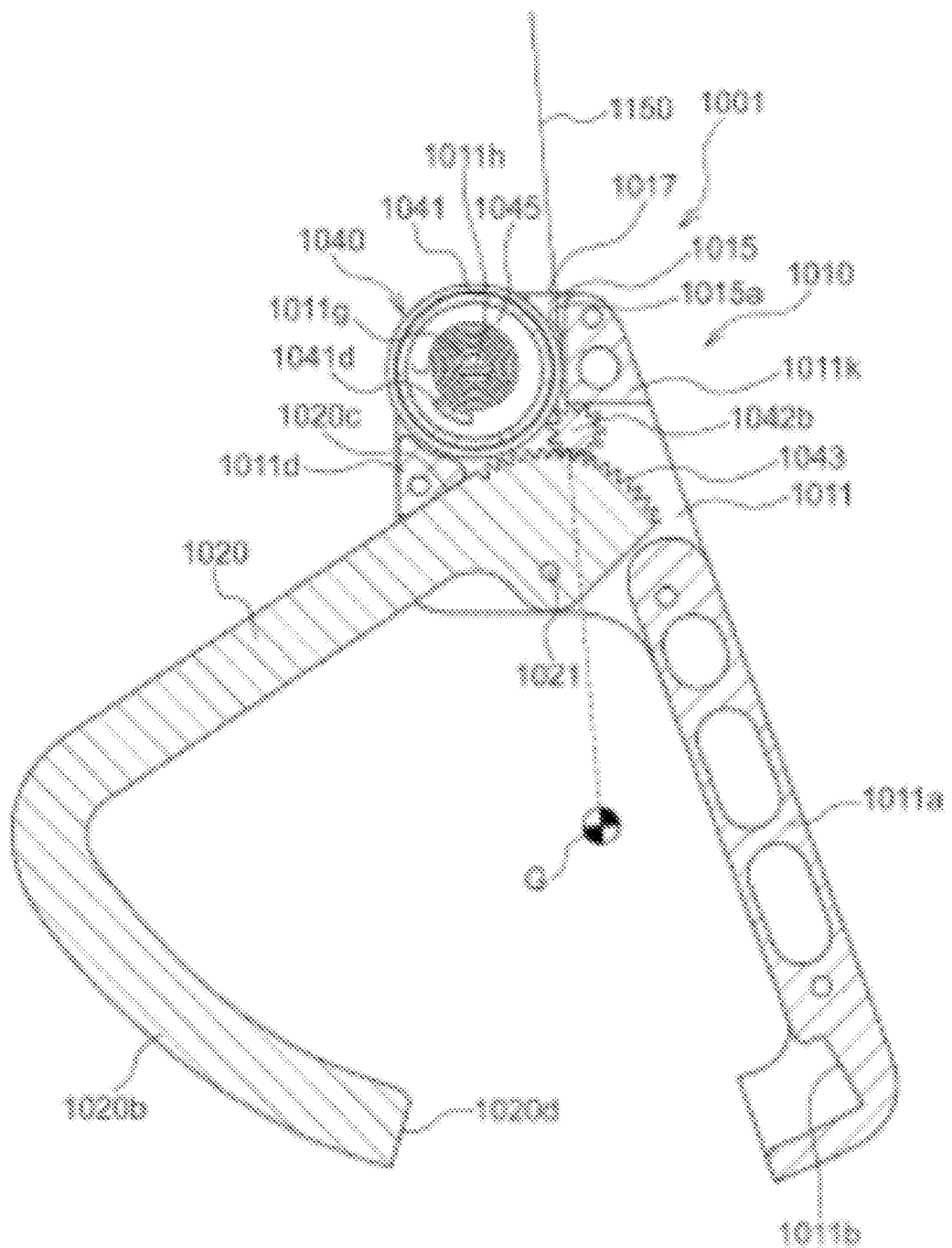
FIG. 35 shows a cross-sectional view indicating a condition in which a movable member is opened.
Figure 36:
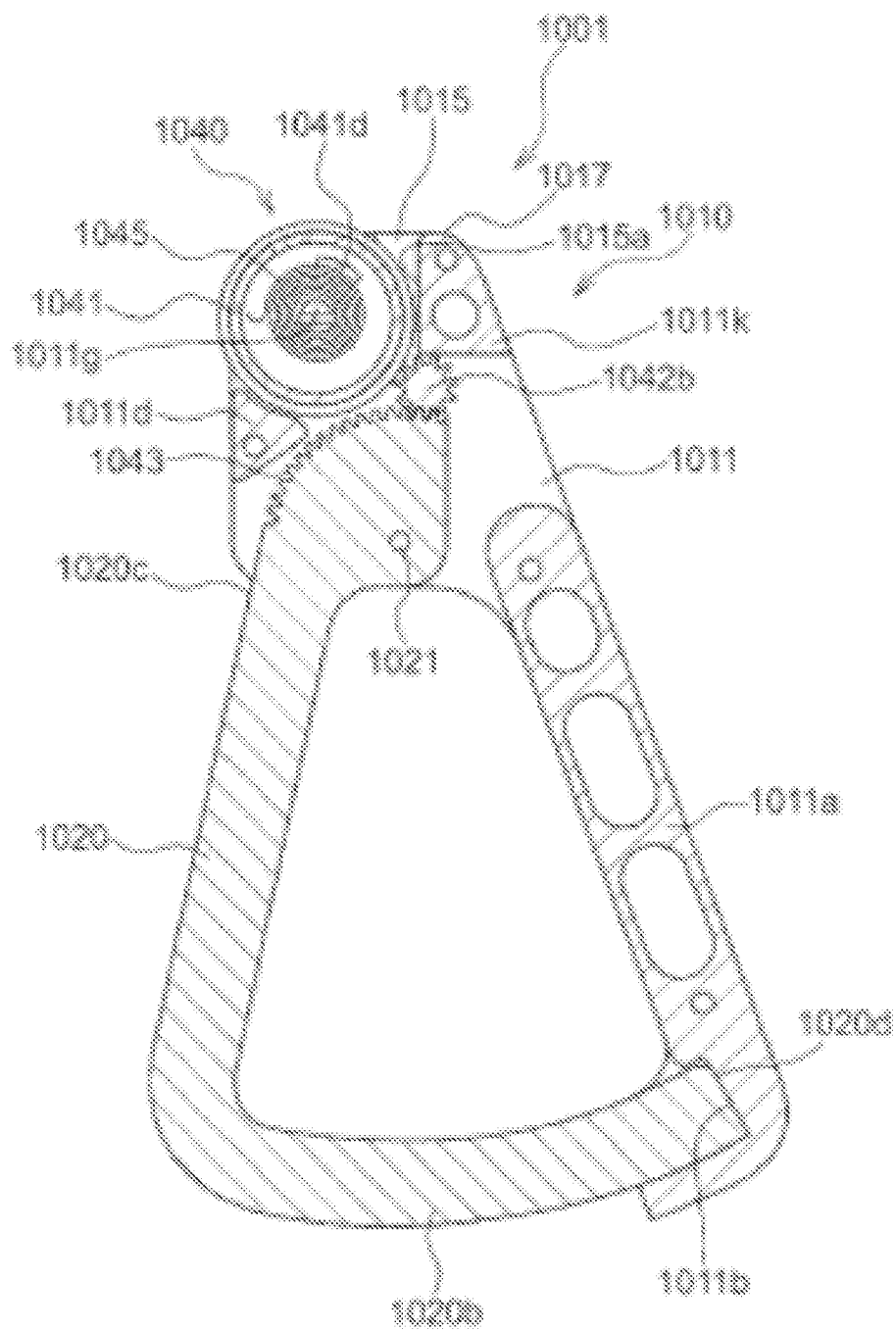
FIG. 36 shows a cross-sectional view indicating a condition in which a movable member is closed.
Figure 37:
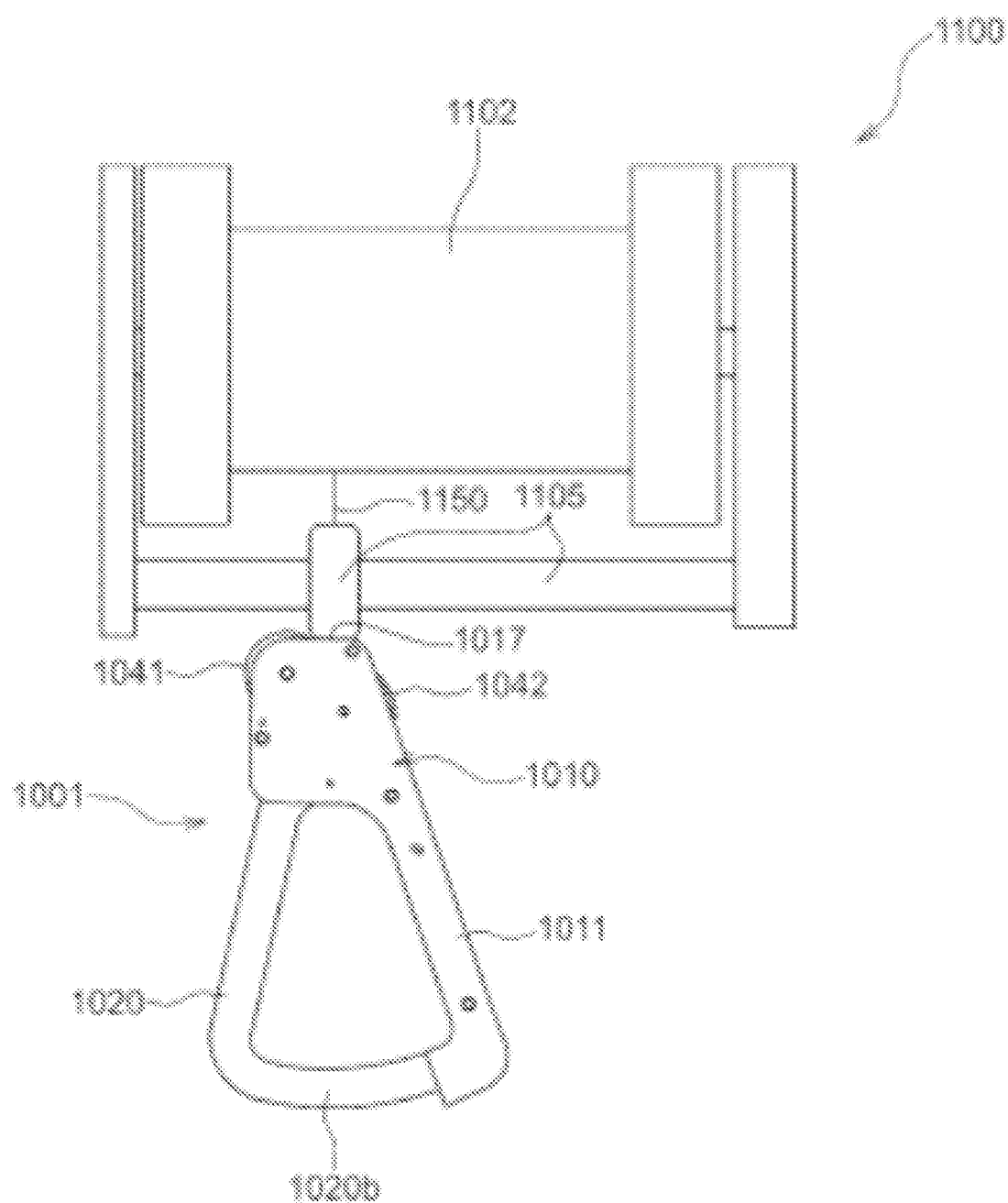
FIG. 37 shows a schematic view indicating an example of a condition in which the unloading hook shown in FIG. 32 is connected to a hoisting device.

An unloading hook 1001 shown in FIGS. 33 to 36 is suspended by a traction member 1150 which is wound/pulled out by a hoisting device 1100 (shown schematically in FIG. 37.) The traction member 1150 is configured by, for example, a wire, a chain, a rope and a fishing line, and is wound around a spool 1102 of the hoisting device 1100, and the spool 1102 is rotationally driven by a drive source not illustrated (e.g., motor) to perform an operation of hoisting (winding) or lowering (pulling out) the load body (load).

The configuration of the hoisting device 1100, such as the size, the winding force and the winding capacity of a spool, is not particularly limited. For example, it may be mounted on the underside of a drone or on various buildings, and a level winding mechanism 1105 may be incorporated, so that the traction member 1150 is wound evenly around the spool 1102.

The unloading hook 1001 includes a base member 1010 suspended by the traction member 1150, and a movable member 1020 movably supported between an open position and a closed position with respect to the base member 1010 and interlocked with a winding/pulling-out driving of the traction member 1150. The base member 1010 of the present configuration includes a base plate 1011 and a lid member 1012 that support the movable member 1020, so that the movable member 1020 can rotate (move) at a predetermined angle, and the movable member 1020 is clamped between these members and rotatably supported.

The base plate 1011 is formed of a plate-like member having a substantially L-shape, and includes a thick part 1011a extending downward with substantially the same thickness as the movable member 1020; and a closed end (concave part) 1011b formed integrally with the lower end of the thick part 1011a and stopping the rotation of the movable member 1020. A support hole 1011c for rotatably and pivotally supporting the movable member 1020 is formed on the base end side of the base plate 1011, and a regulating part 1011d for regulating the open end position of the movable member 1020 is formed to project.

The lid member 1012 is formed of a plate-like member having substantially the same shape as the base plate 1011, and is fixed to the base plate 1011 so as to overlap, thereby clamping the movable member 1020 with the base plate 1011 to rotatably support the movable member 1020. Therefore, the support hole 1011c for rotatably holding one end of a spindle 1021 provided in the center hole 1020a of the base of the movable member 1020 and a support hole 1012c for rotatably supporting the other end of the spindle 1021 are formed in the base plate 1011 and the lid member 1012, and a screw hole for bringing in contact with each other, and joining and fixing, the base plate 1011 and the lid member 1012 in an appropriate position, and by screwing a screw not illustrated, the movable member 1020 is clamped therebetween and rotatably supported.

The movable member 1020 is formed of, for example, a rod-shaped member having a rectangular cross-section, and the end side thereof is bent at approximately 90°, so that a load body (not illustrated) is hooked on a bent part 1020b. The spindle 1021 is provided at the base of the movable member 1020 in a direction orthogonal to the rotation direction of the movable member 1020, and both sides of the spindle 1021 are held by the support holes 1011c and 1012c of the base plate 1011 and the lid member 1012 as described above. In this case, the open position of the movable member 1020 is regulated by an abutting face 1020c on the base end side abutting against the regulating part 1011d formed to project from the base plate 1011 (see FIG. 35) and the closed position is regulated by an end face 1020d of the bent part 1020b abutting against the concave part 1011b (see FIG. 36.) That is, the movable member 1020 is rotatably supported about the spindle 1021 with respect to the base member 1010 between the open position shown in FIG. 35 and the closed position shown in FIG. 36.

In a state where the movable member 1020 having the above-described configuration is constrained to the closed position, as shown in FIG. 36, the movable member 1020 forms a closed curve that is closed together with the base member 1010, and the load body is prevented from being detached by suspending the load body within the closed curve. Therefore, when the movable member 1020 moves to the open position, the load body is released from the bent part 1020b of the movable member 1020.

The movable member 1020 is energized with respect to the base member 1010 so as to move the movable member 1020 toward the open position. The energizing force acting on the movable member 1020 is generated by disposing an energizing member such as a spring and a magnet between the movable member 1020 and the base member 1010.

As described above, the movable member 1020 which is rotatably supported in the state of being energized to the open position side is connected so as to be interlocked with the driving of the traction member 1150. In this case, one end of the traction member 1150 may be fixed to the movable member 1020, but it is preferable that the driving speed of the traction member 1150 is decelerated and connected to the movable member 1020, and in this configuration, a deceleration mechanism 1040 for decelerating the movement of the traction member 1150 to transmit it to the movable member 1020 is disposed between the movable member 1020 and the base member 1010, and one end of the traction member 1150 is fixed to part of the deceleration mechanism 1040, more specifically, to an outer peripheral part of a pulley 1041 constituting part of the deceleration mechanism 1040. As a result, since the movable member 1020 is interlocked with the driving of the traction member 1150, the base member 1010 is suspended from the traction member 1150 via the deceleration mechanism 1040 (when the deceleration mechanism 1040 is not disposed, the base member 1010 is suspended from the traction member 1150 via the movable member 1020.) The traction member 1150 is guided to the inside via a guide part 1015 formed on the upper end side of the base plate 1011 and the lid member 1012, is decelerated by the deceleration mechanism 1040, and the driving force thereof is transmitted to the movable member 1020. Further, the upper ends of the base plate 1011 and the lid member 1012 are provided with an abutting part 1017 that abut against the hoisting device when the traction member 1150 is wound up.

Hereinafter, the configuration of the deceleration mechanism will be described.

The deceleration mechanism 1040 of this configuration is configured to decelerate the movement of the traction member 1150 guided to the inside via the guide part 1015 and transmit the decelerated movement to the movable member 1020 by a power transmission mechanism using a gear supported by the base member 1010.

The deceleration mechanism 1040 includes: the pulley 1041 having on the outer peripheral edge thereof a winding groove 1041a for winding the traction member 1150 guided to the inside via the guide part 1015; a small gear 1041b formed integrally with the spindle part of the pulley 1041; an intermediate gear (two-stage gear) 1042 provided with a large gear 1042a meshing with the small gear 1041b and a connection gear 1042b formed integrally with the spindle of the large gear 1042a; and a movable member gear (sector gear) 1043 formed around the spindle 1021 on the outer peripheral surface of the arc-shaped base of the movable member 1020 and meshing with the connection gear 1042b.

In the power transmission mechanism using a gear described above, by appropriately setting the gear ratio, the rotation speed of the pulley 1041 around which the traction member 1150 is wound can be decelerated and transmitted to the movable member 1020, and in this configuration, the deceleration ratio is set to 9:1.

The base member 1010 (the base plate 1011 and the lid member 1012) is formed with a holding part for holding the constituent elements of the deceleration mechanism 1040. More specifically, the lid member 1012 is formed with a gear support hole 1012f for supporting a spindle 1042c of the intermediate gear 1042, and a pulley support hole 1012g for supporting a spindle 1041c of the pulley 1041. The base plate 1011 is formed with a gear support hole 1011f for supporting a spindle 1042c of the intermediate gear 1042 and a pulley shaft 1011g for rotatably supporting the pulley 1041, and the pulley shaft 1011g is formed with a spring hooking part 1011h to which one end of an energizing member for energizing the movable member 1020 to move toward the open position.

The pulley 1041 is formed in a substantially cup shape, the winding groove 1041a for winding the traction member 1150 is formed on the outer peripheral surface thereof, and a spiral spring ("spring") 1045 as an energizing member is held in an annular recess thereof. One end of the spring 1045 is fixed to the spring hooking part 1011h formed on a pulley shaft 1011g of the base plate 1011, and the other end thereof is engaged with a spring hook 1041d formed to project into the annular recess, so as to apply energizing force (restoring force for restoring the movable member 1020 to the open position side) to the pulley 1041. That is, this energizing force is transmitted to the movable member 1020 through the deceleration mechanism 1040 as a result of the meshing of the gears, and the energizing force is generated so that the movable member 1020 is in the open state.

Since the traction member 1150 wound around the pulley 1041 hangs vertically downward, by forming the guide part 1015 with a gap extending in the vertical direction, it is possible to make the traction member 1150 difficult to deviate from a predetermined position. The guide part 1015 can be formed by, for example, a thick part 1011k having a guide face 1015a extending in the vertical direction on the base plate 1011. Further, as to the traction member 1150, it is preferable to use a material such as a stainless wire which has a certain degree of high rigidity and the curvature radius of which is not reduced even when no load is applied, whereby it is possible to control tangling of the traction member 1150 when no load is applied.

The spring 1045 applies an energizing force in a rotation direction of the pulley 1041, that is, an energizing force for moving the movable member 1020 from the closed position to the open position via a power transmission mechanism in a deceleration mechanism, and when the energizing force is strong, the movable member 1020 becomes easy to open, and when the energizing force is weak, the movable member 1020 becomes difficult to open (since the movable member remains closed, safety increases.) In this case, since the movable member 1020 opens and closes with the movement of the traction member 1150 through the deceleration mechanism 1040, the open/closed state changes according to the relationship between the energizing force of the spring 1045 held by the pulley 1041 and the tensile force acting on the traction member 1150. Assuming that the sum of the weight of the unloading hook 1001 itself and the weight of the load suspended there acts on the traction member 1150 and that the unloading hook 1001 moves up and down, the energizing force of the spring 1045 is set so that the movable member 1020 can move to the closed position against the energizing force when a tension equal to or greater than the self-weight of an unloading hook 1 acts on the traction member 1150 (the movable member 1020 moves to the open position by the restoring force when a tension about the self-weight of the unloading hook 1001 acts on the traction member 1150), the unloading hook 1001 is pulled out, a load body starts to touch the ground, and finally, when the load of the load body is eventually lost, the movable member 1020 can be opened from the closed position.

In the following, when a tension of the self-weight of the unloading hook 1001 acts on the traction member 1150, the tension that allows the movable member 1020 to close against the energizing force of the spring 1045 (in other words, a tension that balances a tension acting on the traction member due to the self-weight of the unloading hook 1001 and the restoring force of the spring 1045) is referred to as a threshold tension.

The spring 1045 may be a spring with an emerging force equal to or lower than the threshold tension (the energizing force of the spring is weak), but in such a spring 1045, the movable member 1020 does not open even if a tension of about the self-weight of the unloading hook 1001 acts on it at the time of unloading and therefore, in such a spring with a weak energizing force, the movable member 1020 does not open unless the unloading hook 1001 is lowered to have a load body as well as the unloading hook 1001 touch the ground so that a tension of the traction member 1150 becomes weak. On the other hand, if the energizing force is too large, the movable member 1020 easily opens, which is not preferable particularly in the case where a light load is carried.

The energizing force of the spring 1045 is determined based on the weight of the unloading hook 1001 and the weight of the load body (load) to be carried. For example, when the energizing force of the spring 1045 is balanced with the threshold tension described above, the movable member 1020 may be opened at a stage when the load is lowered and touches the ground, and the gravity of the load is eventually eliminated from the traction member 1150. That is, in such a configuration, even if there is no operator or the like at the point of unloading, it is possible to release the load from the unloading hook 1001 when the load touches the ground and gravity is eventually lost.

In this case, if the energizing force of the spring 1045 is smaller than the threshold tension described above, the gravity of the unloading hook starts to decrease when the load and then, the unloading hook 1001 touch the ground, and a predetermined state is reached, the movable member is opened. Actually, it is preferable that the energizing force (restoring force) of the spring 1045 is set so that the movable member 1020 moves from the closed position to the open position when a certain tension of 10% or more of the weight of the unloading hook 1001 is applied at the time of unloading. That is, if the energizing force is set to a tension of less than 10%, the movable member 1020 will not open immediately even if the unloading hook 1001 touches the ground, and will not open unless the gravity decreases considerably such as where the unloading hook 1001 turns sideways; therefore, it is preferable to set the energizing force to 10% or more.

Further, in consideration of carrying a light load, the upper limit of the energizing force of the spring 1045 is preferably set so that the movable member 1020 moves from the closed position to the open position by the energizing force (restoring force) of the spring 1045 when a specific tension of 300% or less of the weight of the unloading hook 1001 is applied, because the movable member 1020 is easily opened when a too strong force is used. This is because, in consideration of carrying various loads having different weights, the energizing force of the spring 1045 is preferably set to a tension equal to or less than the sum of the weight of the unloading hook 1001 and the weight of the loads, and as described above, if a specific tension equal to or less than 300% of the weight of the unloading hook 1 is set, it becomes possible to make it difficult to cause the movable member 1020 to open even if a certain light loads are carried.

Next, a series of usages will be described in which the unloading hook 1001 and the hoisting device 1100 described above are mounted on a movable body such as a drone, a load (load body) is hooked on the unloading hook 1001, and unloaded at a destination. In this configuration, it is assumed that the energizing force of the spring 1045 of the unloading hook 1001 is set to the above-described threshold tension.

(1) Since no tension is applied to the traction member 1150, for example, when the unloading hook 1001 is placed on the ground or held in a hand, the movable member 1020 is moved to the open position by the energizing force of the spring 1045 (see FIG. 35.) In this condition, the user sets the load to be suspended through the opening between the movable member 1020 and the base member 1010.

Figures 32A, 32B:
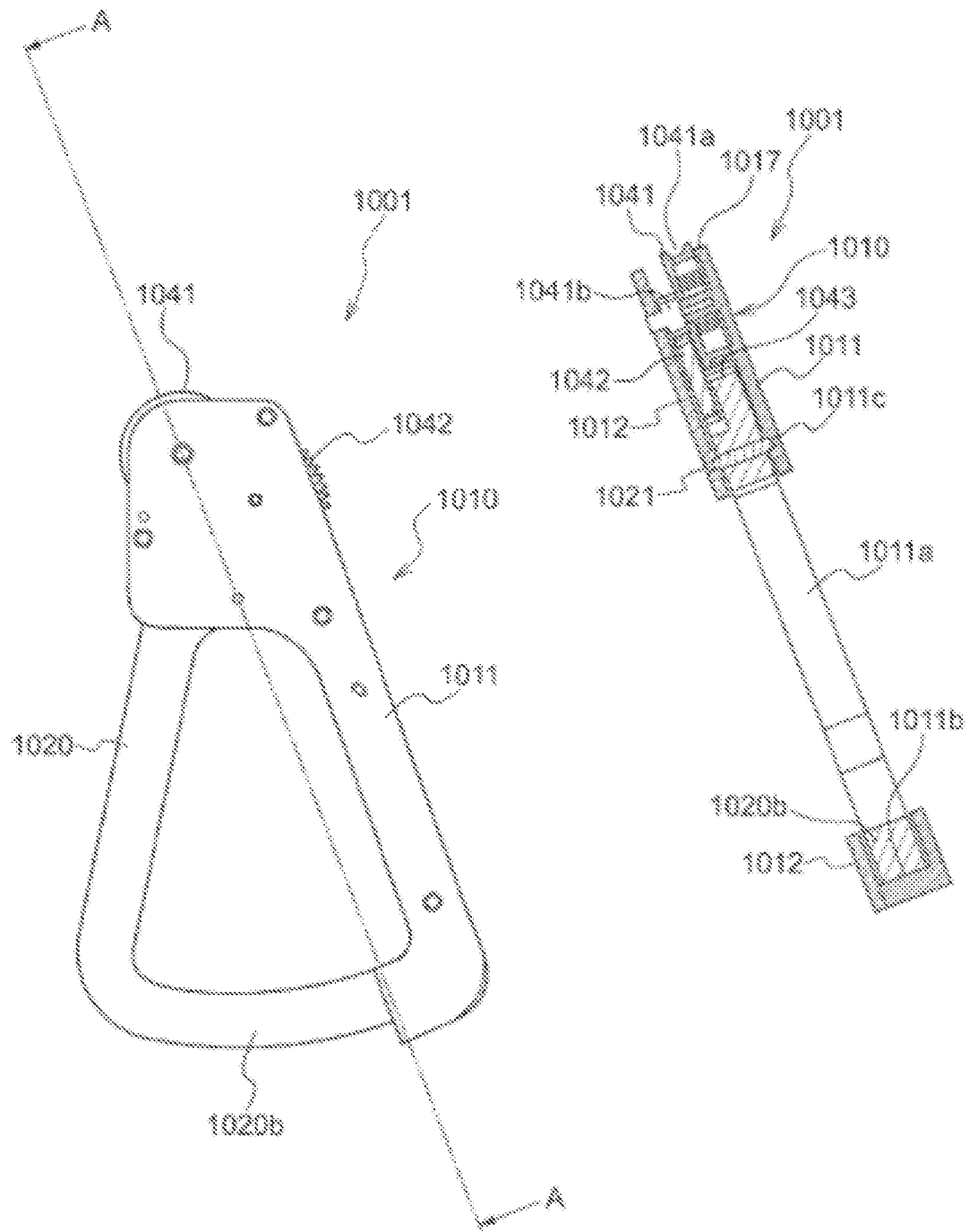
FIGS. 32(a) and (b) show views indicating a first example of an unloading hook, in which (a) is a front view, and (b) is a cross-sectional view along the line A-A in FIG. 32(a).

(2) Next, when an operation such as pulling the traction member 1150 or hanging the unloading hook 1001 is performed to apply a force equal to or larger than the threshold tension to the traction member 1150, the movable member 1020 rotates to the closed position against the energizing force of the spring 1045 (a restoring force is charged in the spring 1045) and the movable member 1020 is in the closed state (see FIGS. 32 and 36.) In this condition, the movable member 1020 will not open unless the tension of the traction member 1150 falls below the threshold tension and thus, the suspended load will not be released from the unloading hook 1001.

(3) Next, when the spool 1102 of the hoisting device 1100 for hanging the traction member 1150 is driven to further wind up the unloading hook 1, thy: abutting part 1017 of the upper end of the base member 1010 of the unloading hook comes into contact with a portion of the hoisting device 110 see FIG. 37.) In this condition, the movable member 1020 will not open unless the traction member 1150 is pulled out from the hoisting device 1100 even if a tension acting on the traction member 1150 temporarily becomes equal to or less than the threshold tension such as where the speed of lifting or lowering of the traction member 1150 is suddenly accelerated or decelerated, the entire hoisting device 1100 suspending the traction member 1150 is subjected to a large vibration, shock, or falls freely. Therefore, in cases such as where the hoisting device 1100 is moved, the load does not fall in this condition.

(4) Thereafter, when the hoisting device (drone) is moved to a position where the load is supposed to be unloaded, the spool 1102 of the hoisting device 1100 is driven to eject and the traction member 1150 is pulled out (lowered.) In this case, if in a state in which the traction member 1150 is pulled out by a predetermined length or more, an abnormal situation such as when subjected to the above-described shock or the like occurs and the tension acting on the traction member 1150 becomes equal to or less than the threshold tension, the movable member 1020 may move to the open position before the load touches the ground. However, by disposing the deceleration mechanism 1040 and setting the deceleration ratio to an appropriate value as in the present configuration, the risk of opening of the movable member 1020 can be reduced.

Then, when the load and the unloading hook 1001 touch the ground (the load touches the ground first), the tension due to the gravity acting on the traction member 1150 gradually reduces and falls below the threshold tension (the tension due to the gravity of the load is eventually lost) the movable member 1020 is moved to the open position by the energizing force (restoring force) of the charged spring 1045, and the load is released from the unloading hook 1001. In this case, as shown in FIG. 35, it is preferable that the movable member 1020 and the base member 1010 are disposed such that the openings of both face the direction of gravity (downward) so that the load can be smoothly released. That is, it is preferable that the load is disposed so that it is automatically released even if no operator or the like is at the dropping position. Further, in order to make the opening face the direction of gravity at this time, it is desirable to select the shape and the specific gravity of the material so that the center of gravity G (see FIG. 35) when the movable member 1020 is at the open position is on the base member 1010 side. By doing so, when the unloading hook 1001 is suspended, the state in which the traction member 1150 is in range with the center of gravity G is an equilibrium position and therefore, when the center of gravity is on the base member 1010 side, the opening of the movable member 1020 tends to face downward, which makes it easier to drop a load. In addition to selecting the above-described shape and specific gravity of the material, a heavy load may be separately mounted on the base member side, or the introduction position of the traction member 1150 into the main body may be set on the base member side (on the thick part 1011*a* side of the base plate 1011.)

In the above-described configuration, when the energizing force of the spring 1045 is set to slightly larger than the above-described threshold tension, the movable member 1020 opens after the load touches the ground and before the unloading hook 1001 touches the ground, so that a smooth unloading operation can be performed. In this case, when the unloading hook 1001 is pulled up after the load is released, the movable member 1020 is opened. If the energizing force of the spring 1045 is excessively large with respect to the threshold tension, as described above, the movable member 1020 is not closed when the weight of the load is light, or the movable member 20 easily opens due to vibration or the like while being lifted or lowered; therefore, the energizing force of the spring 1045 may be appropriately set depending on the weight of the load to be carried (as described above, it is preferable to set the spring 1045 to open when a specific tension of 300% or less of the weight of the unloading hook 1001 applies.)

When the energizing force of the spring 1045 is set to slightly smaller than the threshold tension, the movable member 1020 opens after both the load and the unloading hook 1001 touch the ground. In this case, when the unloading hook 1001 is pulled up after the load is released, the movable member 1020 is closed. If the energizing force of the spring 1045 is set to further smaller than the above-mentioned threshold tension, the restoring force of the spring 1045 is overwhelmed by the sliding resistance of the movable member 1020 and the like, and the movable member 1020 can hardly move to the open position (therefore, a load is more reliably prevented from falling inadvertently); therefore, it is preferable to have an operator stand by at the grounding point when a load is released.

As described above, the energizing force of an energizing member (spring) that energizes the movable member 1020 toward the open position side should be set to an appropriate value in accordance with the self-weight of the unloading hook, the possible weight of the load, the usage and the like because the load is easily released when it is not supposed to if the energizing force is excessively large with respect to the threshold tension, and it is difficult to be released when it is supposed to if the energizing force is excessively small with respect to the threshold tension.

According to the unloading hook 1001 described above, the following effects can be obtained.

Since the movable member 1020 rotatably supported with respect to the base member 1010 is configured to interlock with the winding/pulling-out driving of the traction member 1150, if the movement of the traction member 1150 is stopped, for example, by bringing the unloading hook itself into contact with the hoisting device 1100 as described in (3) above, the movable member 1020 cannot move to the open position, so that it is reliably prevented from falling when a load is carried. That is, as described above, when the hoisting device 1100 is mounted on a drone or the like, even under circumstances where the entire hoisting device is subjected to violent movement and vibration, it is possible to reliably prevent the load from falling.

Even if a slight gap exists between the hoisting device 1100 and the unloading hook 1001 in the tensioned state of the traction member 1150 after the load is suspended, it is also possible to reliably prevent the load from falling by disposing a line fixing tool or the like that does not loosen the traction member 1150 or restrict the winding of the pulley 1041.

In the above-described configuration, the deceleration mechanism 1040 is disposed to decelerate the movement of the traction member 1150 and transmit the decelerated movement to the movable member 1020. As a result, even if the traction member 1150 slightly moves or extends or a slight gap exists between the hoisting device 1100 and the unloading hook 1001 in the state (3), the movement of the traction member 1150 decelerates and is transmitted to the movable member 1020, so that the movable member 1020 hardly moves, which can effectively prevent the load from falling.

Further, mechanical resistance such as sliding resistance acts on the movable member 1020. This resistance tends to become larger when subjected to an external force such as suspending of a load or when a foreign matter is caught. On the other hand, the lighter the weight of the unloading hook 1001 itself is, the more the power is saved for the hoisting device 1100, and it is not preferable that the threshold tension referred to above, which is the threshold value when the spring 1045 opens and closes, largely deviate from that equivalent to the weight of the unloading hook 1001 as described above (if the energizing force is too weak, the movable member is difficult to open, and if the energizing force is too strong, the movable member is easy to open.) That is, there is a limit in increasing the energizing force of the spring.

In the above-described configuration, since the energizing force of the spring 1045 and the tension acting on the traction member 1150 are decelerated and boosted by the deceleration mechanism 1040 and transmitted to the movable member 1150, the opening and closing operation of the movable member 1020 can be stably performed even when the mechanical resistance acting on the movable member 1150 increases. In other words, even if the weight of the unloading hook 1001 or the energizing force of the spring 1045 is not increased, a stable operation can be realized by the action of the deceleration mechanism.

Further, since the deceleration mechanism 1040 having the above-described configuration is configured to reduce the speed by the gear ratio of meshing of gears (gear train) and disposes a pulley in part of the gear deceleration mechanism to wind the traction member 1150, the path of the traction member 1150 passing through the inside of the unloading hook 1001 can be shortened. As a result, even when the traction member 1150 moves within the unloading hook, because for example, the tension of the traction member 1150 is lost, the trouble of tangling of traction members becomes less likely.

Further, by using a gear train as a deceleration mechanism, it is possible to increase the speed reduction ratio with a relatively small size, lightweight, and simple configuration. By increasing the reduction ratio, the opening and closing operation of the movable member 1020 can be stably performed as described above.

As described above, in the unloading hook having the above-described configuration, since the movable member and the traction member move in conjunction with each other, if the traction member is wound up until a base member comes into contact with the hoisting machine (winch body) at the time of carrying a load body, the movable member cannot be opened to the open position side unless the traction member is discharged from the hoisting machine. For this reason, even in a usage in which the load body is carried to various places and lowered, the load body does not fall inadvertently while being carried.

Figure 38:
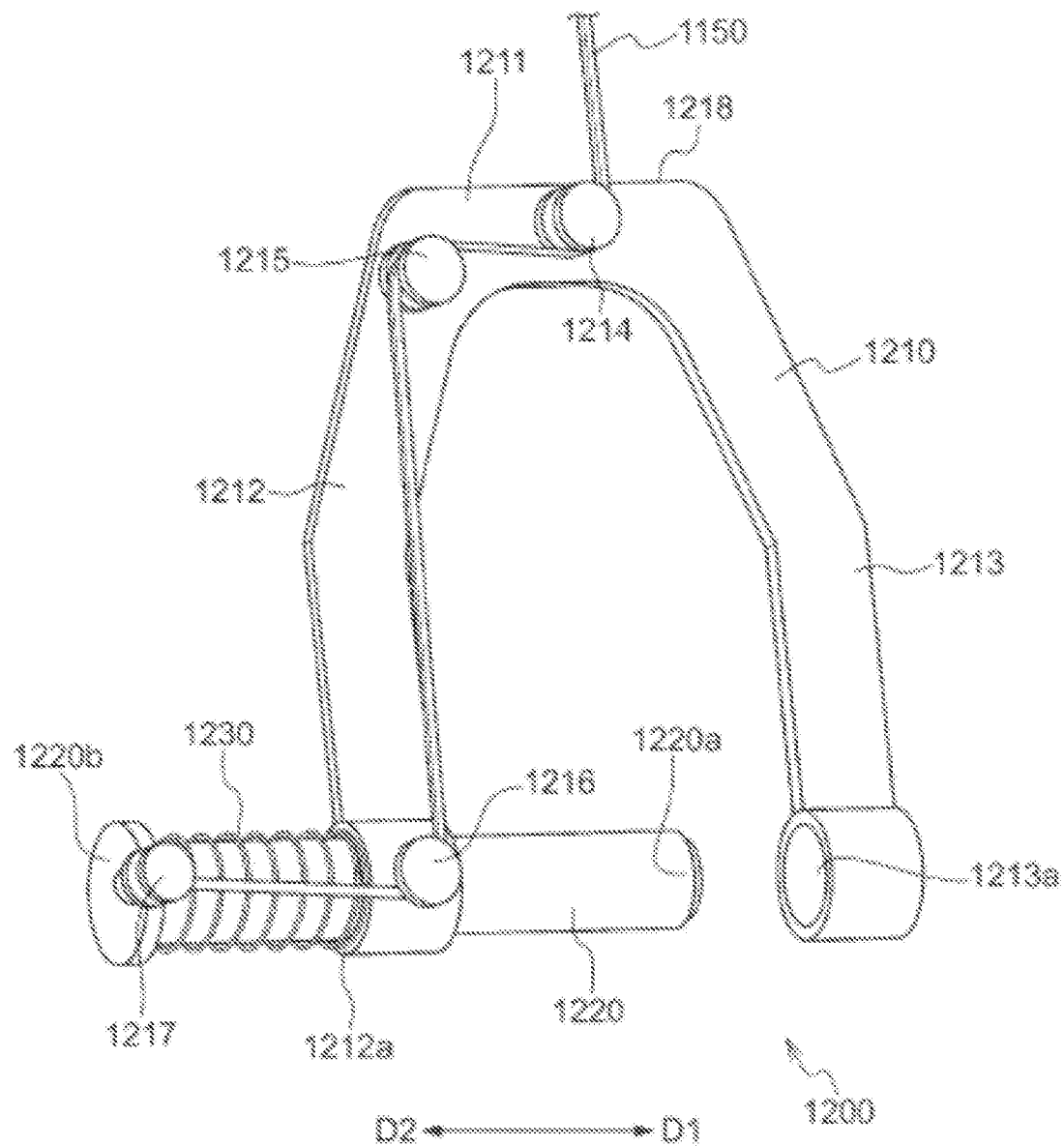
FIG. 38 shows a diagram indicating a second example of the unloading hook.
Figure 39:
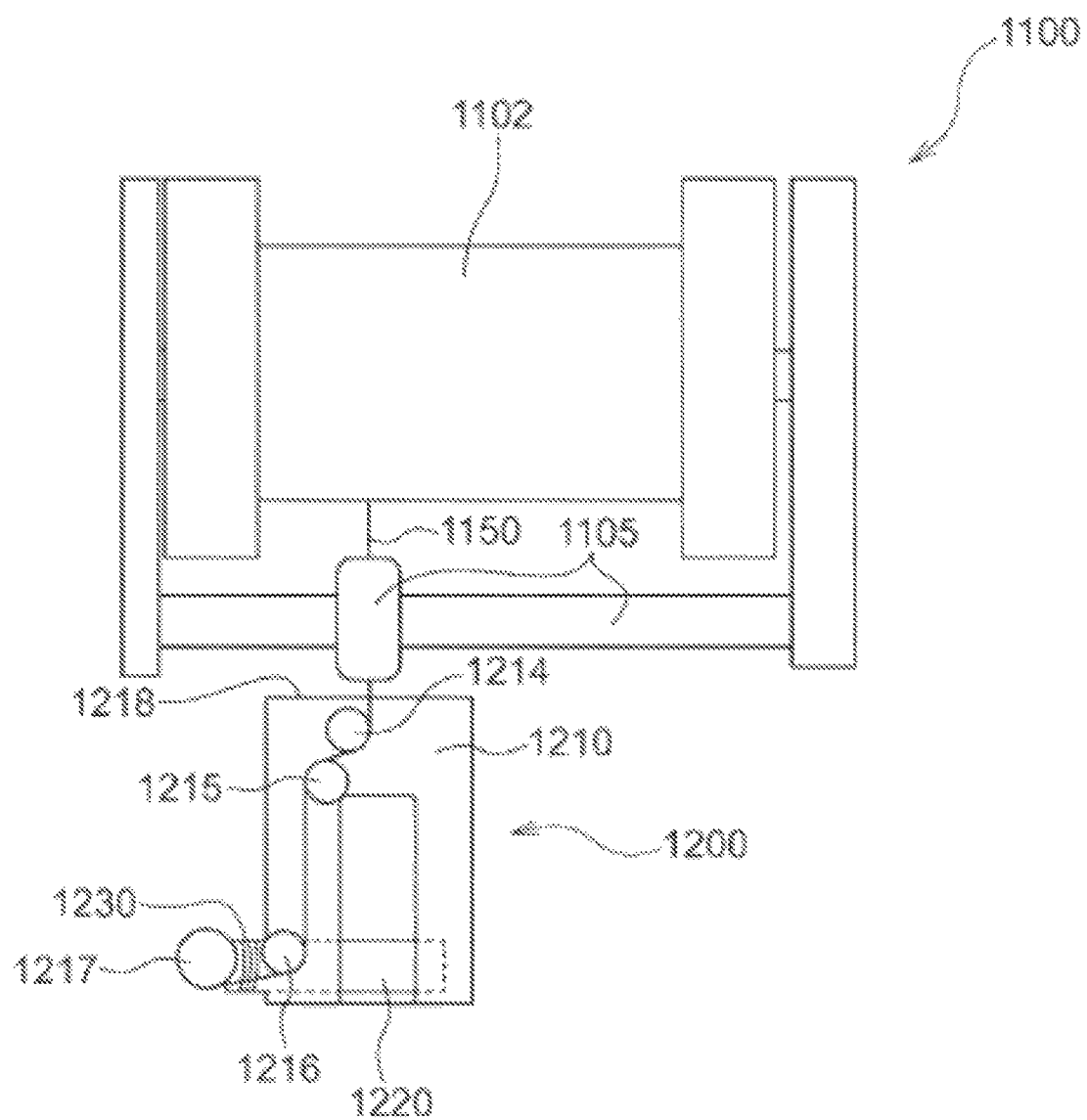
FIG. 39 shows a schematic view indicating an example of a condition in which the unloading hook shown in FIG. 38 is connected to a hoisting device.

FIG. 38 shows a diagram indicating a second example of the unloading hook, and FIG. 39 shows a schematic view indicating the unloading hook of the second example mounted on the hoisting device.

The base member 1210 of the unloading hook 1200 having this configuration includes a plate-shaped base 1211 and a pair of plate-shaped hanging parts 1212 and 1213 extending downward from the both ends of the base 1211. A cylindrical insertion part 1212a inserted so that a cylindrical movable member 1220 may be horizontally movable is formed at the lower end of the hanging part 1212, and a closed-end cylindrical recess 1213a for receiving the end part 1220a and specifying the closed position of the movable member 1220 when the movable member 1220 moves in the horizontal direction (direction of arrow D1) is formed at the lower end of the other hanging part 1213.

A load body can be hung on the movable member 1220, and a flange 1220b is formed at an end opposite to the end 1220a. A coil spring 1230, which is an energizing member, is disposed between the insertion part 1212a of the base member 1210 and the flange 1220b, and energizes the movable member 1220 in a direction (direction of arrow D2) in which the movable member 1220 is opened by a predetermined energizing force. The coil spring 1230 performs the same function as that of the spring 1045 in the above-described configuration, and the energizing force thereof is set in the same manner as the spring 1045.

The base 1211, the hanging part 1212 and the insertion part 1212a are provided with cylindrical guide parts (or rotatable rollers) 1214, 1215 and 1216 that guide the traction member 1150 and interlock with the movable member 1220, and the flange 1220b is provided with a fixed part 1217 that fastens and fixes the end of the traction member 1150. That is, when a tensile force acts on the traction member 1150, the tensile force moves the movable member 1220 in the closing direction (direction D1) against the energizing force of the coil spring 1230.

According to the unloading hook 1200 having such a configuration, as shown in FIG. 39, by bringing the upper end part 1218 of the base member 1210 into contact with the hoisting device 1100 by winding by the hoisting device 1100, a configuration is obtained in which the movable member 1220 is not opened unless the traction member 1150 is pulled out from the hoisting device 1100, and a load is not dropped as with the case with (3) above. In addition, since the deceleration mechanism as described above is not disposed on the base member, a simple structure is obtained, which reduces the cost.

In such a structure, a lid member having a similar shape may be attached to the base member 1210, and the traction member 1150 may not be exposed to the outside as is the case in the first example described above.

Figure 33:
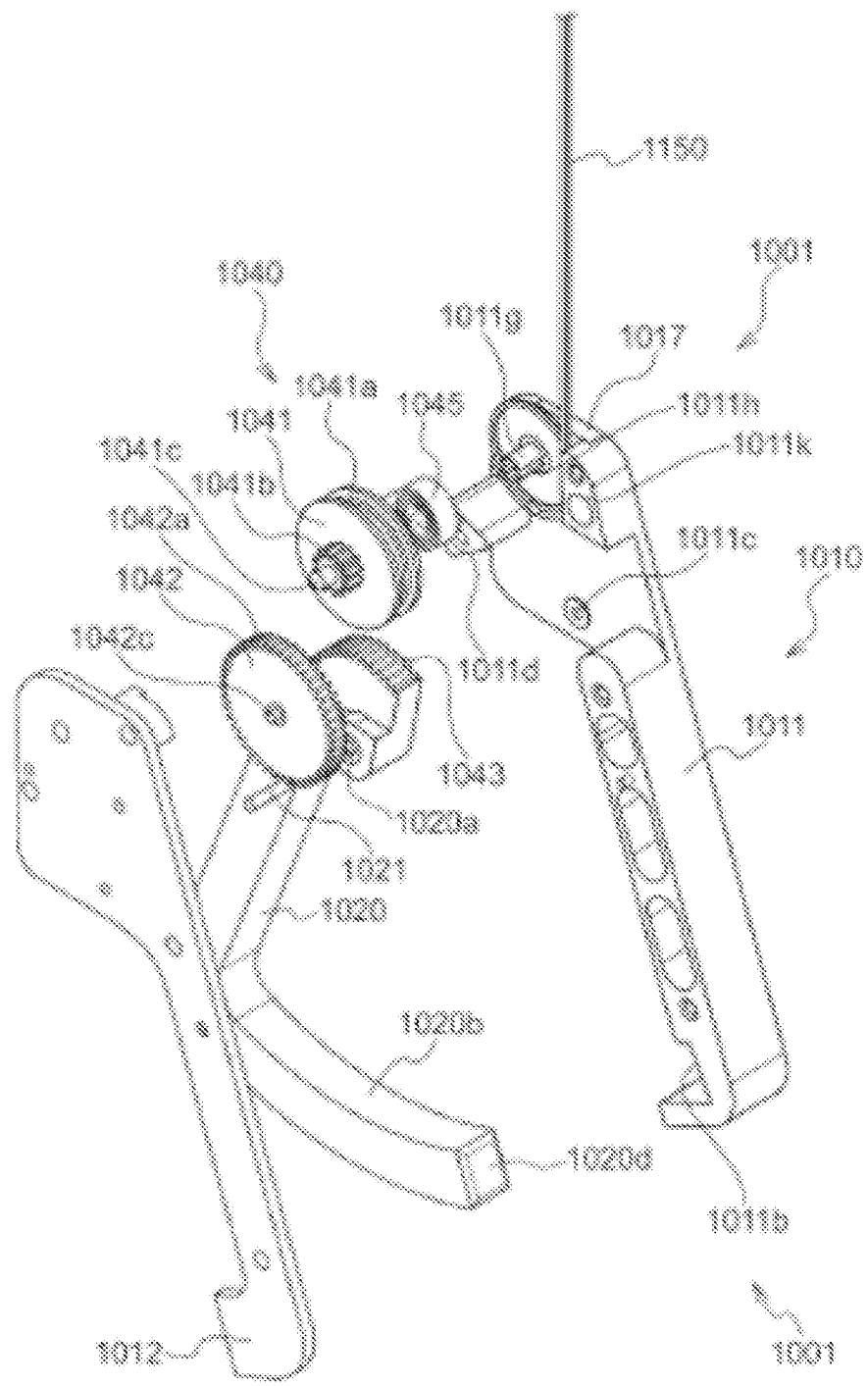
FIG. 33 shows an exploded perspective view of the unloading hook shown in FIG. 32 as seen from one side.
Figure 34:
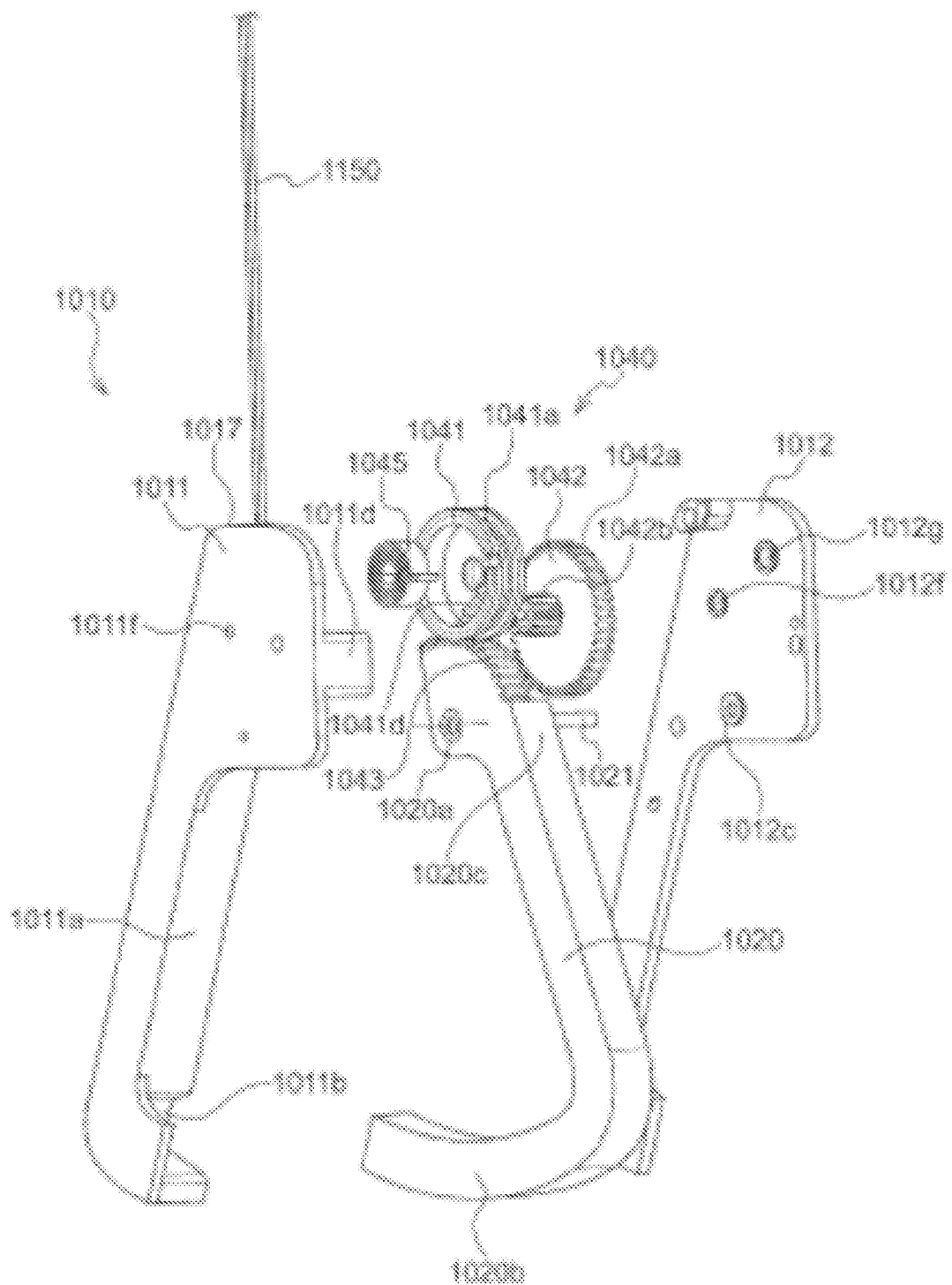
FIG. 34 shows an exploded perspective view of the unloading hook shown in FIG. 32 as seen from the other side.
Figure 40:
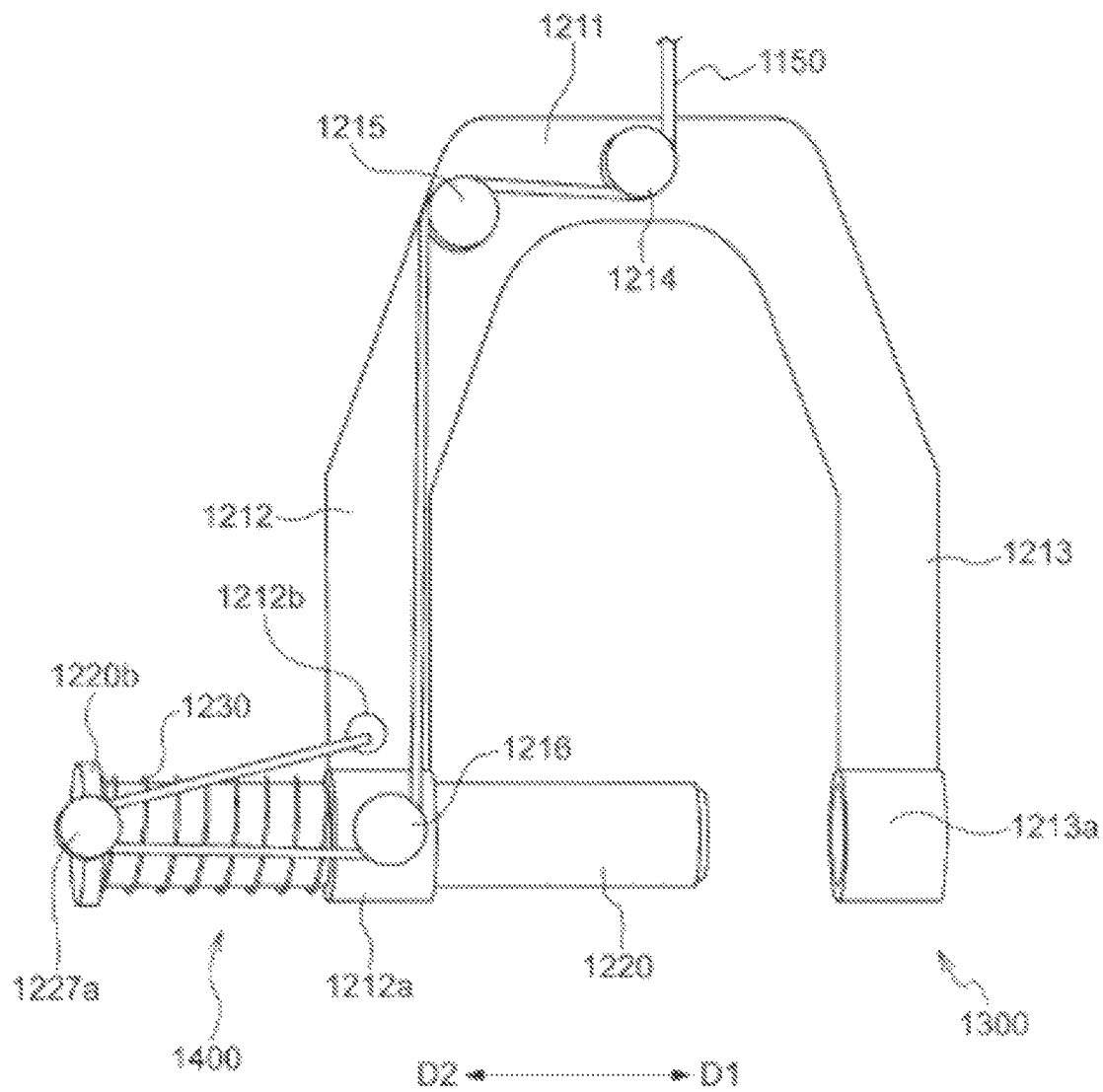
FIG. 40 shows a diagram indicating a third example of an unloading hook.

FIG. 40 is a view indicating a third example of the unloading hook, and shows a configuration example in which the deceleration mechanism 1400 is disposed in the example structure illustrated in FIG. 33.

The plate-like hanging part 1212 of the base member 1210 of the unloading hook 1300 having this configuration is provided with a fixed part 1212b that winds the traction member 1150 so as to be folded back on a rotating member 1227a provided at the end of the movable body 1220, and fixes the end of the traction member 1150.

According to such a winding structure, since the deceleration mechanism functions as a moving pulley and is decelerated by the traction member 1150 itself, parts can be saved and the structure can be simplified as compared with the deceleration mechanism by the gear train of the first example described above. In this case, the reduction ratio can be appropriately adjusted by changing the winding amount or increasing the number of moving pulleys.

Though the movable member is configured to move while hooking a load body, a structure in which a hook part is opened and closed without hooking the load body may be used. As the energizing member for energizing the movable member in the opening direction, a spring having a structure other than that described above (leaf spring) may be used, or attraction of a magnet may be used as the energizing member.

In addition, the power transmission mechanism for interlocking a movable member with a traction member can be appropriately modified, for example, by using the gear train described above, or by disposing a guide member for guiding the traction member. Further, if a deceleration mechanism is disposed in such a power transmission mechanism, as in the first and second examples described above, in addition to the power transmission by the gear train and the pulley, for example, the deceleration effect may be exhibited by using power transmission by chains, friction wheels, magnetic gears (non-contact type power transmission mechanism for magnetic gears) a link mechanism such as a toggle mechanism and a leverage mechanism, a screw mechanism incorporating screw gears and the like, cams and the cam followers engaging therewith, a wedge mechanism and the like.

Incidentally, as described above, hoisting devices including electric hoisting machines hoist or lower objects such as beddings, packaging, temporary scaffolding, buildings, and fishing tools to predetermined positions, using the driving force of a motor or the manual force, but in the field of fishing, a fishing reel is often used as a hoisting device. These various types of hoisting devices incorporate various mechanisms that allow objects to be hoisted and lowered in an optimal state using an electric or manual driving force.

For example, the hoisting machine disclosed in Japanese Patent Application Publication No. 2016-5972, by interposing a power transmission gear formed by meshing a drive gear on the drive shaft side with a driven gear on the output shaft side between a drive shaft rotated by a motor and an output shaft for rotating a drum for winding a traction member, and by combination of a brake device for selectively generating a braking force by allowing the driven gear to rotate relatively with respect to the output shaft and move axially by a screw mechanism, and thus making the driven gear in contact with or away from a brake beam by the rotation of the drive shaft and/or the output shaft, and a ratchet mechanism for allowing only one-way rotation, holds the object at a predetermined position, so that the object does not fall due to excessive force when the motor is not energized (which can prevent the object from falling unintentionally.)

On the other hand, the electric reel disclosed in Japanese Patent Application Publication No. H7-213203 includes a clutch mechanism for manually or electrically switching both of a motor power transmission path for transmitting the winding power of the motor to the spool via a deceleration mechanism (planetary gear mechanism) and a motor power cutoff path for cutting off the transmission of the power from the motor to the spool and making the spool free to rotate, thereby enabling the fishing line to be unwound.

However, in the hoisting machine disclosed in Japanese Patent Application Publication No. 2016-5972, the power transmission mechanism such as the drive shaft, the output shaft, the power transmission gear and the braking device are juxtaposed to the drum side, though unintentional falling of the object can be prevented while the hoisting and lowering operations may be made by way of the forward and backward rotation of the motor and therefore, the axial dimension of the entire device is increased. For this reason, it is difficult to compactly incorporate the hoisting machine, for example, into various equipment, devices, and the like which require the hoisting machine.

On the other hand, the electric reel disclosed in the above-mentioned Japanese Patent Application Publication No. H7-213203 realizes a structure in which the power transmission mechanism is accommodated in a compact manner in the axial direction while utilizing the planetary gear mechanism, but in the electric reel in which the clutch mechanism may be switched between the power transmission state and the power cut-off state manually or electrically in order to wind up and down an object (weight, device, etc.) it is necessary to additionally provide a non-return mechanism or the like as well as the clutch mechanism in order to prevent the object from falling unintentionally (backward rotation of the spool) as disclosed in Patent Literature 1. This not only inevitably increases the size and weight of the entire electric hoisting device, but also complicates the structure, and degrades the incorporation performance and maintainability of the electric hoisting device because various mechanisms described above must be disposed in a housing having space constraints.

Further, in the electric reel disclosed in Japanese Patent Application Publication No. H7-213203, since the winding up and down operations of the object are performed through the transmission/separation operation of the power of the clutch mechanism, it is difficult to efficiently perform the winding up and down operations in a continuous, quick and timely manner under conditions suitable for the site situation.

Therefore, described below is a hoisting device which is simplified in its entire structure and small and lightweight, can prevent or minimize unintentional falling of an object and can efficiently perform winding up and down operations in a continuous, quick and timely manner.

Figure 41:
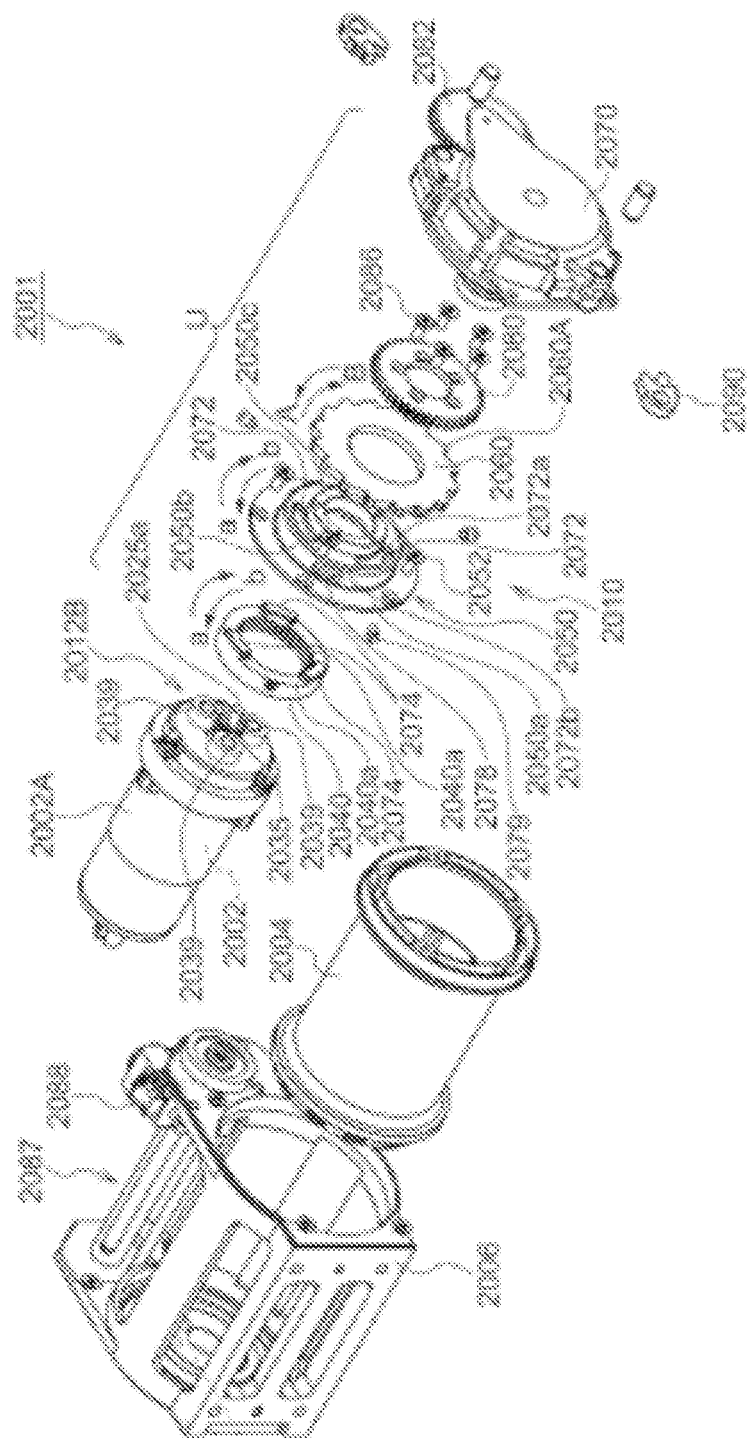
FIG. 41 shows an exploded perspective view of a hoisting device.
Figure 42:
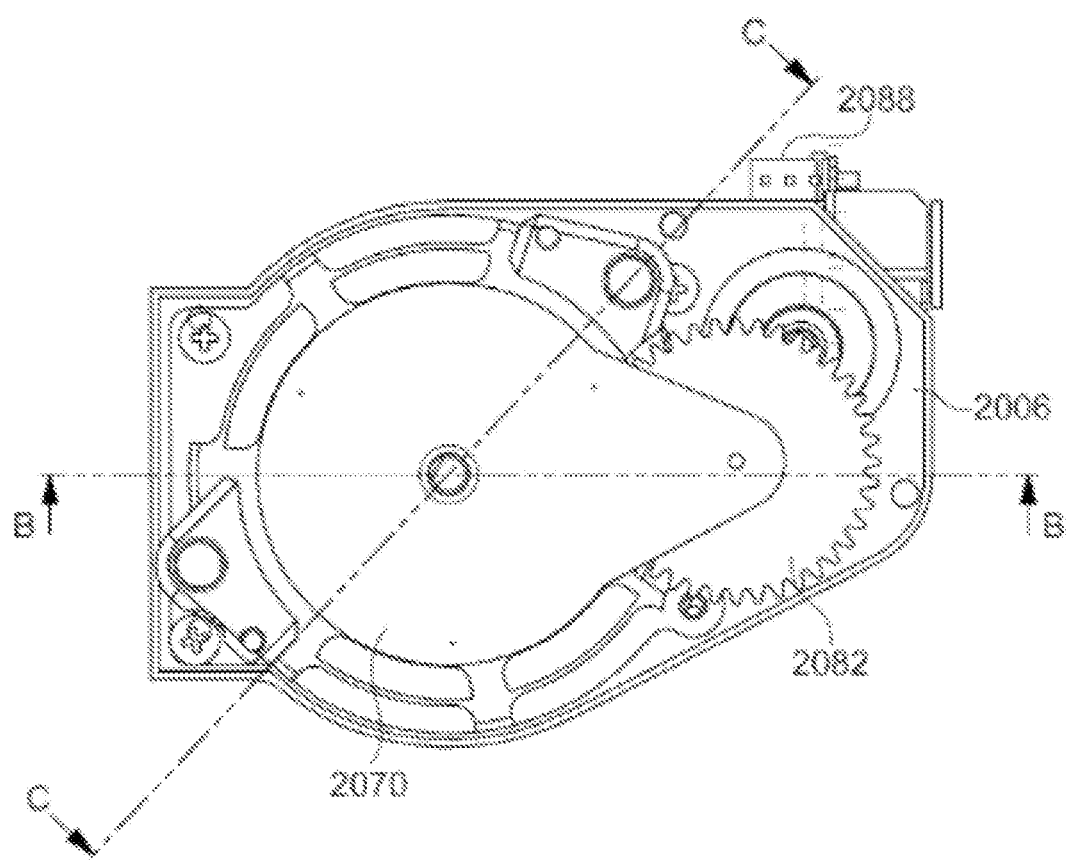
FIG. 42 shows a side view of the hoisting device shown in FIG. 41 as seen from the power transmission mechanism side.
Figure 43:
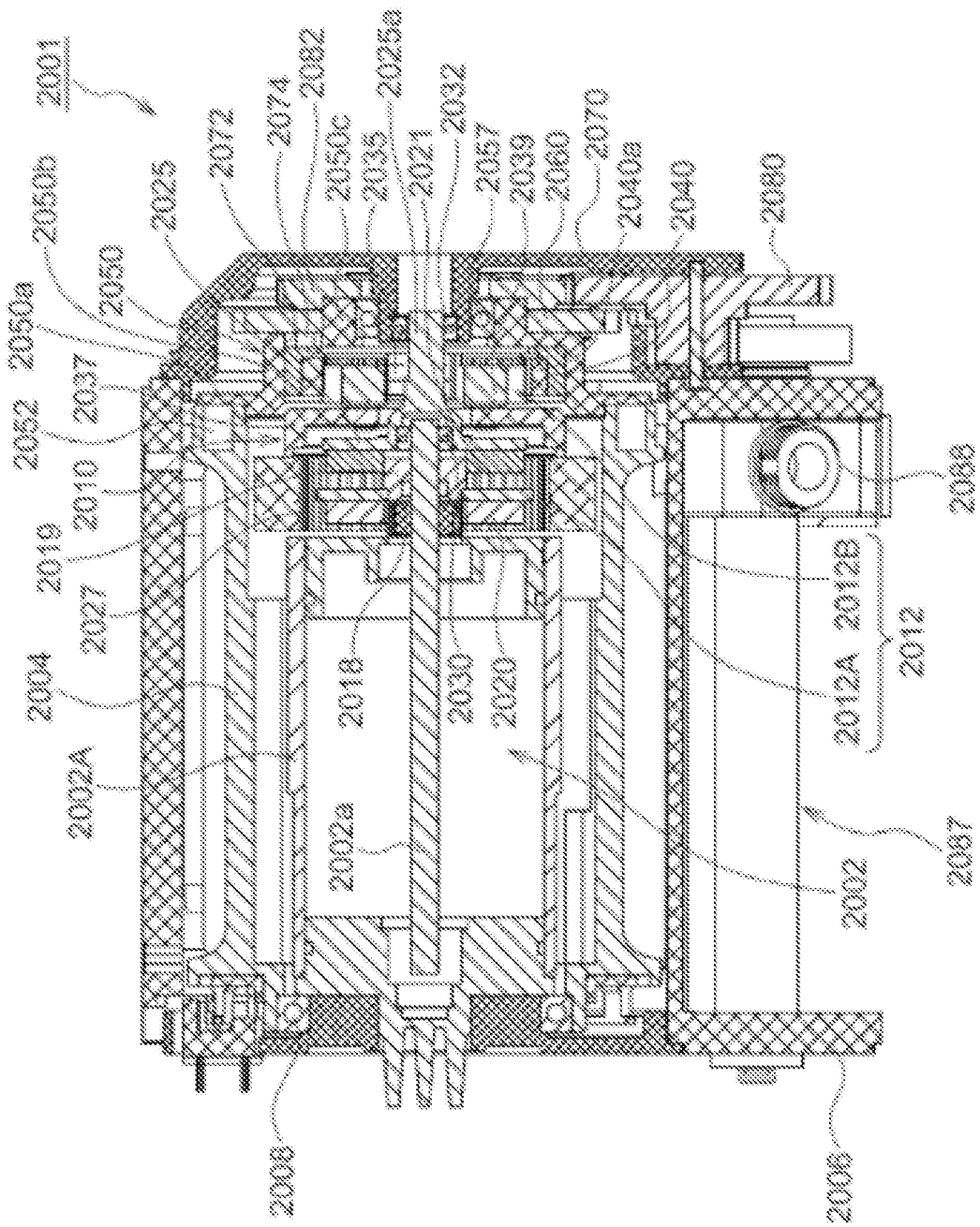
FIG. 43 shows a cross-sectional view along the line B-B in FIG. 42.
Figure 44:
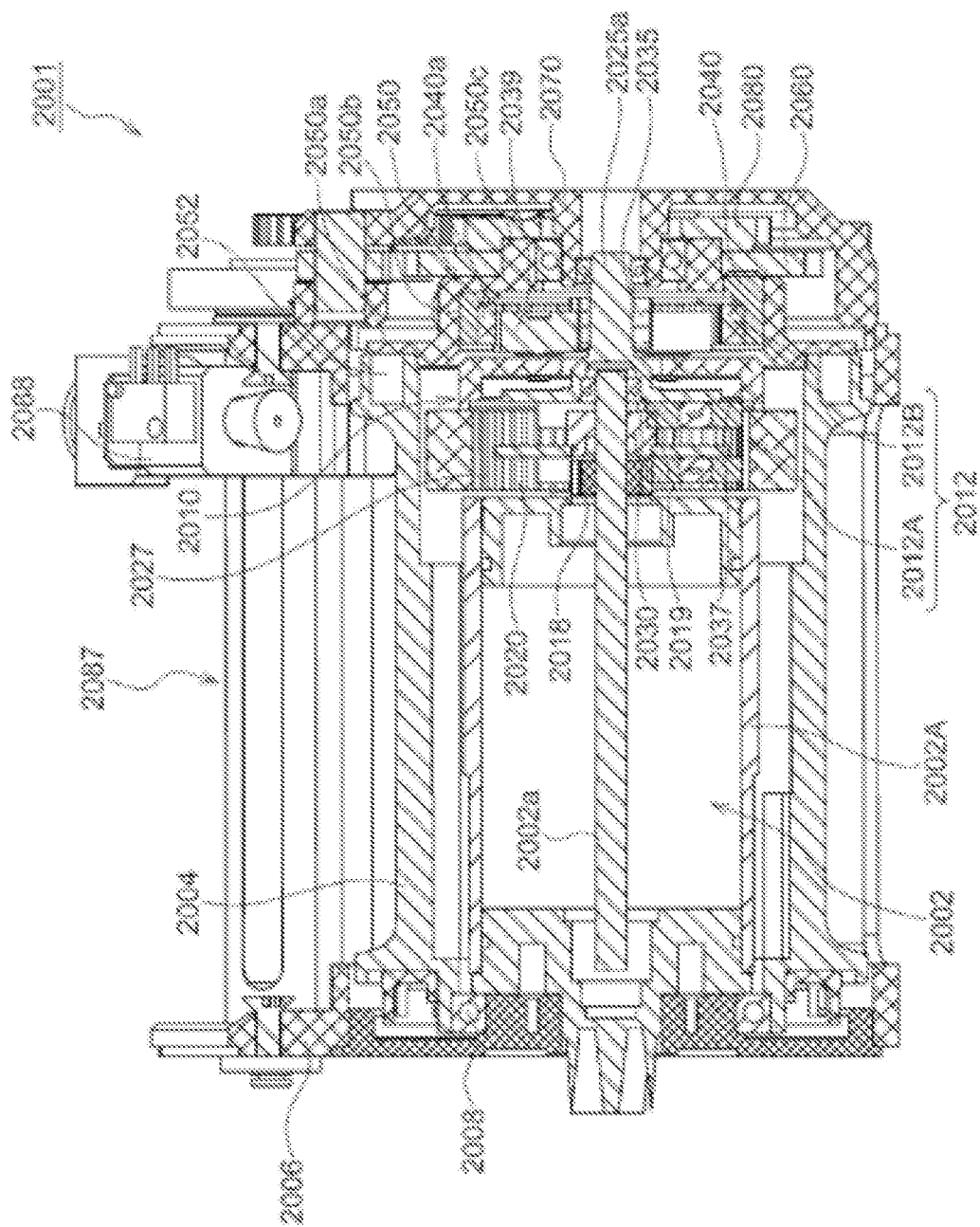
FIG. 44 shows a cross-sectional view along the line C-C in FIG. 42.

As shown in FIGS. 41 and 42, a hoisting device 2001 according to the present configuration includes an electric motor 2002 as a driving force source for generating a rotational driving force, and a housing 2006 as device main body for accommodating and holding a cylindrical rotating body 2004 around which a traction member (not illustrated) for pulling a hoisting object. In this case, the rotating body 2004 is rotatably supported by the housing 2006 via a bearing 2008, and the electric motor 2002 is non-rotatably supported and fixed to the inside of the cylindrical rotating body 2004 while being accommodated in a motor housing 2002A, and may be driven by, for example, a battery (not illustrated) detachably attached to the housing 2006.

The traction member may be a wire, a chain, a rope, a fishing line or the like, depending on the intended use of the hoisting device 2001. The rotating body 2004 corresponds to a spool on which a fishing line is wound, for example, when the hoisting device 2001 is used as an electric fishing reel.

The electric motor 2002 and the rotating body 2004 are connected to each other by a power transmission mechanism (power transmission path) 2010 so as to be able to transmit power. In this case, the power transmission mechanism 2010 is configured to transmit the rotation of the electric motor 2002 to the rotating body 2004 side but not to transmit the rotation of the rotating body 2004 to the electric motor 2002 side, and includes: an input member 2040 to which a rotational driving force is input from the electric motor 2002; an output member 2050 that receives the driving force from the input member 2040 and outputs the driving force to the rotating body 2004; a rotation restricting part 2060 ("ratchet member 2060") that is, for example, a ratchet member which is permitted to rotate only in one direction and is prevented from rotating in the other direction; a cam mechanism described later that connects the input member 2040 and the output member 2050 so as to be integrally rotatable while allowing a partial relative rotation; and a deceleration mechanism 2012 that reduces the driving force from the electric motor 2002 and transmits the reduced force to the input member 2040. In this configuration, the deceleration mechanism 2012 is configured as a planetary gear mechanism.

More specifically, an output shaft 2002*a* of the electric motor 2002 is connected to the input member 2040 side via a first two-stage planetary gear mechanism (first deceleration mechanism) 2012A, and in this case, a pair of sun gears 2018 and 2019 of the first planetary gear mechanism 2012A are fixed to the output shaft 2002*a* coaxially adjacent to each other so as to be rotatable integrally with the output shaft 2002*a*, and a plurality of corresponding planetary gears 2020 and 2021 mesh around the sun gears 2018 and 2019. These planetary gears 2020 and 2021 are rotatably and integrally supported by a planetary carrier 2025, and also mesh with an internal gear 2027 which is concentrically arranged with the output shaft 2002*a* and is non-rotatably fixed to the motor housing 2002A. That is, the planetary gears 2020 and 2021 are configured to revolve around the sun gears 2018 and 2019 along the inner periphery of the internal gear 2027 as the sun gears 2018 and 2019 rotate while meshing with both of these gears 2018 (2019) and 2027 between the concentrically disposed sun gears 2018 and 2019 and the internal gear 2027. The planetary carrier 2025 is rotatably supported by the output shaft 2002*a* via a bearing 2030, and a shaft part 2025*a* extends in the axial direction at the center of the planetary carrier 2025.

The shaft part 2025*a* of the planetary carrier 2025 is rotatably supported by a unit housing 2070 integrally attached to the housing 2006 via a bearing 2032, and a sun gear 2035 of a second planetary gear mechanism (second deceleration mechanism) 2012B is coaxially fixed to the shaft part 2025*a* so as to be rotatable integrally with the shaft part 2025*a*, and a plurality of planetary gears 2039 integrally and rotatably supported by a planetary carrier 2037 non-rotatably fixed to the motor housing 2002A mesh around the sun gear 2035.

A plurality of planetary gears 2039 of the second planetary gear mechanism 2012B are arranged concentrically with the shaft part 2025*a* of the planetary carrier 2025, and also mesh with an internal gear 2040*a* forming the inner peripheral surface of the annular input member 2040 to rotatably support the input member 2040. That is, the planetary gear 2039 mesh with both of these gears 2035 and 2040*a* between the concentrically disposed sun gear 2035 and the internal gear 2040*a*, and revolves around the sun gear 2035 along the inner circumference of the internal gear 2040*a* as the sun gear 2035 and/or the internal gear 2040*a* rotates.

The input member 2040 having the internal gear 2040*a* and meshing with the planetary gear 2039 is connected to the output member 2050 via a cam mechanism as described above. The output member 2050 is rotatably supported by the unit housing 2070 via a bearing 2057, and an outer peripheral flange part 2050*a* thereof is integrally and rotatably coupled and fixed to the rotating body 2004 via a fastening member 2052. The output member 2050 receives the input member 2040 in a fitted state in a cylindrical main body part 2050*b*, and rotatably supports the ratchet member 2060 by the outer peripheral surface of the axial projection part 2050*c* projecting in the axial direction on the other side of the electric motor 2002.

Figure 45:
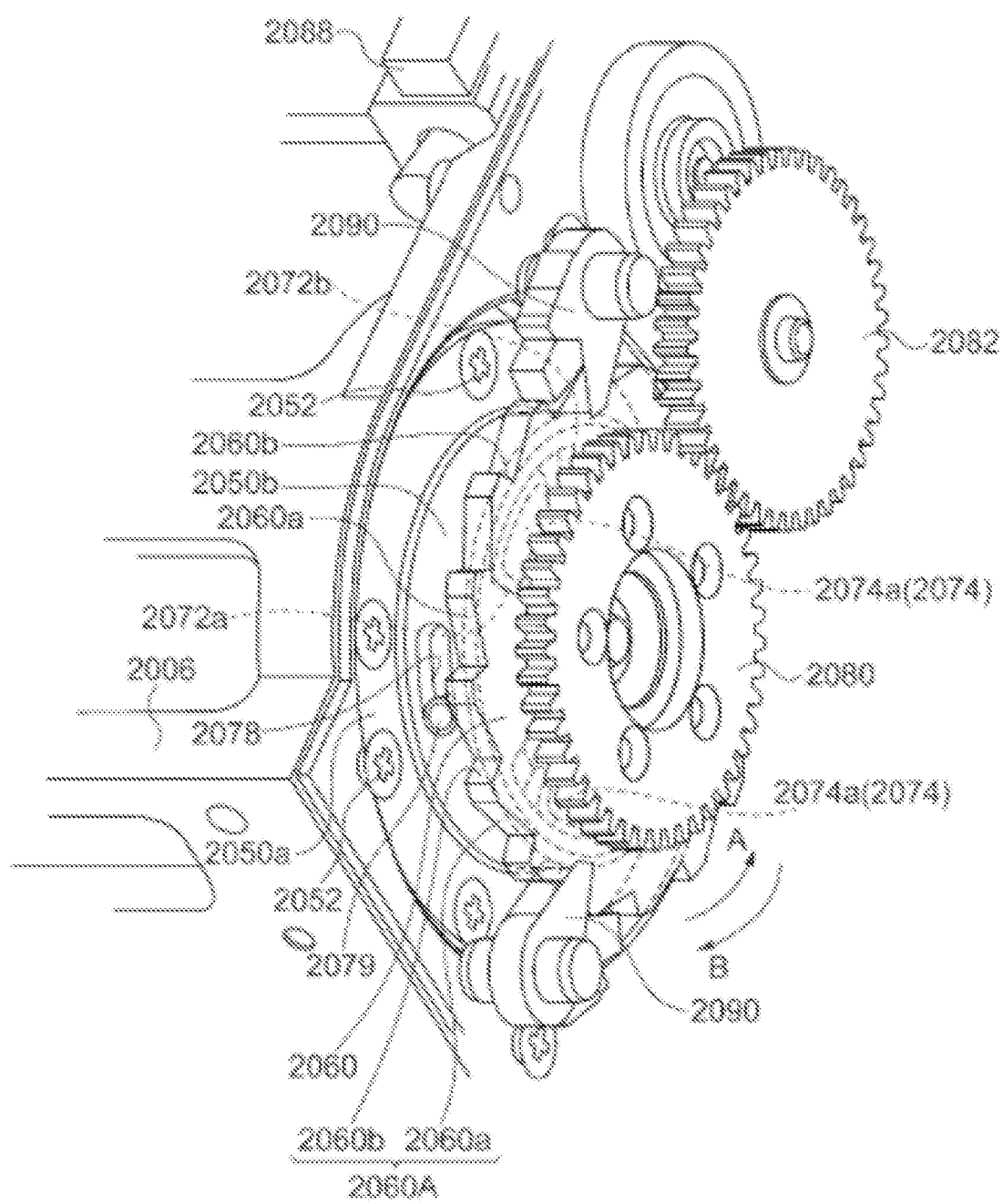
FIG. 45 shows an enlarged perspective view of a main part of a power transmission mechanism of the hoisting device in FIG. 41.
Figure 46:
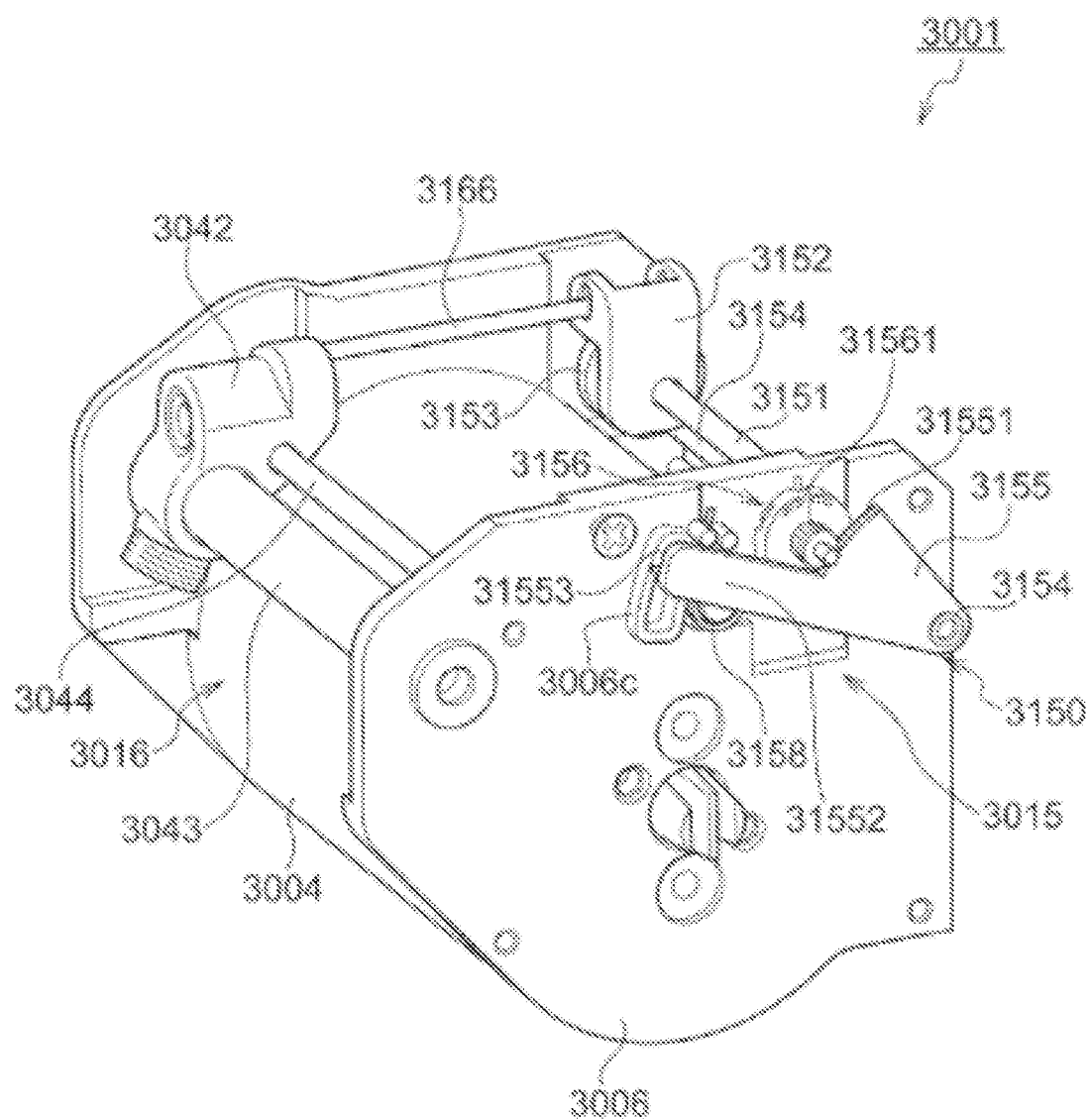
FIG. 46 shows a perspective view of a hoisting device as seen from one side.
Figure 47:
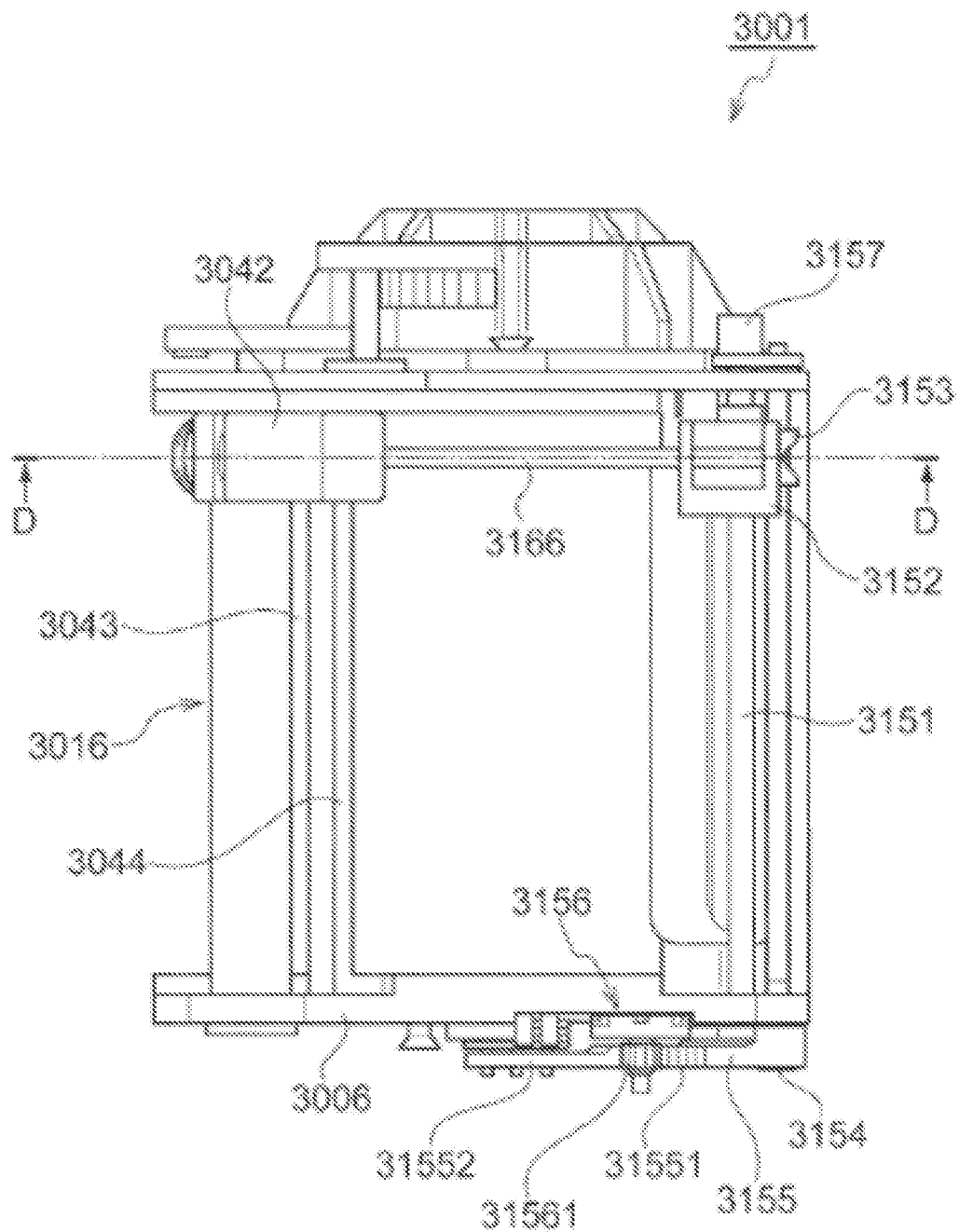
FIG. 47 shows a plan view of the hoisting device in FIG. 46.
Figure 48:
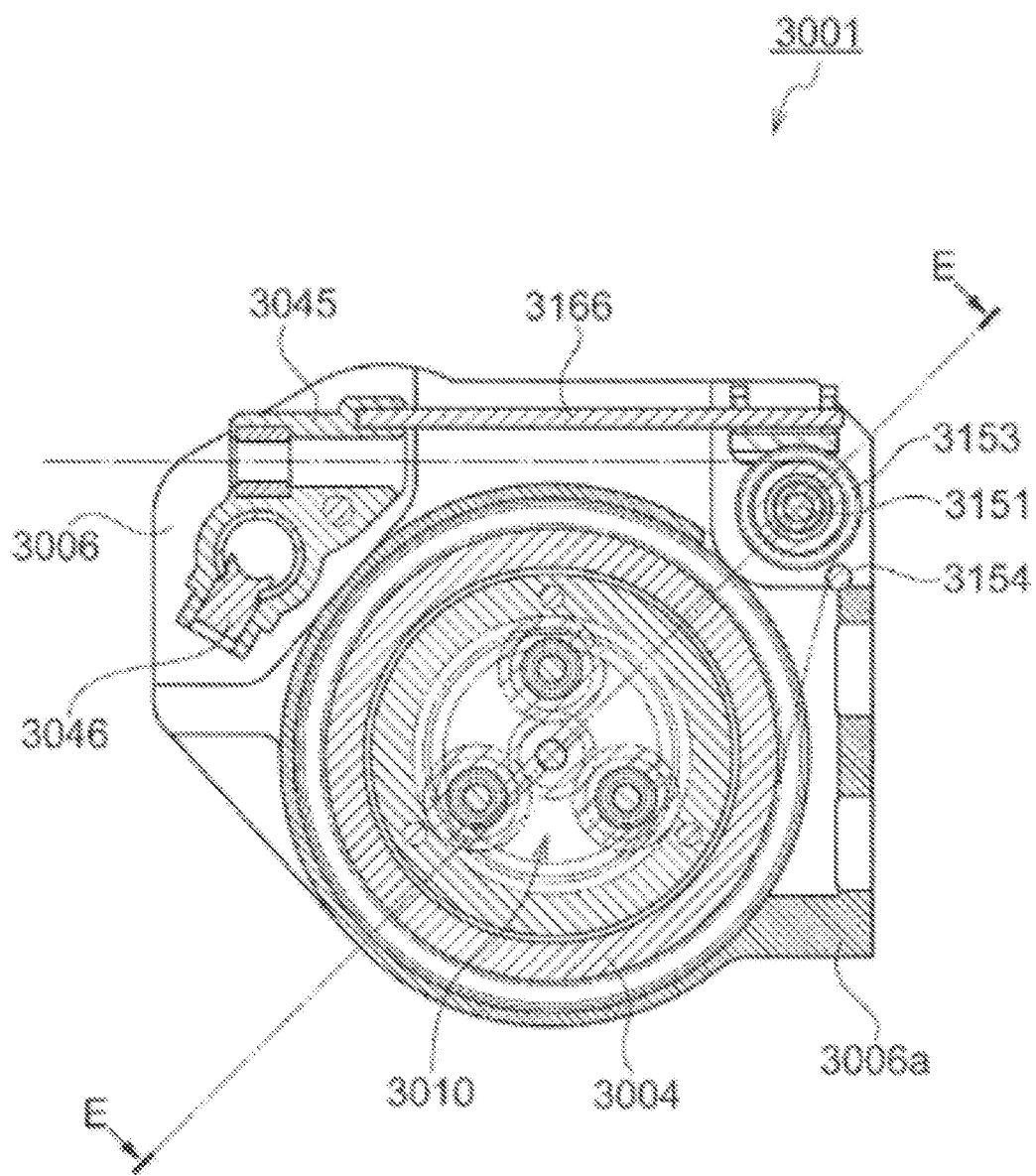
FIG. 48 shows a cross-sectional view along the line D-D in FIG. 47.
Figure 49:
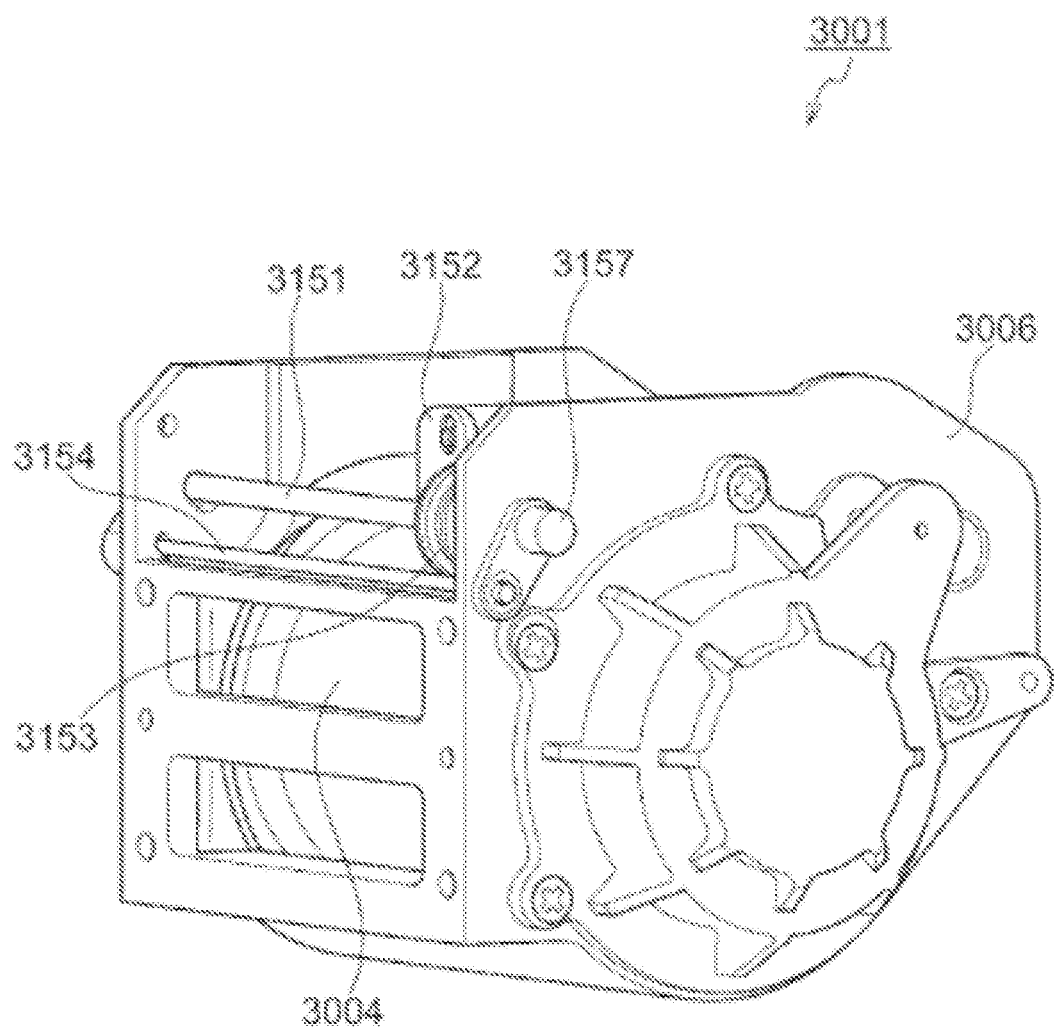
FIG. 49 shows a perspective view of the hoisting device in FIG. 46 as seen from the other side.
Figure 50:
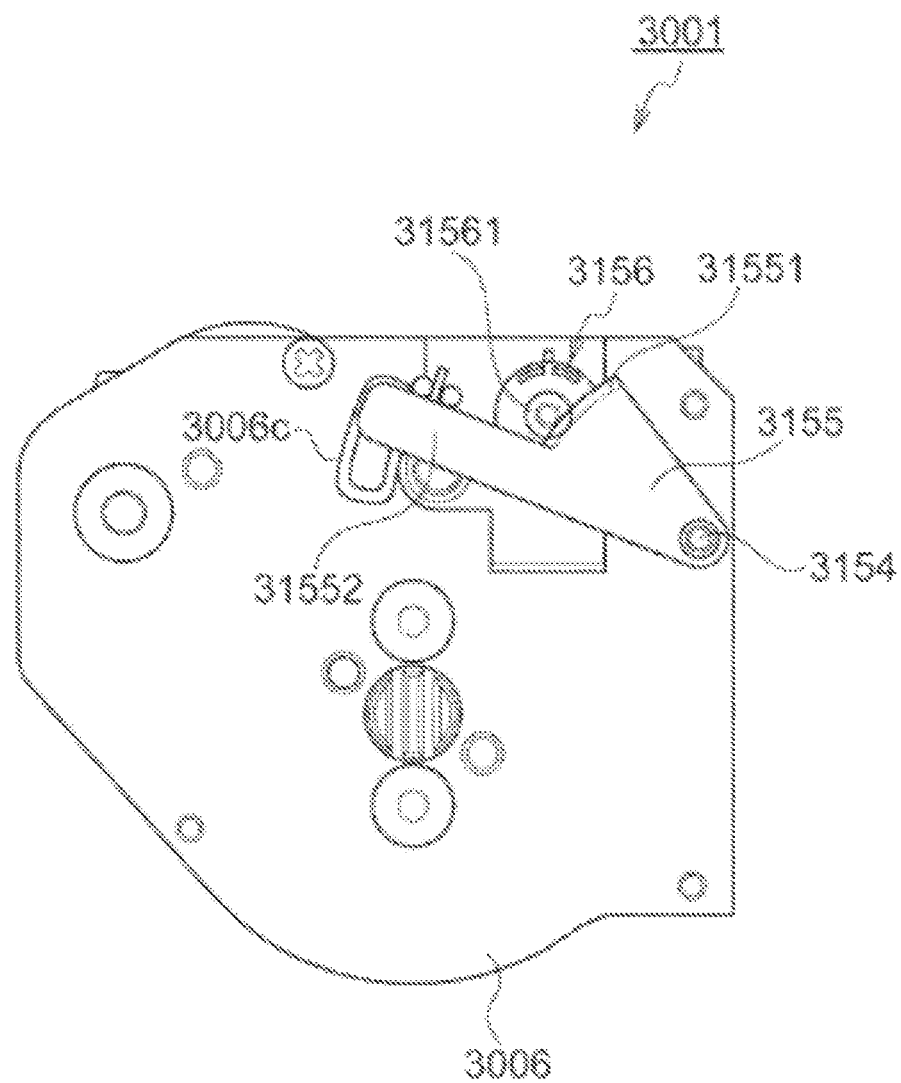
FIG. 50 shows a side view of the hoisting device in FIG. 46 as seen from one side.
Figure 51:
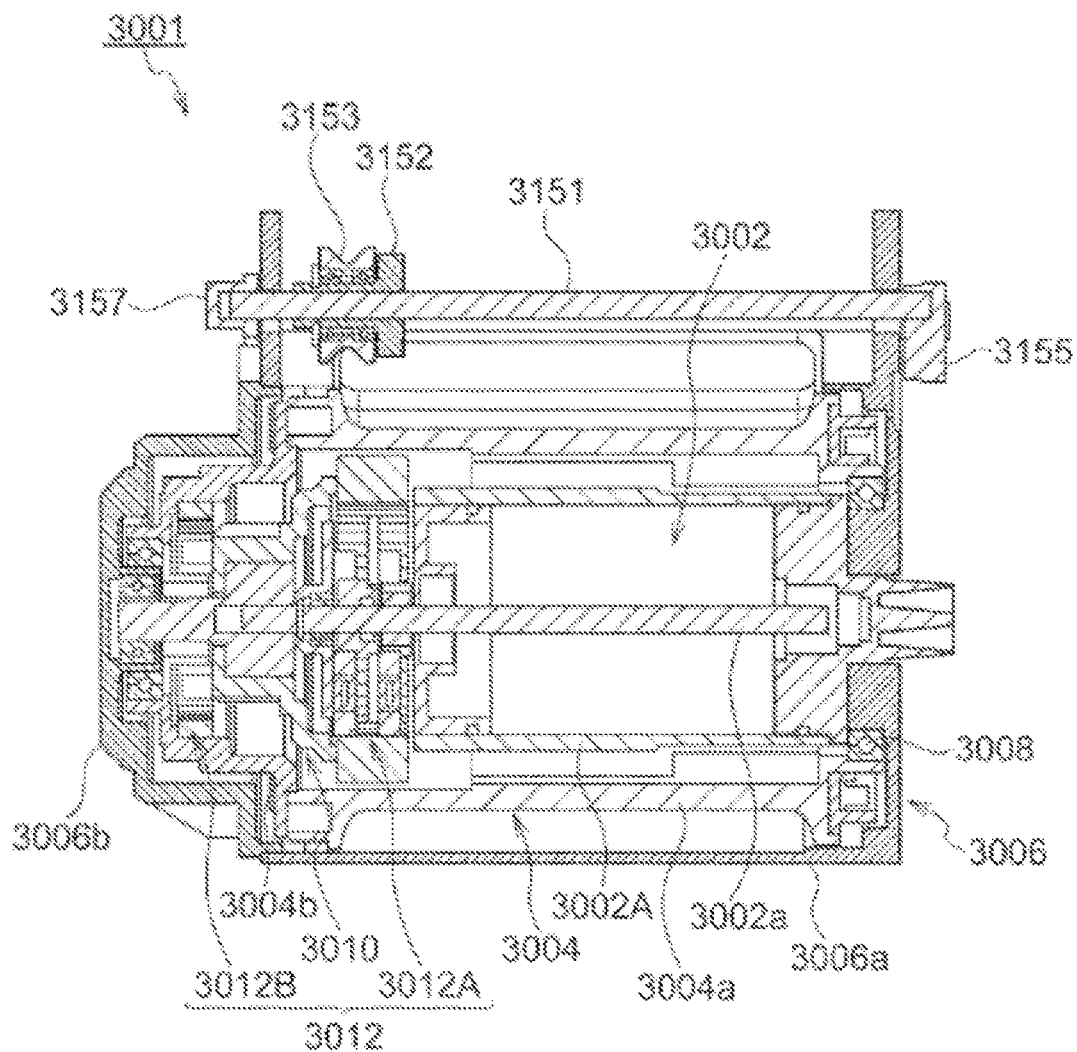
FIG. 51 shows a cross-sectional view along the line E-E in FIG. 48.

The ratchet tooth 2060A on the outer periphery of the ratchet member 2060 engages with the stopper 2090 rotatably attached to the unit housing 2070, so that only rotation in one direction (counterclockwise direction A in FIG. 41 in this configuration) is permitted, and rotation in the other direction (clockwise direction B in FIG. 41 in this configuration) is prevented. Therefore, as clearly shown in FIG. 45, the ratchet tooth 2060A on the outer periphery of the ratchet member 2060 of the present configuration continuously have, in a circumferential direction, a combination of a tapered surface 2060*a* that obliquely decreases in one direction A (counterclockwise) and a step 2060*b* that vertically rises in the radial direction at the lower end of the tapered surface 2060*a*.

The hoisting device 2001 according to the present configuration is provided with a level winding device 2087 for winding the traction member in parallel with the rotating body 2004. The level winding device 2087 is configured such that when the electric motor 2002 is rotationally driven, a guide body 2088 passing through the traction member unwound from the rotating body 2004 moves from side to side in conjunction with the rotation of the electric motor 2002, that is, via the first and second gears 2080 and 2082 and a worm gear (not illustrated), and has a function of evenly winding the traction member around the rotating body 2004 in accordance with the winding operation of the traction member. Here, the first gear 2080 constituting the interlocking mechanism is integrally and rotatably fixed to the output member 2050 via a fastening member 2086 (see FIG. 41), and the second gear 2082 meshing with the first gear 2080 is rotatably supported by the unit housing 2070.

Further, in the hoisting device 2001 according to the present configuration, as shown in FIG. 41, the input member 2040 and the output member 2050 including the cam mechanism, the ratchet member 2060 as well as the gears 2080 and 2082 connected to the level winding device 2087 are accommodated in the above-described unit housing 2070 and configured as an integral unit U. By unitizing these components in this manner, the assemblability of the hoisting device 1 is improved.

In the present configuration, these components of the power transmission mechanism 2010 described above are compactly accommodated in the housing 2006 coaxially and axially and adjacently to the inside and the lateral of the rotating body 2004 that accommodates the electric motor 2002 inside, and are accommodated within the range of the radial dimension of the rotating body 2004. Such a compact accommodation in the housing 2006 can be realized without a dead space by employing a planetary gear mechanism as the deceleration mechanisms 2012A and 2012B and disposing them coaxially with the input member 2040 and the output member 2050.

Further, in the present configuration, the above-described cam mechanism for integrally and rotatably connecting the input member 2040 and the output member 2050 while allowing partial relative rotation is configured such that relative rotation of the input member 2040 with respect to the output member 2050 in the first direction (counterclockwise direction a in FIG. 41 in the present configuration) causes the input member 2040 and the output member 2050 to project axially and frictionally engage with the surface of the ratchet member 2060 to integrally and rotatably couple the input member 2040 and the output member 2050 to the ratchet member 2050, and further causes relative rotation of the input member 2040 in the second direction opposite to the first direction (clockwise direction b in FIG. 41 in the present configuration) with respect to the output member 2050 to axially separate the input member 2040 and the output member 2050 from the ratchet member 2060.

More specifically, as shown in FIG. 41, the cam mechanism of the present configuration has a plurality of cam grooves 2078 provided on the main body part 2050b side of the output member 2050, and a cylindrical follower 2079 engaged with these cam grooves 2078. A plurality of (three in this configuration) cam grooves 2078 are provided at predetermined angular intervals (angular intervals of 120° in this configuration), and extend in a spiral shape obliquely from the ratchet member 2060 side toward the motor 2002 side along the main body part 2050b side of the output member 2050 (see FIG. 45.) The followers 2079 are provided in the same number (three in this configuration) at positions corresponding to the cam grooves 2078, project radially outward through the cam grooves 2078, and are detachably fixed, for example, to follower mounting holes (not illustrated) provided on the outer surface of the input member 2040 facing the inner surface of the main body part 2050b of the output member 2050. Therefore, according to the cam mechanism having such a configuration, the input member 2040 and the output member 2050 are partially rotatable, and the relative rotation of the input member 2040 and the output member 2050 is converted into the relative axial movement. In this configuration, in the assembling stage, the follower 2079 is attached to the input member 2040 from the outside in the radial direction (outside of the output member 2050) through the cam groove 2078. Such a follower 2079 can constrain a rotation angle, and can dispense with a separate rotation constraint member as required in the screw mechanism disclosed in the above-mentioned Japanese Patent Application Publication No. 2016-5972. Further, such a follower 2079 increases the freedom in assembly order and design, and the screwing operation is also not required, so that not only are fewer parts required, but also the assemblability can be improved.

In this configuration, the input member 2040 has a plurality of (three in this configuration) arc-shaped projections 2074 provided at predetermined angular intervals (angular intervals of 120° in this configuration) in a circumferential direction on the counter surface 2040a facing the output member 2050. On the main surface of the main body part 2050b of the output member 2050 facing in the axial direction, a through hole (arc-shaped elongate hole) 2072 with which the projection 2074 engages is provided at a position corresponding to the projection 2074. In this case, the projection 2074 projects toward the ratchet member 2060 side through the through hole 2072 in accordance with the relative rotation of the input member 2040 in the first direction a with respect to the output member 2050 by the action of the cam mechanisms 2078 and 2079 described above, and is recessed inside the through hole 2072 in accordance with the relative rotation of the input member 2040 in the opposite second direction b (in this sense, the projection 2074 and the through hole 2072 constitute part of the cam mechanism that operates along with the cam mechanism.) The projection 2074 has an engagement surface 2074a that can be engaged with the counter surface of the ratchet member 2060 in a frictional contact state by projecting toward the ratchet member 2060 side. The engagement surface 2074a may be formed as a flat surface substantially parallel to the counter surface of the ratchet member 2060, but may be configured to increase in height (increase in the amount of axial projection) in the first direction a (counterclockwise direction), for example.

In this configuration, the length dimension in the circumferential direction of the through hole 2072 is set larger than the length dimension in the circumferential direction of the projection 2074 so as not to hinder the partial rotation of the input member 2040 and the output member 2050 by the cam mechanism described above (the difference in the dimension in a circumferential direction (i.e., the movable amount of the follower 2079 along the cam groove 2078) is the rotation allowable range (relative allowable rotation amount.) The frictional contact force between the engagement surface of the projection 2074 and the counter surface of the ratchet member 2060 determines the rotational coupling force between the input member 2040, the output member 2050 and the ratchet member 2060, and the frictional contact force may depend on the inclination of the cam groove 2078. That is, as the inclination (angle with respect to the circumferential direction) of the cam groove 2078 increases, the force in the rotational direction can be efficiently converted into the force in the axial direction, and a large frictional force can be exerted on the ratchet member 2060 by the projection 2074. On the other hand, when the inclination of the cam groove 2078 approaches the circumferential direction, the rotation angle necessary for moving the projection 2074 in the axial direction increases, which increases the length of the necessary cam groove 2078 and decreases the length of the projection 2074 in a circumferential direction. Therefore, in this configuration, design parameters such as the degree of inclination and the length of the cam groove 2078 and the projection amount of the projection 2074 are set so as to realize a desired cam action.

In the hoisting device 2001 configured as described above, when electric power is applied from a battery or the like (not illustrated) to the electric motor 2002 to rotate the output shaft 2002a of the electric motor 2002 forward, that is, if rotated in the first direction a, the rotation is decelerated by the first and the second planetary gear mechanisms (deceleration mechanisms) 2012A and 2012B and transmitted to the input member 2040. When the rotational driving force is input to the input member 2040 in this manner, the input member 2040 is rotated relative to the output member 2050 in the first direction a, and the projection 2074 of the input member 2040 projects axially toward the ratchet member 2060 through the through hole 2072 of the output member 2050 by the action of the cam mechanisms 2078 and 2079. Then, when the projection 2074 engaging in the through hole 2072 abuts against the end part 2072a in the first direction a of the through hole 2072, the input member 2040 and the output member 2050 are integrally rotated in the first direction a, and the projection 2074 projecting in the axial direction engages with the ratchet member 2060 in a frictional contact state, and the input member 2040 and the output member 2050 are integrally and rotatably coupled to the ratchet member 2060. Therefore, the input member 2040, the output member 2050 and the ratchet member 2060 rotate integrally in the first direction a (one direction A), and the rotation of the output member 2050 is transmitted to the rotating body 2004, so that the rotating body 2004 can be rotated in the first direction a. As a result, a traction member (not illustrated) may be wound around, for example, the rotating body 2004 at an appropriate speed (an object coupled to the traction member can be wound up (lifted.))

On the other hand, when the output shaft 2002a of the electric motor 2002 is rotated backward, that is, rotated in the second direction b, this rotation is also decelerated and transmitted to the input member 2040 by the first and the second planetary gear mechanisms 2012A and 2012B. When the rotational driving force is input to the input member 2040 in this manner, the input member 2040 is rotated relative to the output member 2050 in the second direction b, the projection 2074 is recessed inside the through hole 2072 by the action of the cam mechanisms 2078 and 2079 described above so as to be axially separated from the ratchet member 2060, and the input member 2040 and the output member 2050 are integrally rotated in the second direction b when the projection 2074 comes into contact with the end part 2072b of the through hole 2072 in the second direction b. In the second direction b, since the projection 2074 separates from the ratchet member 2060 in the axial direction as described above, so that the input member 2040 and the output member 2050 are separated from the ratchet member 2060 and rotated, the input member 2040 and the output member 2050 can freely and integrally rotate regardless of the ratchet member 2060 and transmit the rotation to the rotating body 2004 to rotate the rotating body 2004 in the second direction b, even though the rotation direction b is a direction in which the ratchet member 2060 is to be rotated in the other direction B in which it is not rotatable. As a result, for example, a traction member (not illustrated) can be unwound from the rotating body 2004 or the like at an appropriate speed (an object coupled to the traction member can be lowered.)

On the other hand, when an excessive force acts on a traction member when the electric motor 2002 is stopped and is not energized, and the rotating body 2004 that winds the traction member attempts to rotate in the second direction b, that is, when the output member 2050 that rotates integrally with the rotating body 2004 is rotated relative to the input member 2040 in the second direction b, the input member 2040 is rotated relative to the output member 2050 in the first direction a, so that the projection 2074 projects in the axial direction and engages with the ratchet member 2060 by the action of the cam mechanisms 2078 and 2079, and the input member 2040 and the output member 2050 are integrally and rotatably coupled to the ratchet member 2060. At this time, though the ratchet member 2060 is about to be rotated in the second direction b, that is, in the other direction B, since the ratchet member 2060 is prevented from rotating in this direction by a stopper 2090, the output member 2050 and the rotating body 2004 do not rotate further (that is, do not rotate further than the above-described relative allowable rotation amount of the input member 2040 and the output member 2050.) As a result, it is possible to hold an object at a predetermined position so that the object does not fall due to an excessive force (which can prevent the object from falling unintentionally.)

As described above, in the hoisting device 2001 having the above-described configuration, the cam mechanism has both the functions: of connecting the input member 2040 and the output member 2050 (transmitting the rotational force between the input member 2040 and the output member 2050); and of disengageably engaging the input member 2040 and the output member 2050 with the projection 2074 (which prevents the object from falling unintentionally) so that fewer components can be used to easily downsize the hoisting device 2001 (which can simplify the overall structure, and reduce the size and weight, of the hoisting device 1.) Moreover, according to such a double-purpose structure of the cam mechanism, it is possible to form the internal gear 2040a on the input member 2040 and incorporate the planetary gear 2039 therein without affecting the downsizing as in the above-described structure and therefore, the axial dimension of the hoisting device 2001 may be reduced so that such a device can be compactly incorporated into various equipment and devices requiring the hoisting device 2001.

In addition, according to the above configuration, as described above, the rotating body 2004 can be rotated in the winding and unwinding directions of the traction member in accordance with the forward and backward rotation from the electric motor 2002 side, and a clutch mechanism for switching a power transmission state is not required as the rotation of the rotating body 2004 is blocked when the input of the driving force from the electric motor 2002 side is stopped to prevent the traction member from being unwound, but it is possible to prevent an object from falling unintentionally by realizing the effective control of the winding and unwinding power transmission using the driving force in both rotation directions. Further, since the switching operation of the power transmission state by the clutch mechanism is no longer necessary, the winding up and down operations can be efficiently performed continuously and quickly in a timely manner.

As described above, according to the above configuration, when a rotational driving force in the first direction (rotational direction) is input from the driving force source to the input member and the input member is rotated relative to the output member in the first direction, the cam mechanism, projecting in the axial direction, engages with the rotation constraint part, and the input member and the output member are coupled to be rotatable integrally with the rotation constraint part. Therefore, by setting such that the rotation of the rotation constraint part is allowed in this rotation direction (setting such rotation direction (first direction) to the one direction of the rotation constraint part), the input member and the output member rotate integrally with the rotation constraint part, and the rotation of the output member is transmitted to the rotating body, which makes it possible to rotate the rotating body in the first direction.

On the other hand, when a rotational driving force in a second direction (rotational direction) opposite to the first direction is input from the driving force source to the input member, and the input member is rotated relative to the output member in the second direction, since the cam mechanism being separated from the rotation constraint part in the axial direction so that since the input member and the output member are rotated separately from the rotation constraint part, the input member and the output member can freely and integrally rotate regardless of the rotation constraint part and transmit the rotation to the rotating body to rotate the rotating body in the second direction, even though this is a rotation direction in which the rotation constraint part is to be rotated in the other direction in which the rotation constraint part is not rotatable.

On the other hand, in a state where the input of the rotational driving force from the driving force source to the input member is stopped, when the rotating body rotates in the second direction and the output member rotates relative to the input member in the second direction, the input member is rotated relative to the output member in the first direction, so that the cam mechanism, projecting in the axial direction, engages with the rotation constraint part, and the input member and the output member are integrally and rotatably coupled to the rotation constraint part. At this time, according to the previous rotation setting of the rotation constraint part, the rotation constraint part is to be rotated in the second direction, that is, in the other direction, but since the rotation constraint part is prevented from rotating in this direction, the output member and the rotating body do not further rotate (that is, do not rotate further than the relative allowable rotation amount of the input member and the output member) (the relative allowable rotation amount of the input member and the output member is preferably set as small as possible.)

Therefore, in such a rotation operation mode, if the first direction is set to the winding direction of the rotating body (the direction in which the traction member is wound up with respect to the rotating body) and the second direction is set to the unwinding direction of the rotating body (the direction in which the traction member is unwound from the rotating body) the rotating body can be rotated in the winding and unwinding directions of the traction member in accordance with the forward and backward rotation from the driving force source side, and the rotation of the rotating body in the unwinding direction is blocked when the input of the driving force from the driving force source side is stopped to prevent or minimize unintentional falling of the object.

Therefore, in the above configuration, it is preferable that when the cam mechanism engages with the rotation constraint part in a state in which a force is transmitted from the input member to the output member, the rotational force is transmitted to the rotation constraint part in the one direction, and when the cam mechanism engages with the rotation constraint part in a state in which the force is transmitted from the output member to the input member, the rotational force is transmitted to the rotation constraint part in the other direction.

The hoisting device 2001 having the above-described configuration can be used for winding up and down objects such as beddings, packaging, temporary scaffolding, buildings, and fishing tools to predetermined positions, can also be used as a fishing reel and further, such a machine mounted on a drone can be used to unload loads from, or wind up loads onto, the drone in the air, the fields in which such a machine is used are not limited to those mentioned above.

In the above configuration, the driving force source for generating the rotational driving force is an electric motor, but the rotational driving force may be generated manually. In the above configuration, there are three cam grooves and followers (associated projections and through holes) of the cam mechanism, but the number, form and the like of these cam grooves and followers (projections and through holes) are arbitrarily set. Further, in the above configuration, the output member is provided with a cam groove and the input member is provided with a follower, but the opposite arrangement is also possible, that is, the output member may be provided with a follower and the input member may be provided with a cam groove to project the follower radially inward. In addition, the arrangement of the cam groove and the follower (projection and through hole) is not limited to the above-described configuration, and the cam mechanism does not necessarily need to be composed of the cam groove and the follower. In short, the cam mechanism may have any structure as long as the act of the cam mechanism can be realized.

In the above configuration, the first direction (one direction) is set in the counterclockwise direction and the second direction (the other direction) is set in the clockwise direction, but vice versa is also available. In the above configuration, the driving of the electric motor may be remotely controlled using a mobile phone, a WiFi communication terminal or the like. Further, in the above configuration, the rotation constraint part is configured by a ratchet member, but the rotation constraint part may also be configured by another backward rotation preventing structure such as a one-way clutch. In the above configuration, though a planetary gear mechanism is employed as a deceleration mechanism, a wave gear device such as the Harmonic Drive (registered trademark) and a spur gear may be employed as a deceleration mechanism. In the above configuration, the electric motor is accommodated in the rotating body, but the electric motor may be provided outside the rotating body.

Incidentally, various types of hoisting devices, including the electric hoisting machine described above, also incorporate various mechanisms that enable objects to be wound up and down in an optimal state without trouble using an electric or manual driving force. For example, in an electric fishing reel that winds up a fishing line using an electric motor, and a portable winch that winds a wire, there is a need to detect a tension acting on the fishing line or the wire, and utilize the detected value for winding control of the electric motor for the purpose of preventing breakage of the fishing line or the wire, increasing the winding/unwinding speed, preventing tangling and the like, and in order to realize this, various tension detection mechanisms have been conventionally proposed. For example, Japanese Utility Model Bulletin No. S59-20059 and Japanese Patent Application Publication No. H6-276900 detect a tension based on a force acting on a rotation shaft of a spool in a fishing reel for winding a fishing line on a spool. In addition, in Japanese Patent Application Publication No. H11-46644, Japanese Patent Application Publication No. 2013-172704, Japanese Patent Application Publication No. 2001-95444, and Japanese Patent Application Publication No. 2000-83535, a detection part dedicated to sliding a line and a detection part is provided.

However, in Japanese Utility Model Bulletin No. S59-20059 and Japanese Patent Application Publication No. H6-276900, which detect a tension based on a force acting on a rotation shaft of a spool, problems remain in terms of detection accuracy and downsizing of equipment. That is, when a large load is supposed, generally, the spool is of a double bearing type, but also in this case, a tension sensor is often arranged only at one end of the rotation shaft of the spool, and in such a one-side sensor arrangement, the detection value of the sensor changes even if the tension is the same depending on the position of the fishing line on the spool, and it becomes difficult to obtain satisfactory detection accuracy. Further, in this case, if measures such as disposing tension sensors on both sides of the rotation shaft of the spool or detecting the position of the fishing line on the spool are taken in order to improve the detection accuracy, it increases the size of the overall device and the number of necessary parts.

On the other hand, Japanese Patent Application Publication No. H11-46644, Japanese Patent Application Publication No. 2013-172704, Japanese Patent Application Publication No. 2001-95444, and Japanese Patent Application Publication No. 2000-83535, which are provided with a detection part dedicated to sliding the line and the detection part, have disadvantages that a line is damaged or excessive frictional resistance occurs, for example, when a large tension acts due to sliding of the line and the detection section. In this case, if a rotation guide or the like is provided at a position where the line comes in contact with the detection part in order to reduce the sliding resistance, it becomes difficult for an oscillator mechanism for winding the line evenly and the detection part to coexist with each other. In addition, since the angle of the line at the position where the line comes in contact with the detection part is small, it is also difficult to improve the accuracy of the tension detection.

Therefore, a hoisting device capable of realizing both downsizing and improvement in detection accuracy without causing sliding resistance will be described below. In the following, the "axial direction" is defined as the axial direction of the rotating shaft of the rotating body, which will be described later.

As shown in FIGS. 46 to 51, a hoisting device 3001 according to the present configuration includes an electric motor 3002 as a driving force source for generating a rotational driving force, and a housing 3006 as a device main body for accommodating and holding a cylindrical rotating body 3004 around which a traction member (not shown in FIGS. 46 to 51) for pulling a hoisting object. In this case, the rotating body 3004 is rotatably supported by the housing 3006 via a bearing 3008, and the electric motor 3002 is non-rotatably supported and fixed to the inside of the cylindrical rotating body 3004 while being accommodated in the motor housing 2002A, and may be driven by, for example, a battery (not illustrated) detachably attached to the housing 3006. The housing 3006 is a casing for holding each component, and may be composed of a frame 3006a and a set plate 3006b, and be fixed to a fishing rod, a drone or the like according to the purpose of the hoisting device 3001.

The traction member may be a wire, a chain, a rope, a fishing line or the like, depending on the intended use of the hoisting device 3001. The rotating body 3004 corresponds to a spool on which a fishing line is wound, for example, when the hoisting device 3001 is used as an electric fishing reel.

The electric motor 3002 and the rotating body 3004 are connected to each other by a power transmission mechanism (power transmission path) 3010 so as to be able to transmit power. In this case, for example, the power transmission mechanism 3010 may be configured to transmit the rotation of the electric motor 3002 to the rotating body 4 side, but not to transmit the rotation of the rotating body 3004 to the electric motor 3002 side, and includes a deceleration mechanism 3012 that reduces the rotational driving force from the electric motor 3002 to the rotating body 3004 side. In this configuration, the deceleration mechanism 3012 includes a first two-stage planetary gear mechanism 3012A connected to the output shaft 3002a of the electric motor 3002, and a second planetary gear mechanism 3012B connected to the first planetary gear mechanism 3012A.

The electric hoisting machine 3001 according to the present configuration is provided with an oscillator mechanism 3016 for evenly winding the traction member in parallel with the rotating body 3004. The oscillator mechanism 3016 is configured such that when the electric motor 3002 is rotationally driven (thus, the rotating body 3004 is rotated) a guide body 3042 that passes through the traction member unwound from the rotating body 3004 moves reciprocally from side to side (axial direction) in conjunction with the rotation of the electric motor 3002, and has a function of evenly winding the traction member with respect to the rotating body 3004 in accordance with the winding operation of the traction member. The oscillator mechanism 3016 has a known configuration, and includes a guide cylinder 3043 for guiding axial movement of the guide body 3042, a worm gear, an oscillator 3045, a follower 3046 and a guide shaft 3044 as a rotation stopper of the guide body 3042.

As described above, the rotating body 3004 is rotatably supported at both ends with respect to the housing 3006, and is configured by a bobbin part 3004a and the cap part 3004b. The bobbin part 3004a is capable of winding a traction member, and the cap part 3004b has an external gear on its outer periphery for transmitting rotation to the oscillator mechanism 3016 via an oscillating gear. In addition, an inner gear to which rotation is transmitted from the power transmission mechanism 3010 is provided on the inner periphery of the cap part 3004b.

Though the electric motor 3002 is fixed to a housing 3011 as described above, by disposing the electric motor 3002 coaxially on the inner side of the rotating body 3004 as in the present configuration, a dead space can be eliminated to downsize the entire device. The electric motor 3002 rotates at a predetermined rotation direction, rotation speed and rotation torque, receiving a current supply from a motor control unit (not illustrated.) In this configuration, the traction member can be wound around the rotating body 3004 by way of the forward rotation of the electric motor 3002, and the traction member may be unwound from the rotating body 3004 by way of the backward rotation of the electric motor 3002.

Though the power transmission mechanism 3010 transmits rotation from the electric motor 3002 to the rotating body 3004 as described above, the power transmission mechanism 3010 may, for example, include: a backward rotation preventing mechanism (one-way clutch, two-way clutch, ratchet, etc.) for preventing unintended backward rotation of the rotating body 3004; a torque limitation mechanism for limiting a transmission torque (drag, torque limiter, etc.); a clutch mechanism for blocking torque transmission; a differential input mechanism (planetary deceleration mechanism, etc.) for transmitting a power source from two ways such as a manual input to the rotating body 3004, as necessary.

It is preferable to set an appropriate reduction ratio, using a gear mechanism or a belt mechanism in accordance with the relationship with the purpose of the output of the electric motor 3002 and the hoisting device 3001. In particular, in this configuration, three-step planetary deceleration mechanisms 3012A and 3012B are used as described above. This makes it possible to transmit power to the rotating body 3004 coaxially with the output shaft 3002a of the motor 3002, thereby realizing downsizing of the entire device and an increase the freedom in design of the reduction ratio.

The hoisting device 3001 of the present configuration has a tension detection part 3015 for detecting a tension of a traction member. The tension detection part 3015 has a pulley 3153 for stretching and guiding the traction member wound around the rotating body 3004. The pulley 3153 can move in the axial direction of the rotating body 3003 with the rotation of the rotating body 3004. In particular, in this configuration, the pulley 30153 is rotatably supported by a slider 3152 connected to the guide body 3042 via a transmission rod 3166, and the pulley 3153 can move in the axial direction of the rotating body 3003 as the rotating body 3004 rotates by the interlocking of the slider 3152 with the axial movement of the guide body 3042 (i.e., the pulley 3153 is moved in the axial direction, interlocking with the operation of the oscillator mechanism 3016.)

In addition, the tension detection part 3015 includes: a guide shaft 3151 as a moving shaft that supports the pulley 3153 so as to be rotatable and movable axially, and receives a tension of the traction member together with the pulley 3153 and moves (the moving mode in this configuration is rotation as described later, but it is not limited to rotation and it may be arbitrarily designed); a support mechanism 3150 that movably (rotatably in this configuration) supports the guide shaft 3151 with respect to the housing 3006; and a detection sensor 3156 as a tension detection means that detects a tension of the traction member based on the load acting on the support mechanism 3150 in association with the movement of the guide shaft 3151. The support mechanism 3150 includes a plurality of components to be described later, more specifically, a rotation shaft 3154, a detected part 3155, a connection part 3157 and a return spring 3158. In the configuration including such a tension detection part 3015, the traction member wound around the rotating body 3004 is discharged to the outside through the pulley 3153 and the guide body 3042 of the oscillator mechanism 3016.

Figure 52:
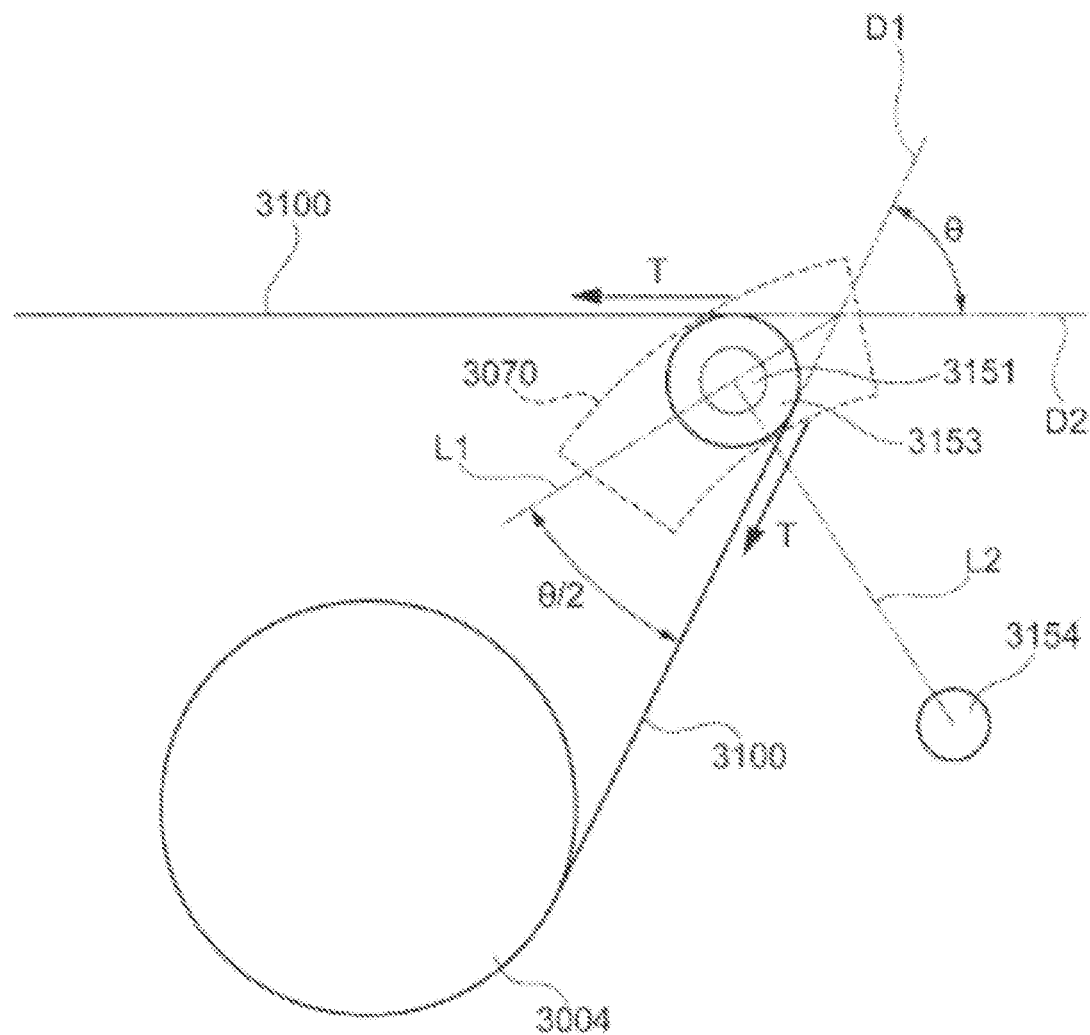
FIG. 52 shows a conceptual diagram of tension detection of a traction member.
Figure 53:
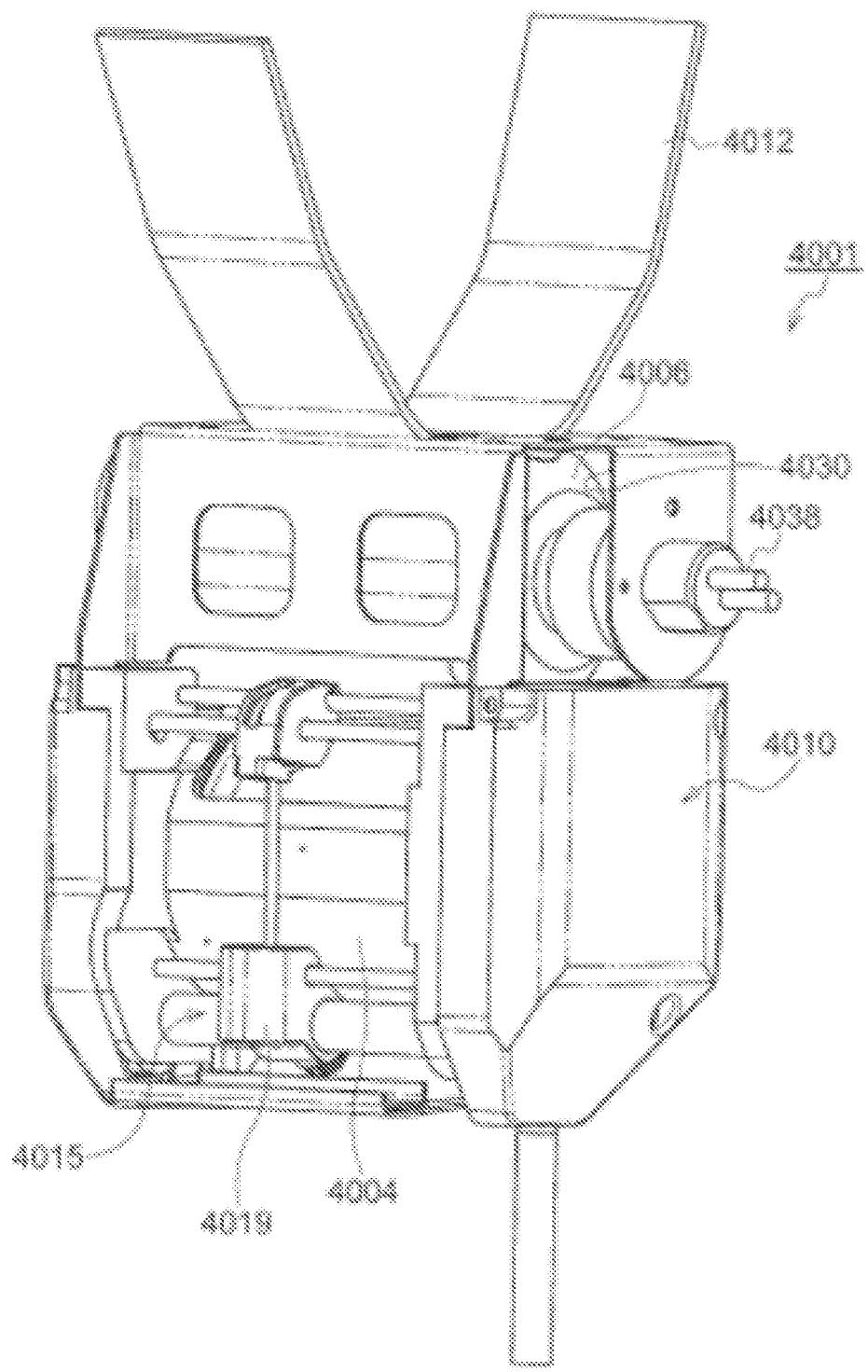
FIG. 53 shows a front perspective view of a portable hoisting device according to a first example.
Figure 54:
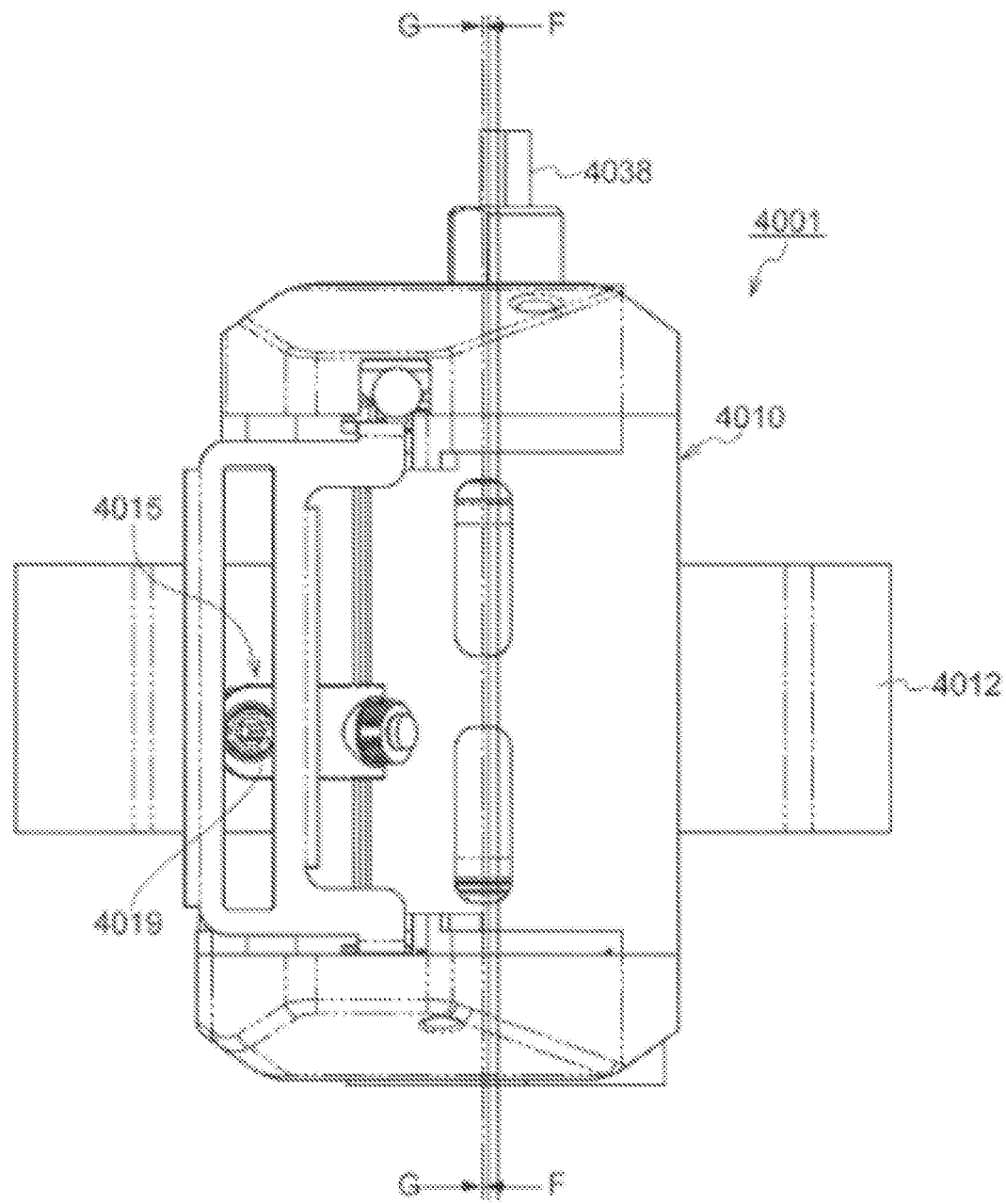
FIG. 54 shows a bottom view of the portable hoisting device in FIG. 53.
Figure 55:
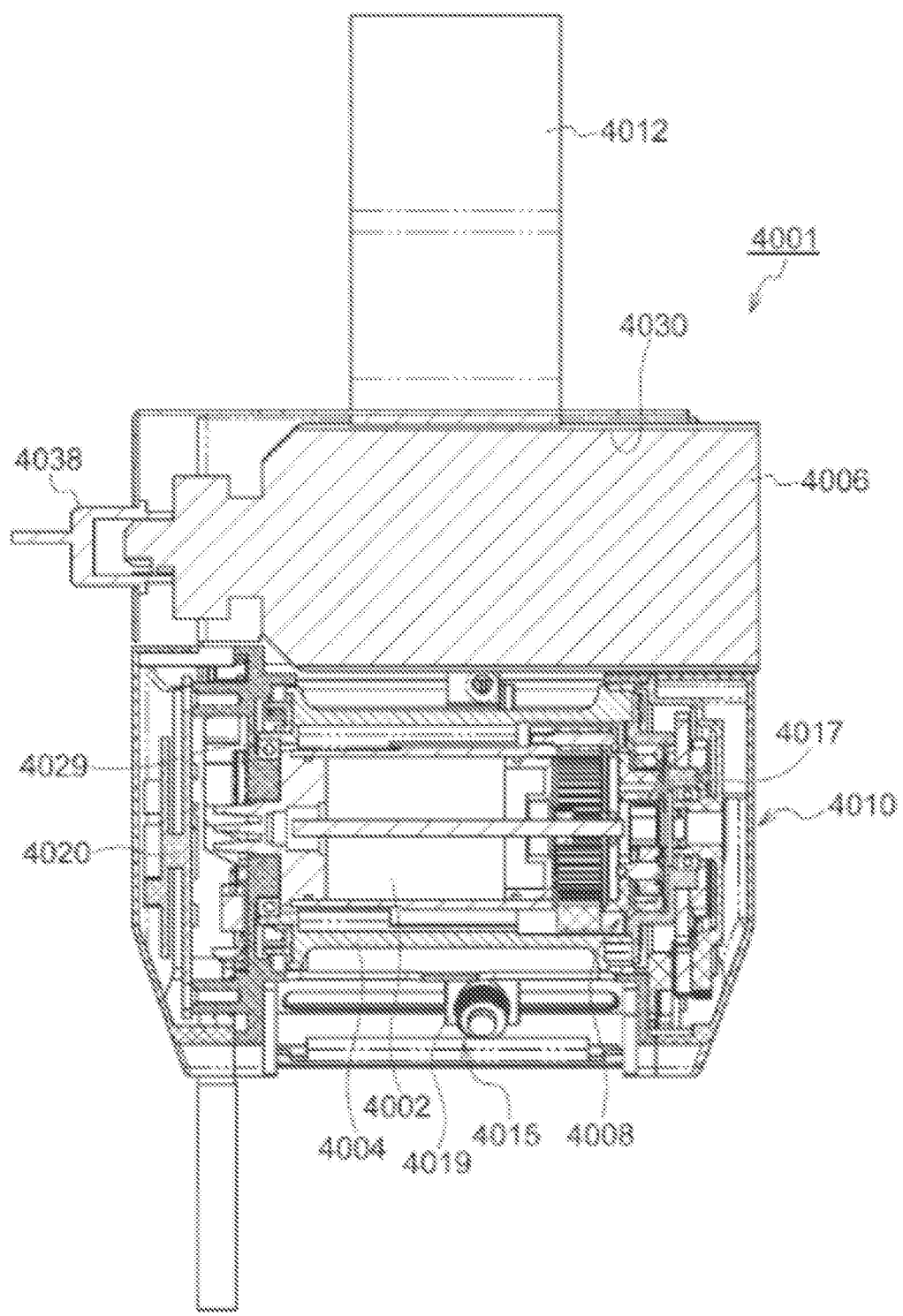
FIG. 55 shows a cross-sectional view along the line F-F in FIG. 54.
Figure 56:
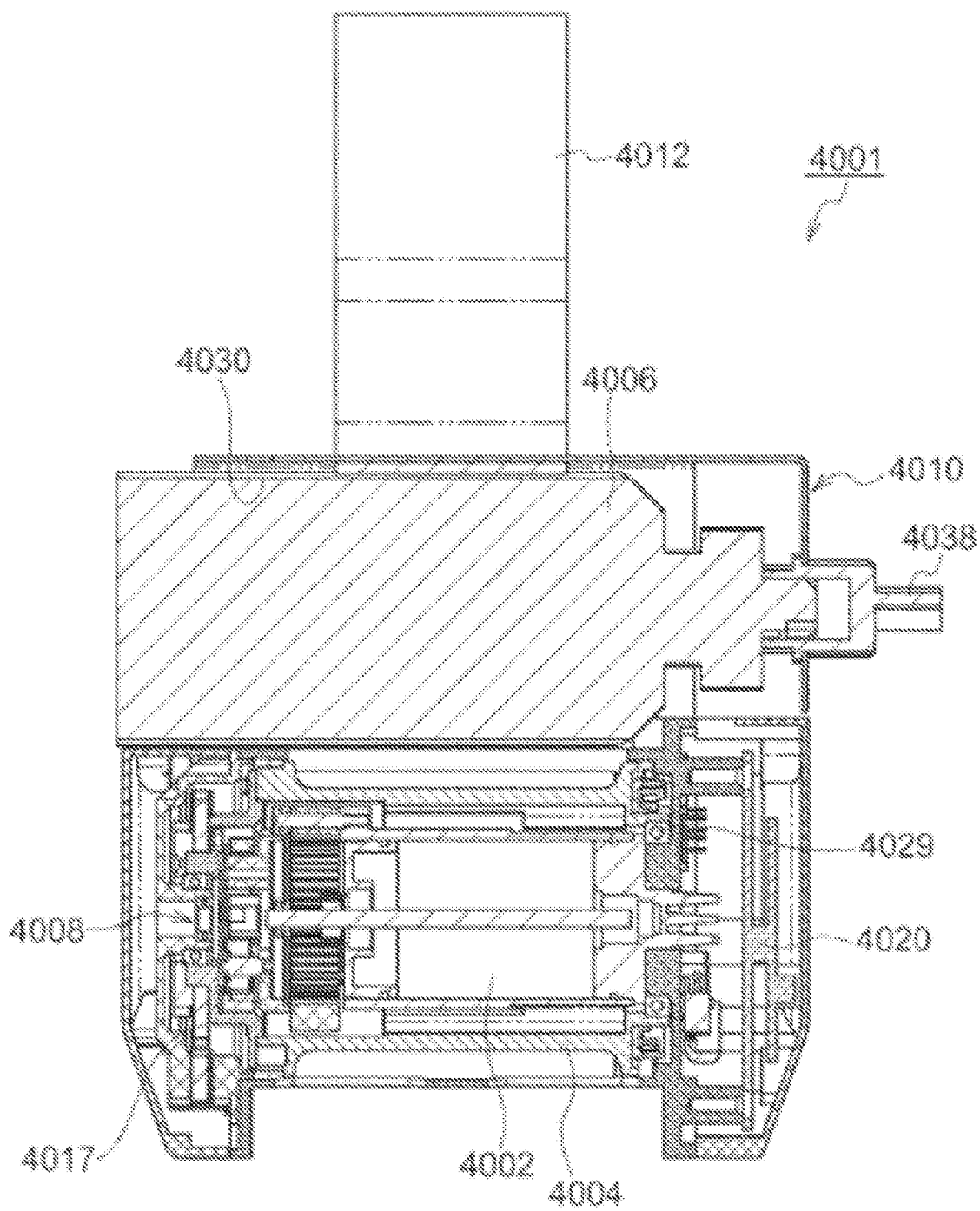
FIG. 56 shows a cross-sectional view along the line G-G in FIG. 54

The guide shaft 3151 and the rotation shaft 3154 are rod-shaped parts extending in the axial direction, both of which are slightly longer than the axial length of the housing 3006, and both ends of which are connected to the connection part 3157 and the detected part 3155 at both sides of the housing 3006. When the rotation shaft 3154 is supported by the housing 3006, these four components, that is, the guide shaft 3151, the rotation shaft 3154 extending in parallel with the guide shaft 3151, the detected part 3155, and the connection part 3157 can integrally rotate (revolve) about the rotation shaft 3154. In particular, in this configuration, the guide shaft 3151, the rotation shaft 3154, the detected part 3155 and the connection part 3157 form one unit integrally configured as a rigid body. The housing 3006 is provided with a hole (not illustrated) for pivotally supporting the rotation shaft 3154, and an arc-shaped escape part 3070 (see FIG. 52) for letting the movement (rotation operation) of the guide shaft 3151 escape.

The slider 3152 is supported so as to be movable in the axial direction with respect to the guide shaft 3151. The slider 3152 has a bearing part for rotatably supporting the pulley 3153. It is preferable to use a ball bearing for this bearing part. The motion of the guide body 3042 from the transmission rod 3166 makes the slider 3152 reciprocate in the axial direction in synchronization with the guide body 3042. The pulley 3153 is pivotally supported by the slider 3152, so that it can smoothly guide the tensioned traction member.

The detected part 3155 has a gear part 31551 having a rotation shaft 3154 as a central axis, and this gear part 31551 meshes with a pinion gear 31561 provided in the detection sensor 3156 to transmit the rotation to the detection sensor. The detected part 3155 receives a force from the return spring 3158 by the dowel 31553 attached to the end of an arm part 31552 of the detected part 3155. The dowel 31553 is limited in a rotatable range by a rotation constraint part 3006c in the shape of, for example, an arc frame provided in the housing 3006. In this configuration, the dowel 31553, and thus the detected part 3155, can be rotated by 10 degrees.

The return spring 3158 applies a restoring force in accordance with the movement of the detected part 3155 in the rotational direction. In this configuration, a torsion spring is used as the return spring 3158. The relationship between the amount of movement of the detected part 3155 and the magnitude of the restoring force of the return spring 3158 at this time preferably be a monotonic increase relationship, but a proportional relationship is more desirable depending on the purpose.

The detection sensor 3156 detects the position of the detected part 3155 in the rotation direction about the rotation axis 3154. In this configuration, by using a rotary variable resistor (position sensor) as the detection sensor 3156, a tension of the traction member (the movement amount of the detected part 3155) is converted into an electric signal. Further, the detection accuracy is improved by increasing the rotation speed of the detected part 3155 by the meshing action of the pinion gear 31561 and the gear part 31551.

In this configuration, a tension is detected by detecting the position of the detected part 3155 in the rotational direction according to a tension of the traction member by the action of the return spring 3158, but the method of detecting the force acting on the guide shaft 3151 is not limited in this configuration. The force in the rotational direction acting on the guide shaft 3151 may be detected by a strain sensor, a magnetostrictive sensor, a pressure sensor using piezoelectric elements or the like. When a tension is detected by the movement of the detected part 3155 in the rotational direction as in this configuration, even in the event of an instantaneous tension change, the tension is not detected as a voltage until the detected part 3155 moves. That is, an effect as a low-pass filter can be obtained, and abnormal operation such as vibration can be prevented depending on the purpose of the tension detection. In addition, output drift caused by self-heating or the like, which is a problem in the strain sensor, does not occur.

On the other hand, when the instantaneous tension change is to be read, a strain sensor or a piezoelectric element may be used. When using the strain sensor, a leaf spring to which a strain gauge is attached acts on the non-detecting portion 3155, and torque is generated by the leaf spring, whereby the same function as the present configuration can be realized. Alternatively, part of the detected part 3155 to which the strain gauge is attached may be fixed to the housing 3006, and the detected part 3155 itself may function as a leaf spring.

As illustrated, the tension detection part 3015 having the above-described configuration is positioned between the oscillator mechanism 3016 and the rotating body 3004 and positioned on the opposite side of the oscillator mechanism 3016 with respect to the rotating body 3004 in the lead-out path of the traction member from the rotating body 3004 to the oscillator mechanism 3016 via the pulley 3153.

FIG. 62 shows a conceptual diagram of the tension detection of the traction member by the tension detection part 3015. As illustrated, a traction member 3100 extending from the rotating body 3004 changes direction after coming in contact with, and being over, the pulley 3153, and is led out to the outside through the guide body 3042 of the oscillator mechanism 3016. Here, the angle formed by the extending direction D1 of the traction member 3100 extending from the rotating body 3004 to the pulley 3153 and the extending direction D2 of the traction member 3100 extending from the pulley 3153 to the guide body 3042 of the oscillator mechanism 3016 is defined as θ. Since the tension T acting on the traction member 3100 is constant at any position on the traction member 3100 when the tension T is applied, the pulley 3153 is subjected to the tension T both in the direction of the rotating body 3004 and in the direction of the oscillator mechanism 3016. The resultant direction of these tensions T is the direction of the bisector of the angle θ, and the magnitude of the angle is $2T \cos(\theta/2)$. Therefore, the smaller the angle θ is, the more efficiently the tension is transmitted to the pulley 3153, and the better the detection accuracy is. On the other hand, as the angle θ becomes smaller, more space through which the traction member 3100 passes is required, and it becomes difficult to downsize the entire device. Therefore, when θ is set in the range of 30 to 150 degrees, it is well-balanced. In this configuration, θ is set to 80 degrees.

In this configuration, the rotation shaft 3154 is positioned on a line L2 that is substantially orthogonal to the bisector L1 of the angle θ formed by the extending direction D1 of the traction member 3100 extending from the rotating body 3004 to the pulley 3153 and the extending direction D2 of the traction member 3100 extending from the pulley 3153 to the guide body 3042 of the oscillator mechanism 3016. As a result, the movement (rotation) direction of the guide shaft 3151 and the pulley 3153 substantially coincides with the resultant force direction (the direction of the bisector of θ) of the tension T, and the tension T is efficiently transmitted to the pulley 3163. Therefore, the detection accuracy of the tension T can be improved. Even if the rotation shaft 3154 cannot be accurately arranged on the line L2 substantially orthogonal to the bisector L1 of the angle θ because of requirements such as security of strength, the pulley moving direction component of the resultant force of the tension T is secured as long as it is within the range of about 90°±30° with respect to the bisector L1, which causes no problem.

In this configuration, the detected part 3155 becomes stable and stops at a position where the torque generated by the resultant force of the tension T and the torque received from the return spring 3158 in the opposite direction are balanced. Therefore, the detection sensor 3156 can calculate the tension T by detecting this position.

In the above-described configuration, when the rotating body 3004 is rotated in the forward and backward directions by the rotation drive of the electric motor 3002, the slider 3152 is driven to reciprocate in the axial direction in conjunction with the guide body 3042, and the guide shaft 3151 and the support mechanism 3150 are rotated by the tension acting on the traction member extending from the rotating body 3004 to the guide body 3042 via the pulley 3153, whereby the detection sensor 3156 detects a tension of the traction member.

As described above, according to the hoisting device 3001 of the present configuration, the tension detection part 3015 for detecting a tension of the traction member is configured to detect the tension by stretching and guiding the traction member over the rotatable pulley 3153. Therefore, the tensile force of the traction member can be efficiently and accurately detected without causing sliding resistance (sliding friction) and therefore, without damaging the traction member even at the time of a large tensile force as in the detection part disclosed in the above-mentioned Japanese Patent Application Publication No. H11-46644, Japanese Patent Application Publication No. 2013-172704, Japanese Patent Application Publication No. 2001-95444, and Japanese Patent Application Publication No. 2000-83535. Further, since the pulley 3153 can move in the axial direction of the rotating body 3004 along with the rotation of the rotating body 3004, it is possible to secure high detection accuracy without causing a variation in the detection value due to a change in the position of the traction member on the rotating body as seen in a sensor arrangement related to the above-mentioned Japanese Utility Model Bulletin No. S59-20059 and Japanese Patent Application Publication No. H6-276900.

In addition, in the above-described configuration, since a tension of the traction member is detected based on the load acting on the support mechanism 3150 in accordance with the movement of the guide shaft 3151 that moves, receiving a tension of the traction member together with the pulley 3153, the detection of the tension can be realized with the minimum number of components by utilizing the existing components, and therefore, the detection accuracy can be improved while minimizing the increase in size of the entire device (in the present configuration, the number of components can be minimized as there is only one pulley 3153.)

Particularly, in the present configuration including the oscillator mechanism 3016 for evenly winding the traction member in parallel with the rotating body 3004, since the tension detection part 3015 is positioned between the oscillator mechanism 3016 and the rotating body 3004 along the lead-out path of the traction member from the rotating body 3004 to the oscillator mechanism 3016 via the pulley 3153, even when the angle θ formed by the extension direction of the traction member extending from the rotating body 3004 to the pulley 3153 and the extension direction of the traction member extending from the pulley 3153 to the oscillator mechanism 3016 is reduced to improve the detection accuracy, these components can be arranged without increasing a dead space, and therefore, both downsizing of the device and improvement of the detection accuracy can be realized. Further, since the rotation shaft 3154 is arranged in a direction orthogonal to the bisector of the angle θ, the moving direction of the guide shaft 3151 coincides with the resultant direction of the tension T, which improves the detection accuracy.

In the above configuration, since the tension detection part 3015 is disposed between the oscillator mechanism 3016 and the rotating body 3004 as described above, and the movement in the axial direction is transmitted from the oscillator mechanism 3016 to the pulley 3153 via the transmission rod 3166, even if the axial distance of the rotating body 3004 is increased, the traction member can be evenly wound on the rotating body 3004, and interference between the housing 3006 and the traction member can be avoided.

In the above-described configuration, the guide shaft 3151, the rotation shaft 3154, the connection part 3157 and the detected part 3155 are integrally formed as a rigid body, and the torque with respect to this unit is detected. Therefore, regardless of the position of the oscillator mechanism 3016, if a tension of the traction member is constant, the torque around the rotation shaft 3154 also becomes constant, and stable detection can be performed by one detection sensor.

The hoisting device 3001 having the above-described configuration can be used for winding up and down objects such as beddings, packaging, temporary scaffolding, buildings, and fishing tools to predetermined positions, can also be used as a fishing reel, and further, such a device mounted on a drone can be used to unload loads from, or hoist loads onto, the drone in the air, the fields in which such a machine is used are not limited to those mentioned above.

The form of the configuration of the support mechanism and the tension detection sensor is not limited to the above-described configuration, and can be arbitrarily designed. In the above-described configuration, though the driving force source for generating a rotational driving force is an electric motor, the rotational driving force may be generated manually. In the above-described configuration, the driving of the electric motor may be remotely controlled by using a mobile phone, a WiFi communication terminal or the like. In the above-described configuration, a planetary gear mechanism is employed as a deceleration mechanism, but a wave gear device such as the Harmonic Drive (registered trademark) or a spur gear may be employed as a deceleration mechanism. Further, in the above-described configuration, the electric motor is accommodated in the rotating body, but the electric motor may be provided outside the rotating body.

Finally, a further advantageous configuration of the above-mentioned portable hoisting device will be described. It is desirable that such a portable hoisting device should not only has excellent portability as a whole, but also should realize a compact structural form installable in a small installation space relative to an installation object on which the hoisting device is to be installed. Therefore, in the following, a compact portable hoisting device is provided which can be freely carried, and easily mounted on a predetermined installation object and used, without requiring assembly, and which can be installed in a small installation space relative to the installation object. It should be noted that as in the case of the portable hoisting device described above in relation to FIG. 26, the portable hoisting device described below is also intended to be of a so-called lightweight type, which allows an operator to easily install, hoist, lower and remove after operation, an object, unlike the one which lifts and lowers a heavy body such as a container. For this reason, the device is configured such that the total weight is about 100 g to 10 kg, and the load-bearing capacity is preferably 100 kg or less.

FIGS. 53 to 57 show a portable hoisting device 4001 according to the first example. In particular, as clearly shown in FIGS. 53 to 56, the portable hoisting device 4001 according to the first example is of an electric type, and includes: an electric motor 4002 as a driving force source for generating a rotational driving force; a cylindrical rotating body 4004 for winding and/or unwinding (hoisting) the traction member L (not shown in FIGS. 53 to 56; see FIG. 57) such as a wire, a chain and a rope, for pulling an object, which is rotated forward and backward by way of the forward and backward rotation drive of the electric motor 4002; a power supply part (in this configuration, a battery that can directly supply electric power to the electric motor 4002 by itself without relying on an external power source such as a commercial power source (without wiring)) 4006 for supplying electric power to an electric motor 4002; and a power transmission mechanism 4008 for decelerating force from the electric motor 4002 to transmit the decelerated force to the rotating body 4004. These components, that is, the electric motor 4002, the rotating body 4004, a power supply part 4006 and the power transmission mechanism 4008 are integrated into a casing 4010 as one unit. Note that the casing 4010 is formed integrally by combining a plurality of casing members in this configuration, but may be formed integrally by a single member. In the following, the "power supply part" includes not only a battery as a power accumulate means as in this configuration but also a power supply means that allows the electric motor 4002 to be directly supplied with electric power from an external power source such as a commercial power source. In short, it means a power supply part that can supply electric power to the electric motor 4002 by itself or by using an external power source on a site which a portable hoisting device 4001 is easily carried in and used.

Further, the housing 4010 is provided with an installation part 4012 for detachably attaching the housing 4010 to a predetermined installation object (for example, a building (ceilings, handrails, etc.) temporary scaffolding and drone (not illustrated)). The installation part 4012 may also serve as a handle for carrying the portable hoisting device 4001, and may take the form of, for example, a belt, an arm, a hook and a bolt fastener.

In the above-described configuration, the rotating body 4004 is rotatably supported by the casing 4010 via a bearing 4029, and the electric motor 4002 is non-rotatably supported and fixed to the inside of the cylindrical rotating body 4004 and coaxially arranged while being accommodated in a motor housing, for example, and is supplied with power by the power supply part 6 as described above (for example, it has a structure similar to a known electric fishing reel.)

The electric motor 4002 and the rotating body 4004 are connected to each other by a power transmission mechanism (power transmission path) 4008 so as to be able to transmit power. In this case, the power transmission mechanism 4008 may have a bidirectional clutch that transmits the rotation of the electric motor 4002 to the rotating body 4004 side but does not transmit the rotation of the rotating body 4004 to the electric motor 4002 side, and includes a deceleration mechanism (planetary gear mechanism in this configuration) 4017 that reduces the power from the electric motor 4002 and transmits the reduced power to the rotating body 4004.

The portable hoisting device 4001 according to the present configuration is provided with a level winding device 4015 for winding the traction member L in parallel with the rotating body 4004. The level winding device 4015 is configured such that when the electric motor 4002 is driven to rotate, a guide body 4019 that passes through the traction member L unwound from the rotating body 4004 moves reciprocally from side to side in conjunction with the rotation of the electric motor 4002, and has a function of evenly winding the traction member L around the rotating body 4004 in accordance with the winding operation of the traction member L.

The portable hoisting device 4001 according to the present configuration further includes a board 4020 on which a control circuit for controlling the driving of the electric motor 4002 (thus, the rotating body 4004) is implemented, and the board 4020 is also incorporated in the housing 4010. The board 4020 is also connected to a power feed line 4027 that electrically connects the power supply part 4006 and the electric motor 4002, and a control line (not illustrated) that electrically connects to an operation part and a control unit (not illustrated) for the rotating body 4004, and the board 4020 may receive various sensor signals such as a position, a temperature, a speed and an operation signal from a user.

Figure 57:
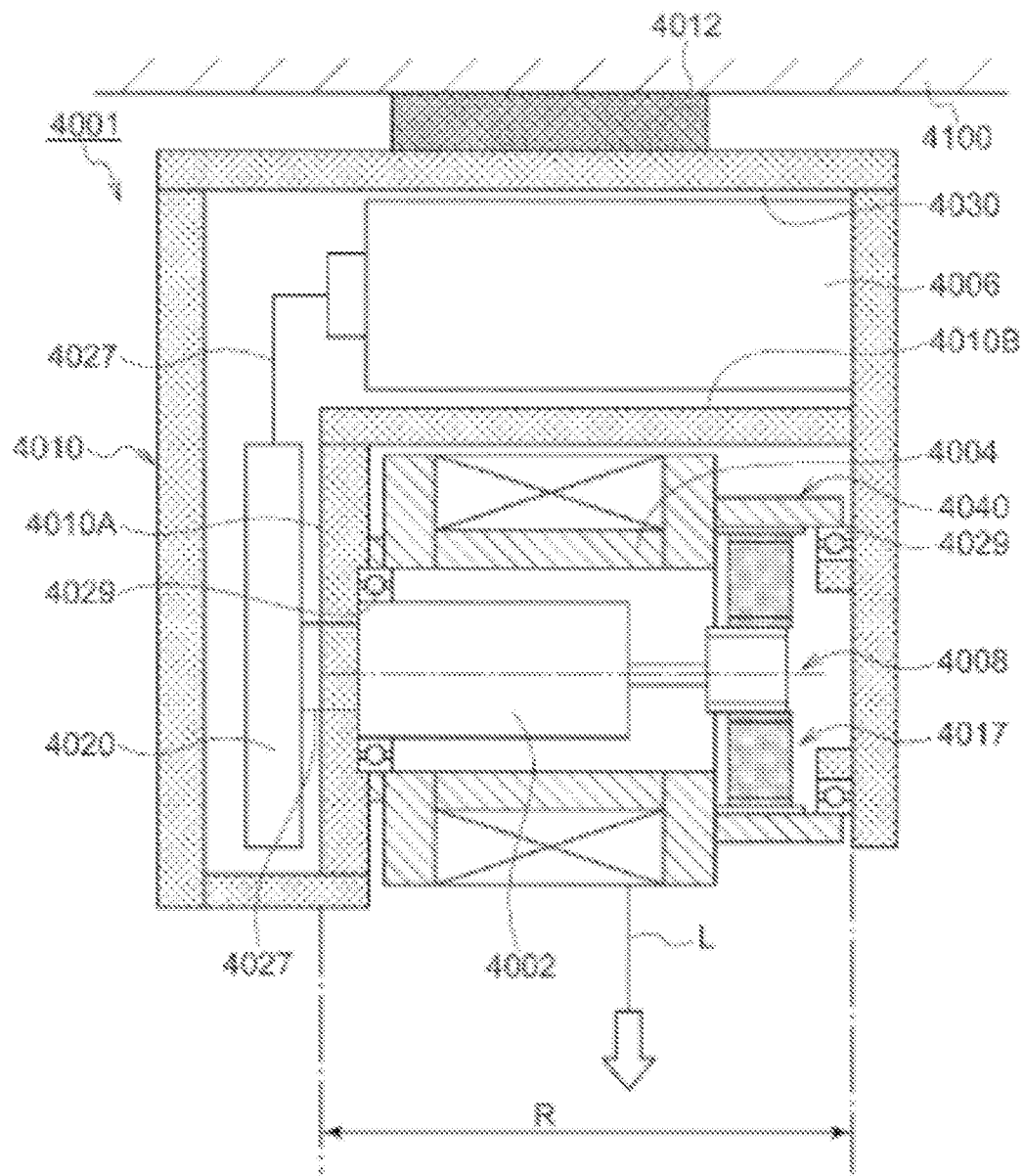
FIG. 57 shows a schematic cross-sectional view schematically indicating an arrangement form of components inside the portable hoisting device in FIG. 53.

As schematically shown in FIG. 57, the housing 4010 has a planar mounting face 4010A for mounting the board 4020 and the electric motor 4002 and a planar mounting face 4010B for mounting the power supply part 4006 therein, and in particular, in this configuration, the board 4020 and the electric motor 4002 are mounted on a common mounting face 4010A (in FIG. 57, a gap is depicted between the mounting faces 4010A and 4010B and the board 4020, the electric motor 4002, and the power supply part 4006, but in practice, the board 4020, the electric motor 4002, and the power supply part 4006 are mounted on the mounting faces 4010A and 4010B). In addition, the housing 4010 has a housing 4030 formed inside that passes through and accommodates the power supply part 4006. A charging terminal 4038 that allows the power supply part 4006 to be recharged projects from the housing 4030 to the outside.

Further, as clearly shown in FIG. 57, in the present configuration, the rotating body 4004, the electric motor 4002 and the power transmission mechanism 4008 constitute a device main body 4040, and the power supply part 4006 is positioned within a range R of the projected area of the device main body 4040 in the traction direction of the traction member L (unwinding direction: indicated by an arrow in FIG. 57.)

In the present configuration, the installation part 4012, the electric motor 4002 (the rotating body 4004) and the power supply part 4006 are serially arranged with each other in the traction direction of the traction member L within the range R of the projected area. More specifically, in a state in which the installation part 4012 is attached to a predetermined installation object 4100, the traction member L is unwound from a rotating body 4004 downward in the drawing, and in this state, the power supply part 4006 is positioned below the installation part 4012 located at the upper end of the casing 4010 within the range R of the projected area, and the device main body 4040 (the electric motor 4002, the rotating body 4004, and the power transmission mechanism 4008) is positioned below the power supply part 4006 within the range R of the projected area. In this configuration, the board 4020 is positioned adjacent to the device main body 4040 side (the electric motor 4002) via the mounting face 4010A.

As described above, according to the portable hoisting device 4001 having the above-described configuration, since all the hoisting functions for winding and/or unwinding the traction member L to lift and lower an object are integrated as one unit by the housing 4010, without complicated assembly involving fastening with tools such as bolts, it is readily usable by itself or becomes readily usable by simply mounting the installation part 4012 of the casing 4010 on the predetermined installation object 4100 possible to easily realize the portability (the device can be easily attached to, or detached from, the predetermined installation object 4100 anywhere to quickly perform winding-up or -down operations); portability that a person can freely carry the device can be easily realized, and reduction in size and weight (downsizing) that makes the device installable in a small installation space relative to the installation object 4100 can also easily realize.

In addition, in the above-described configuration, since each component that performs the winding function is surrounded by the housing 4010, the entire device can be finished into a geometric shape (e.g., box shape) without concavo-convex portions as shown in FIG. 57, which can avoid a damage occurring when the concavo-convex portion collides with an obstacle when the device is carried.

In particular, in the above-described configuration, the power supply part 4006 is positioned within the range R of the projected area of the device main body 4040 in the traction direction of the traction member L (the center of gravity of the power supply part 4006 is positioned within the range R of the projected area of the device main body 4040) (the position of the power supply part within the casing forming the unit is particularly important for downsizing of the entire device; this is because the position (layout) of the power supply part within the casing may be an important factor for downsizing of the entire device since a certain large volume is required for the power supply part in consideration of various usage environments in order to secure sufficient usage time particularly when the power supply part is configured by a battery) and the installation part 4012, the electric motor 4002 and the power supply part 4006 are serially arranged with each other in the traction direction of the traction member L within the range R of the projected area of the device main body 4040. Therefore, not only can the installation space be made compact by reducing a dead space (a layout that minimizes the installation space can be realized) but also the installation part 4012, the device body 4040, and the traction member L are aligned when a tension is applied to the traction member L, so that the device 4001 can be stably fixed to the installation object 4100 by the installation part 4012, and a stable device 4001 with a good weight balance can be provided. Further, as in the present configuration, when the installation part 4012 is provided on the opposite side of the unwinding direction of the traction member, since the installation part 4012 and the device main body 4040 are aligned linearly in the tensile direction when a tensile force is applied through the traction member, the force in the bending direction is not applied to the device 4001 and therefore, the installation part 4012 can be made simple in a belt shape. This is true in the case where the force arises in the horizontal direction as well as in the direction of gravity.

As described above, even if the size of the device 4001 increases in the traction direction of the traction member L due to such an arrangement in the projected area, the downsizing of the installation space is not adversely affected. This is because, in the hoisting device 1, the space along the traction direction of the traction member L is a moving and carrying path of a hoisting object, and is an originally necessary space and therefore, even if the size of the device 4001 increases in this space (traction direction) the downsizing of the installation space is not affected.

Further, in the above configuration, since the board 4020 and the electric motor 4002 are mounted on the common mounting face 4010A, the electric components can be arranged collectively, the arrangement of the electric wiring can be simplified and further, the workability of the maintenance is also improved. In particular, when the board 4020 is disposed on the electric motor 4002 side as in the present configuration, the wiring derived from the mounting face of the electric motor 4002 can be brought close to the board 4020, whereby the motor wiring can be shortened and noise can be reduced, and even when a large tension acts through the traction member L, the board 20 does not directly receive the tension.

Further, in the present configuration, since the housing 4030 that passes through and accommodates the power supply part 4006 is formed inside the housing 4010, the device 4001 can be more easily assembled at the time of manufacturing. Further, in this configuration, since the installation part 4012 also functions as a handle for carrying the device 4001, the device 4001 can be easily carried, which improves the portability.

Figure 58A:
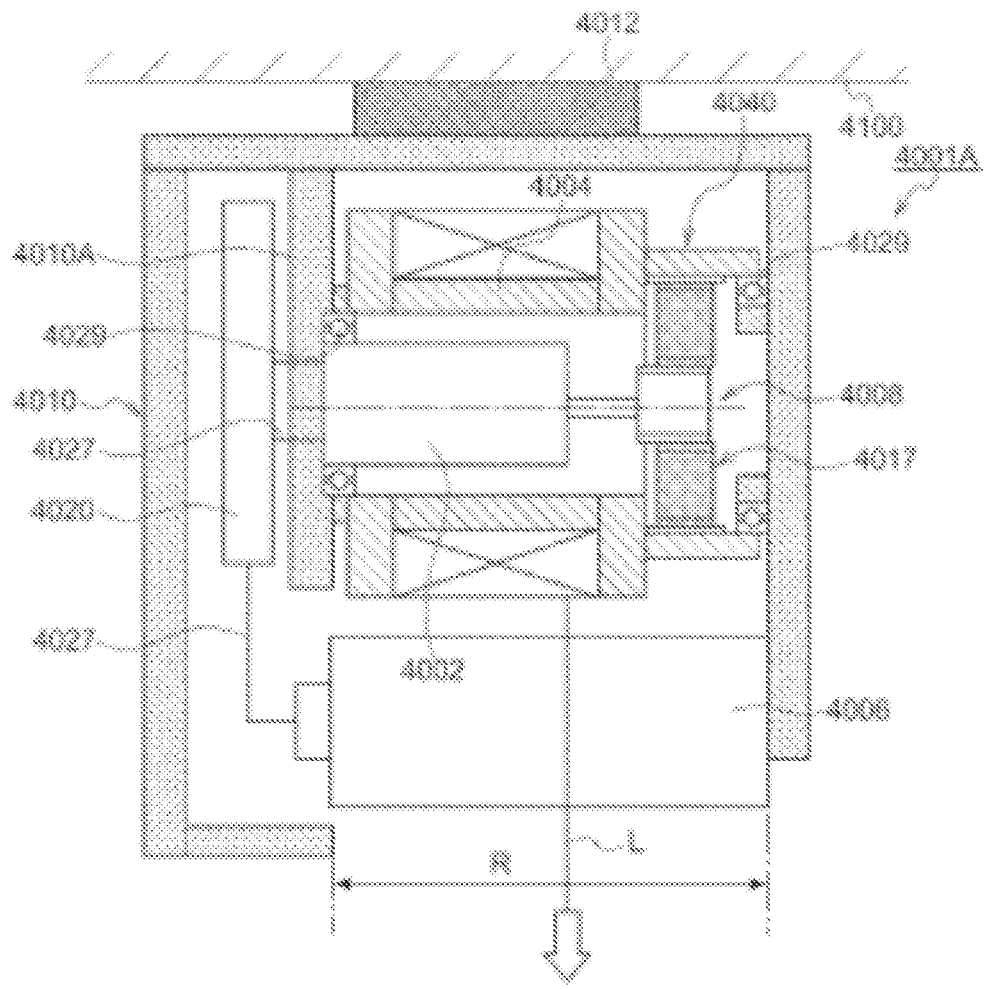
FIG. 58(*a*) shows a schematic cross-sectional view schematically indicating an arrangement form of components inside the portable hoisting device according to a second example, and FIG. 58(*b*) shows a schematic side view indicating an arrangement between the motor frame and the power supply part in the arrangement form in FIG. 58(*a*.)
Figure 58B:
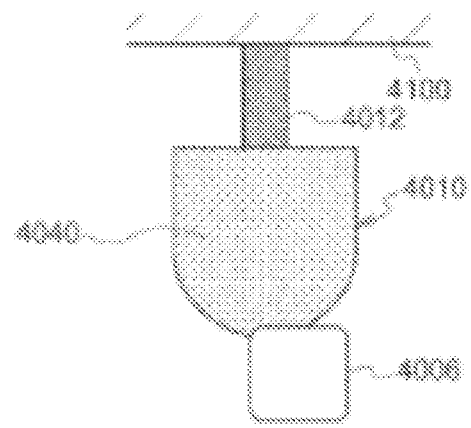

FIG. 58 schematically shows an arrangement of components inside the portable hoisting device 4001A according to the second example. As illustrated, in the portable hoisting device 4001A of the present configuration, unlike the first example described above, the device main body 4040 and the power supply part 4006 are disposed vice versa. That is, in the present configuration, the power supply part 4006 is disposed on the lower side of the device main body 4040 (i.e., on the unwinding side of the traction member L.) Also, in this case, the power supply part 4006 is positioned on the back side with respect to the level winding device 4015 (escaped in the depth direction; see FIG. 58(*b*)) so as not to hinder the unwinding and/or winding of the traction member L (so as not to overlap with the traction path of the traction member L). The rest of the configuration is the same as that of the first example.

The load received from the traction member L is transmitted to the casing 4010 via the rotating body 4004, but when the power supply part 4006 is disposed on the lower side in this manner, the supporting part of the housing 4010 can be brought close to the installation object 4100, so that the installation part 4012 can be easily mounted directly on the housing 4010 and the strength can be easily secured, which makes it easier to secure the strength. Further, since the power supply part 4006 having a relatively large weight is disposed below the device 4001A, the center of gravity of the entire device 4001A is lowered, and when the device 4001A is suspended from the installation object 4100, the postural stability of the device 4001A is more easily obtained.

Figure 59:
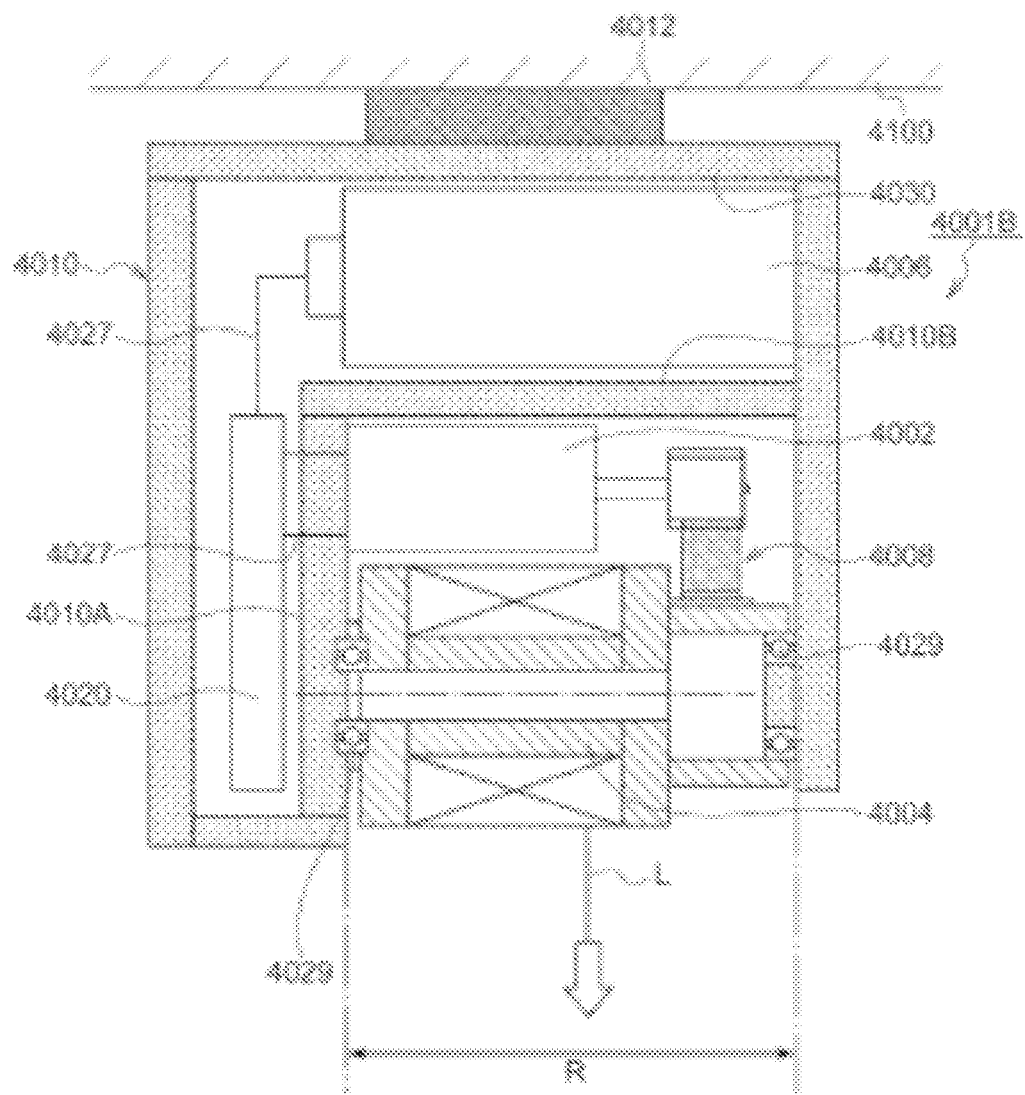
FIG. 59 shows a schematic cross-sectional view schematically indicating an arrangement form of components inside the portable hoisting device according to a third example.

FIG. 59 schematically shows an arrangement of components inside the portable hoisting device 4001B according to the third example. As illustrated, in the portable hoisting device 4001B of the present configuration, the electric motor 4002 is disposed outside the rotating body 4004 and above the rotating body 4004. That is, the installation part 4012, the power supply part 4006, the electric motor 4002 and the rotating body 4004 are sequentially and serially arranged from the upper side along the unwinding direction of the traction member L. The rest of the configuration is the same as that of the first example.

According to such an arrangement, since the rotating body 4004 does not incorporate the electric motor 4002, it is possible to downsize the rotating body 4004. In addition, since the rotating body 4004 and the electric motor 4002 are vertically overlapped with the power supply part 4006 when viewed from the installation part 4012, the installation area of the device 4001B with respect to the installation object 4100 can be reduced. In addition, in this arrangement, by properly selecting the component size of the electric motor 4002 and the necessary volume of the traction member L, the downsizing of the installation space may be further promoted as compared with the first example.

Figure 60:
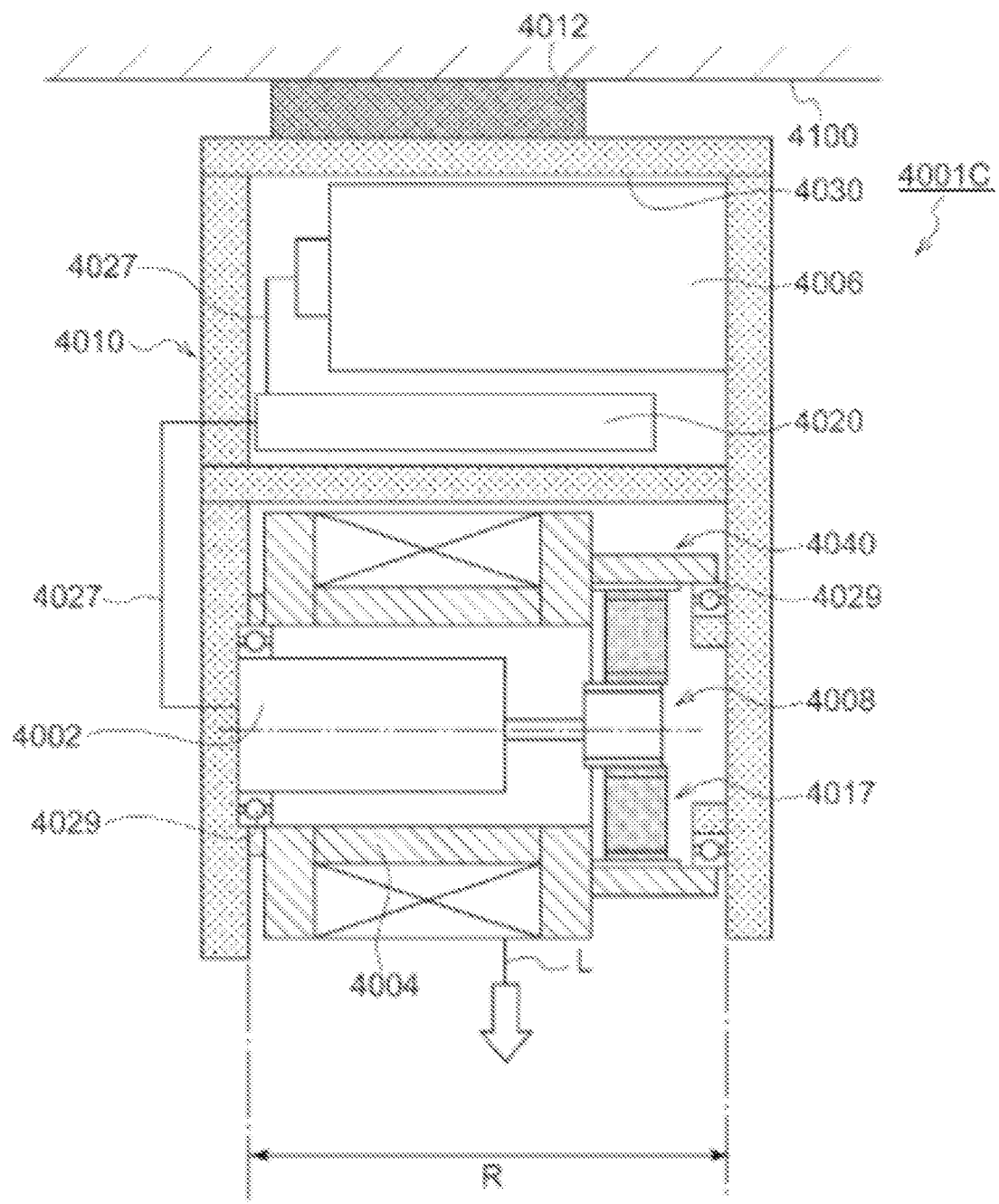
FIG. 60 shows a schematic cross-sectional view schematically indicating an arrangement form of components inside the portable hoisting device according to a fourth example.

FIG. 60 schematically shows an arrangement of components inside a portable hoisting device 4001C according to a fourth example. As illustrated, in the portable hoisting device 4001C of this configuration, the board 4020 is positioned on the upper side of the device main body 4040 (between the power supply part 4006 and the device main body 4040.) The rest of the configuration is the same as that of the first example.

According to such an arrangement, since the board 4020 also vertically overlaps with the power supply part 4006 and the electric motor 4002 when viewed from the mounting unit 4012, the installation area of the device 4001C with respect to the installation object 4100 can be further reduced.

In the above-described configuration, the driving of the electric motor may be remotely controlled, using a mobile phone, a WiFi communication terminal or the like. In the above-described configuration, the power transmission mechanism includes a deceleration mechanism, but may include a clutch mechanism, a drag mechanism, a one-way clutch mechanism, or the like as necessary. In the above-described configuration, a planetary gear mechanism is employed as a deceleration mechanism, but a wave gear device such as the Harmonic Drive (registered trademark) or a spur gear may be employed as a deceleration mechanism. In the above-described configuration, the rotating body is rotated in the forward and backward directions by way of the forward and backward rotation drive of the electric motor, so that the traction member for pulling a hoisting object is wound up and/or unwound, but the traction member may be unwound by making the rotating body free of rotation by the clutch mechanism or the like without using the driving force of the electric motor.

The portable hoisting devices 4001, 4001A, 4001B, and 4001C having the above-described configurations can be used for hoisting and lowering objects such as beddings, packaging, temporary scaffolding, buildings, and fishing tools to predetermined positions, and such a machine mounted on a drone can be used to take loads down from, or hoist loads onto, the drone in the air. (for example, a drone is used to supply a floating tube to a drowning swimmer in the sea) the fields in which such a machine is used are not limited to those mentioned above.

DESCRIPTION OF THE NUMERICAL REFERENCES

1 Electric hoisting machine
2 Electric motor
4 Rotating body
15 Control device
16 Mode input part (input part)
18 Control unit
20 Tension sensor (tension detection part)
22 Threshold setting part

What is claimed is:

1. A control device configured to control an electric hoisting machine configured to wind and/or unwind a traction member on or from a rotating body by rotating the rotating body forward and backward by way of the forward and backward rotation drive of an electric motor, the control device comprising:
   a tension detection part configured to detect a tension of the traction member;
   an input part configured to input a mode switching signal to switch between a winding mode to rotate the rotating body forward to wind the traction member on the rotating body and a unwinding mode to rotate the rotating body backward to unwind the traction member from the rotating body; and
   a control unit configured to receive a detection signal from the tension detection part and a mode switching signal from the input part and control the operation of the electric motor in response to the mode switching signal,
   wherein the control unit is configured to control the electric motor in response to a detection signal from the tension detection part so that when set to the unwinding mode by the mode switching signal,
      the rotating body is rotated backward when the tension of the traction member is equal to or greater than a predetermined threshold value, and
      the rotating body is prevented from being rotated backward when the tension of the traction member falls below the predetermined threshold value,
   wherein the control unit is configured to limit a speed of the backward rotation of the rotating body to a predetermined speed or less in the unwinding mode.

2. The control device according to claim 1, wherein the control unit is configured to control the electric motor so that the rotation of the rotating body is stopped when the tension of the traction member falls below the predetermined threshold value in the unwinding mode.

3. The control device according to claim 1, wherein the control unit is configured to control the electric motor so that the rotating body rotates forward when the tension of the traction member falls below the predetermined threshold value in the unwinding mode.

4. The control device according to claim 1, wherein the control unit is configured not to accept a mode switching signal from the input part to the winding mode while the rotating body rotates backward in the unwinding mode.

5. The control device according to claim 1, further comprising a threshold setting part configured to set the threshold value.

6. A control method for controlling an electric hoisting machine configured to wind and/or unwind a traction member on a rotating body by rotating the rotating body forward and backward by way of the forward and backward rotation drive of an electric motor, the control method comprising:
- a tension detection step of detecting a tension of the traction member;
- an input step of inputting a mode switching signal to switch between a winding mode to rotate the rotating body forward to wind the traction member on the rotating body and an unwinding mode to rotate the rotating body backward to unwind the traction member from the rotating body; and
- a control step of controlling the operation of the electric motor in response to a mode switching signal Obtained from the input step,
- wherein when set to the unwinding mode by the mode switching signal, the control method controls the electric motor in response to a detection signal obtained from the tension detection step, so that:
  - the rotating body is rotated backward when the tension of the traction member is equal to or greater than a predetermined threshold value, and
  - the rotating body is prevented from being rotated backward when the tension of the traction member falls below the predetermined threshold value,
- wherein the control step limits a speed of the backward rotation of the rotating body to a predetermined speed or less in the unwinding mode.

7. The control method according to claim 6, wherein the control step controls the electric motor so that the rotation of the rotating body is stopped when the tension of the traction member falls below the predetermined threshold value in the unwinding mode.

8. The control method according to claim 6, wherein the control step controls the electric motor so that the rotating body rotates forward when the tension of the traction member falls below the predetermined threshold value in the unwinding mode.

9. The control method according to claim 6, wherein the control step does not accept a mode switching signal from the input step to the winding mode during the backward rotation of the rotating body in the unwinding mode.

10. The control method according to claim 6, further comprising a threshold setting step for setting the threshold value.

11. An electric hoisting machine configured to wind and/or unwind a traction member on a rotating body, the electric hoisting machine comprising:
- an electric motor configured to rotate the rotating body;
- a tension detection part configured to detect a tension of the traction member;
- an input part configured to input a mode switching signal to switch between a winding mode to rotate the rotating body forward to wind the traction member on the rotating body and an unwinding mode to rotate the rotating body backward to unwind the traction member from the rotating body; and
- a control unit configured to receive a detection signal from the tension detection part and a mode switching signal from the input part and control the operation of the electric motor in response to the mode switching signal,
- wherein the control unit is configured to control the electric motor so that when set to the unwinding mode by the mode switching signal in response to a detection signal from the tension detection part,
  - the rotating body is rotated backward when the tension of the traction member is equal to or greater than a predetermined threshold value, and
  - the rotating body is prevented from being rotated backward when the tension of the traction member falls below the predetermined threshold value,
- wherein the control unit is configured to limit a speed of the backward rotation of the rotating body to a predetermined speed or less in the unwinding mode.

12. The electric hoisting machine according to claim 11, wherein the control unit is configured to control the electric motor so that the rotation of the rotating body is stopped when the tension of the traction member falls below the predetermined threshold value in the unwinding mode.

13. The electric hoisting machine according to claim 11, wherein the control unit is configured to control the electric motor so that the rotating body rotates forward when the tension of the traction member falls below the predetermined threshold value in the unwinding mode.

14. The electric hoisting machine according to claim 11, wherein the control unit is configured not to receive a mode switching signal from the input part to the winding mode while the rotating body rotates backward in the unwinding mode.

15. The electric hoisting machine according to claim 11, further comprising a threshold setting part configured to set the threshold value.

16. A drone comprising a drone body and the electric hoisting machine according to claim 11.

* * * * *